(12) United States Patent
Shen et al.

(10) Patent No.: US 11,477,146 B2
(45) Date of Patent: Oct. 18, 2022

(54) INFORMATION SHARING METHOD, DEVICE AND NON-TRANSITORY COMPUTER READABLE STORAGE MEDIUM THEREOF

(71) Applicant: SHENZHEN TRANSSION HOLDINGS CO., LTD., Shenzhen (CN)

(72) Inventors: Jianfeng Shen, Shenzhen (CN); Hairui Hu, Shenzhen (CN); Zhiyong Wang, Shenzhen (CN)

(73) Assignee: SHENZHEN TRANSSION HOLDINGS CO., LTD., Shenzhen (CN)

( * ) Notice: Subject to any disclaimer, the term of this patent is extended or adjusted under 35 U.S.C. 154(b) by 0 days.

(21) Appl. No.: 16/940,723

(22) Filed: Jul. 28, 2020

(65) Prior Publication Data

US 2021/0226905 A1 Jul. 22, 2021

(30) Foreign Application Priority Data

Jan. 20, 2020 (CN) .................. CN202010068136
Jan. 20, 2020 (CN) .................. CN202010068388
(Continued)

(51) Int. Cl.
*H04L 51/066* (2022.01)
*H04L 51/58* (2022.01)

(52) U.S. Cl.
CPC ............ *H04L 51/066* (2013.01); *H04L 51/58* (2022.05)

(58) Field of Classification Search
CPC ...... H04L 51/066; H04L 51/38; H04L 67/125; H04L 67/2823; H04L 67/06
See application file for complete search history.

(56) References Cited

U.S. PATENT DOCUMENTS 10,911,380 B2 * 2/2021 Lindley .................. H04L 51/08
2003/0078968 A1 4/2003 Needham et al.
(Continued)

FOREIGN PATENT DOCUMENTS

CN 101771532 A 7/2010
CN 102238097 A 11/2011
(Continued)

OTHER PUBLICATIONS

Extended European Search Report in counterpart European Patent Application No. 20187726.3, dated Jan. 19, 2021.
(Continued)

*Primary Examiner* — Austin J Moreau
(74) *Attorney, Agent, or Firm* — Westbridge IP LLC

(57) ABSTRACT

The application discloses an information sharing method including: S10, obtaining information to be shared that a sending terminal wants to share to a receiving terminal; S20, detecting whether the information to be shared meets a preset rule, the preset rule including: the information meeting a first preset condition, and/or, the receiving terminal and/or the sending terminal meeting a second preset condition; and S30: in determining that the information to be shared meets the preset rule, sending the information according to a preset strategy. The application also discloses other related information sharing methods, devices, and non-volatile computer-readable storage medium. The purpose of intelligently sharing information is realized.

34 Claims, 14 Drawing Sheets

(30) Foreign Application Priority Data

Jan. 20, 2020 (CN) .................. CN202010068407
Jan. 20, 2020 (CN) .................. CN202010070486
Jan. 20, 2020 (CN) .................. CN202010070487

(56) References Cited

U.S. PATENT DOCUMENTS

| | | | | |
|---|---|---|---|---|
| 2008/0039051 | A1* | 2/2008 | Stalin | H04L 51/066 455/412.1 |
| 2008/0181578 | A1* | 7/2008 | Hanes | H04N 21/43615 386/232 |
| 2018/0183741 | A1* | 6/2018 | Dar | H04L 51/10 |
| 2019/0082002 | A1* | 3/2019 | Huang | H04L 67/06 |
| 2020/0367026 | A1* | 11/2020 | Wu | G06T 13/80 |
| 2021/0227231 | A1* | 7/2021 | Hannuksela | H04N 21/8456 |
| 2021/0342050 | A1* | 11/2021 | Wang | G06F 9/451 |

FOREIGN PATENT DOCUMENTS

| | | |
|---|---|---|
| CN | 102395112 A | 3/2012 |
| CN | 102801654 A | 11/2012 |
| CN | 103177043 A | 6/2013 |
| CN | 203206476 U | 9/2013 |
| CN | 104063353 A | 9/2014 |
| CN | 104092648 A | 10/2014 |
| CN | 104320533 A | 1/2015 |
| CN | 104537022 A | 4/2015 |
| CN | 104715008 A | 6/2015 |
| CN | 105072560 A | 11/2015 |
| CN | 105099877 A | 11/2015 |
| CN | 105260669 A | 1/2016 |
| CN | 105635133 A | 6/2016 |
| CN | 105635412 A | 6/2016 |
| CN | 106936699 A | 7/2017 |
| CN | 107197077 A | 9/2017 |
| CN | 107707450 A | 2/2018 |
| CN | 107885809 A | 4/2018 |
| CN | 107908337 A | 4/2018 |
| CN | 108632437 A | 10/2018 |
| CN | 108737649 A | 11/2018 |
| CN | 109639781 A | 4/2019 |
| CN | 109669552 A | 4/2019 |
| CN | 208956226 U | 6/2019 |
| CN | 110177040 A | 8/2019 |
| CN | 110191461 A | 8/2019 |
| CN | 110460514 A | 11/2019 |
| CN | 111327517 A | 6/2020 |
| CN | 111327764 A | 6/2020 |
| CN | 111327765 A | 6/2020 |
| CN | 111327766 A | 6/2020 |
| EP | 1712070 A2 | 10/2006 |
| EP | 2466802 A1 | 6/2012 |
| JP | 2017118313 A | 6/2017 |
| WO | 2018101628 A1 | 6/2018 |
| WO | 2018196588 A1 | 11/2018 |

OTHER PUBLICATIONS

International Search Report and Written Opinion in counterpart PCT Application No. PCT/CN2020/124487, dated Jan. 27, 2021.
Second Office Action in counterpart Chinese Patent Application No. 202010068136.1, dated Jan. 15, 2021.
Second Office Action in counterpart Chinese Patent Application No. 202010068388.4, dated Feb. 10, 2021.
Second Office Action in counterpart Chinese Patent Application No. 202010068407.3, dated Feb. 23, 2021.
Second Office Action in counterpart Chinese Patent Application No. 202010070486.1, dated Feb. 7, 2021.
Second Office Action in counterpart Chinese Patent Application No. 202010070487.6, dated Mar. 8, 2021.
First Office Action in counterpart Chinese Application No. 202010068136.1, dated Oct. 27, 2020.
First Office Action in counterpart Chinese Application No. 202010068388.4, dated Oct. 29, 2020.
First Office Action in counterpart Chinese Application No. 202010068407.3, dated Nov. 16, 2020.
First Office Action in counterpart Chinese Application No. 202010070486.1, dated Nov. 4, 2020.
First Office Action in counterpart Chinese Application No. 202010070487.6, dated Nov. 4, 2020.
Notification to Grant Patent Right for Invention in counterpart Chinese Patent Application No. 202010068388.4, dated Apr. 28, 2021.
Refusal Decision in counterpart Chinese Patent Application No. 202010070486.1, dated Jul. 14, 2021.
Third Office Action in counterpart Chinese Patent Application No. 202010068407.3, dated May 27, 2021.
Third Office Action in counterpart Chinese Patent Application No. 202010070486.1, dated Apr. 19, 2021.
Third Office Action in counterpart Chinese Patent Application No. 202010070487.6, dated Jun. 23, 2021.

* cited by examiner

INFORMATION SHARING METHOD, DEVICE AND NON-TRANSITORY COMPUTER READABLE STORAGE MEDIUM THEREOF

CROSS REFERENCES

The present application claims the priority of a Chinese patent application filed on Jan. 20, 2020, with an application number 202010070486.1, and titled "INFORMATION SHARING METHOD, TERMINAL, AND READABLE STORAGE MEDIUM", the entire contents of which are incorporated by reference in the present application.

The present application claims the priority of a Chinese patent application filed on Jan. 20, 2020, with an application number 202010068136.1, and titled "INFORMATION SHARING METHOD, TERMINAL, AND READABLE STORAGE MEDIUM", the entire contents of which are incorporated by reference in the present application.

The present application claims the priority of a Chinese patent application filed on Jan. 20, 2020, with an application number 202010068407.3, and titled "INFORMATION SHARING METHOD, TERMINAL, AND READABLE STORAGE MEDIUM", the entire contents of which are incorporated by reference in the present application.

The present application claims the priority of a Chinese patent application filed on Jan. 20, 2020, with an application number 202010070487.6, and titled "INFORMATION SHARING METHOD, TERMINAL, AND READABLE STORAGE MEDIUM", the entire contents of which are incorporated by reference in the present application.

The present application claims the priority of a Chinese patent application filed on Jan. 20, 2020, with an application number 202010068388.4, and titled "INFORMATION SHARING METHOD, TERMINAL, AND READABLE STORAGE MEDIUM", the entire contents of which are incorporated by reference in the present application.

FIELD

The present application relates to the field of information sharing, and in particular to an information sharing method, device, and non-transitory computer readable storage medium.

BACKGROUND

With the popularization of network communication, communication between people is becoming more and more convenient. When people obtain certain information, they may need to share it with others. At present, sharing information always takes a very long time under a poor network connection, results in additional traffic cost if the traffic of a receiving terminal receiving the sharing information is insufficient, or results that the information is failed to be received or only a portion of the information is received because of an insufficient storage space of the receiving terminal. In some situations, the information received cannot be opened by the receiving terminal, or some information cannot be shared (such as WeChat application cannot share voice information).

In addition, at present it also has the following problem: information is shared to the receiving terminal when the user of the receiving terminal is inconvenient to view the sharing information (for example, when the user of the receiving terminal is driving, the user is inconvenient to open his mobile phone to view the sharing information), the user of the receiving terminal is unable to get the content of the sharing information (for example, a language of the sharing information is beyond the language ability of the user of the receiving terminal), after receiving the sharing information, the user of the receiving terminal cannot know whether the information has been processed, resulting in poor communication or other problem. For example, if the sharing information is encrypted, after the user of the receiving terminal downloads the information, the user finds that the information is encrypted during the process of opening the information. In this case, the user needs to obtain a password to open the information, which is very troublesome and inconvenient.

There is no solution to solve those problems, resulting that the sharing information is not intelligently processed before or when selecting the information to be shared. For example, it cannot automatically filter the information or prompt that the information cannot be shared (such as voice), it cannot intelligently convert a data type or a file format of sharable information, and cannot automatically select sharable information, and etc., resulting in a poor user experience.

The above content is only used to help understand the technical solution of the present application, and does not mean that the above content is recognized as prior art.

SUMMARY

The main purpose of this application is to provide an information sharing method, device and non-volatile computer-readable storage medium, aiming to solve the problem of how to share information intelligently.

To achieve the above purpose, the present application provides an information sharing method, the information sharing method includes:

S10: obtaining information to be shared that a sending terminal wants to share to a receiving terminal;

S20: detecting whether the information to be shared meets a preset rule, the preset rule including: the information meeting a first preset condition, and/or, the receiving terminal and/or the sending terminal meeting a second preset condition;

S30: in determining that the information to be shared meets the preset rule, sending the information according to a preset strategy.

In an embodiment, the information to be shared meeting the first preset condition includes at least one of the following:

the information to be shared including at least one preset data type, a data size of the information to be shared being greater than or equal to a preset data threshold, a language of the information to be shared is different from a language of the receiving terminal; and/or, the receiving terminal and/or the sending terminal meeting the second preset condition, including at least one of the following:

a current network speed of the receiving terminal and/or the sending terminal being lower than a preset network speed threshold;

an available traffic of the receiving terminal and/or the sending terminal being lower than a preset traffic threshold;

an available space of the receiving terminal being less than or equal to a size of the information to be shared;

the information to be shared including at least one data type or file format not supported by the receiving terminal;

a distance between the receiving terminal and the sending terminal being less than or equal to a preset distance value;

the receiving terminal and the sending terminal both supporting at least one preset communication mode;

the receiving terminal and the sending terminal both installed with at least one preset application.

In an embodiment, the operation S30 further includes performing at least one of the following processing on the information to be shared: a data type conversion, a file format conversion, a compression, and an encryption.

In an embodiment, the preset strategy includes at least one of the following:

sending the information to be shared through a second application different from a current first application;

sending the information to be shared through a second communication mode different from a current first communication mode; and sending the information to be shared through a second communication card different from a current first communication card.

To achieve the above purpose, the present invention provides an information sharing method, the information sharing method includes:

A10: obtaining processing information, where the processing information is obtained from a sending terminal and/or provided by a receiving terminal;

A11: processing information to be shared according to the processing information to obtain target sharing information; and A12: sending the target sharing information.

In an embodiment, before the operation A10 or in the operation A11, the method further includes: processing a piece of information to be shared that does not meet a preset rule or a sharing condition according to a preset strategy, the preset strategy including at least one of the following: filtering out the piece of information, hiding the piece of information, setting the piece of information to a unselectable state, displaying a logo indicating sharing of the piece of the information not supported, outputting prompt information; and/or, before the operation A11, the method further includes:

selecting the information to be shared according to a selection operation, the selection operation including at least one of the following: voice controlling operation, selection operation on an interface, preset touch gesture on a screen, and preset remote control gesture.

In an embodiment, the processing information includes at least one of the following: a data type, a file type, storage information, traffic information, network speed information, mode information, time information, location information, language information, status information of the receiving terminal, status information of a user of the receiving terminal; and/or, processing the information to be shared includes at least one of the following: performing a data type conversion, performing a file format conversion, performing a content conversion, compressing, encrypting, and choosing a right time to send.

In an embodiment, operation of processing information to be shared according to the processing information includes:

in determining that a data type and/or a file type of the receiving terminal does not meet a preset receiving condition, and/or, in determining that storage information of the receiving terminal does not meet the preset receiving condition, and/or, in determining that traffic information and/or network speed information of the receiving terminal does not meet the preset receiving condition, and/or, in determining that mode information of the receiving terminal does not meet the preset receiving condition, and/or, in determining that time information and/or location information of the receiving terminal does not meet the preset receiving condition, and/or, in determining that language information of the receiving terminal does not meet the preset receiving condition, and/or, in determining that status information of the receiving terminal and/or status information of a user of the receiving terminal does not meet the preset receiving condition, and/or, in determining that traffic information and/or network speed information of the sending terminal does not meet the preset sending condition, and/or, in determining that mode information of the sending terminal does not meet a preset sending condition, processing the information to be shared according to a preset rule.

In an embodiment, before operation A10, the method further including:

determining whether a current mode of the receiving terminal is a preset mode;

in determining that the current mode of the receiving terminal is a preset mode, performing operation A10.

In an embodiment, the method is executed by the sending terminal, and the target sharing information includes at least one of original information to be shared and processed information to be shared; or the method is executed by a server, and the target sharing information includes at least one of the following: original information to be shared, processed information to be shared, a link address, and a logo.

In an embodiment, before operation A10 or in the operation A11, the method further includes:

B10: obtaining filtering information;

B11: processing the information to be shared according to the filtering information.

In an embodiment, the filtering information includes first type filtering information and/or second type filtering information, wherein the first type filtering information is obtained from the sending terminal, and the second type filtering information is provided by the receiving terminal.

In an embodiment, the first type filtering information includes at least one of the following:

authentication information of a current user of the sending terminal, permission information of the information to be shared, available traffic of the sending terminal, current network speed of the sending terminal, and a current mode of the sending terminal; and/or the method further includes at least one of the following:

in determining that the authentication information of the current user of the sending terminal meets a preset requirement, performing operation B11;

in determining that the permission information of the information to be shared meets another preset requirement, performing operation B11;

in determining that available traffic and/or a current network speed of the sending terminal does not meet a preset sending condition, and/or, in determining that the sending terminal is in a preset mode, processing the information to be shared according to a preset rule, wherein the preset mode includes at least one of the following: a profile mode, an intelligent mode, a security mode, a guest mode, a child mode, and an elderly mode.

In an embodiment, the second type filtering information includes at least one of the following:

a data type and/or a file type supported by the receiving terminal, available space and/or available traffic of the receiving terminal, current network speed condition of the receiving terminal, time information and/or location information of the receiving terminal, a current mode of the receiving terminal, system language and/or current application language of the receiving terminal, status information of the receiving terminal and/or status information of a user of the receiving terminal; and/or operation B11 includes:

in determining that the data type supported by the receiving terminal does not meet a preset receiving condition, and/or, in determining that the file type supported by the receiving terminal does not meet a preset receiving condition, and/or, in determining that the available space of the receiving terminal does not meet a preset receiving condition, and/or, in determining that the available traffic of the receiving terminal does not meet a preset receiving condition, and/or, in determining that the current network speed of the receiving terminal does not meet a preset receiving condition, and/or, in determining that the receiving terminal is in a preset profile mode, and/or, in determining that the time information of the receiving terminal does not meet a preset receiving condition, and/or, the location information of the receiving terminal does not meet a preset receiving condition, and/or, in determining that the receiving terminal is in a preset mode, and/or, in determining that the system language of the receiving terminal is different from a system language of the sending terminal, and/or, in determining that a sharing application language of the receiving terminal is different from a sharing application language of the sending terminal, and/or, in determining that the status information of the receiving terminal and/or the status information of the user of the receiving terminal does not meet a preset receiving condition, processing the information to be shared according to a preset rule.

In an embodiment, before operation B10, the method further includes:

determining whether a currently selection mode is a preset mode;

in determining that the currently selection mode is a preset mode, performing operation B10.

In an embodiment, the method further includes:

obtaining at least one piece of relevant information for selecting information to be shared, the relevant information defining requirements including at least one of data type requirement, file type requirement, presentation form requirement, content requirement, and display location information requirement;

automatically selecting information to be shared that meets the requirements according to the relevant information.

In an embodiment, the processing information is association information of the information to be shared, and the association information includes at least one of the following: a current mode of the receiving terminal or a current mode of the sending terminal, sharing records of the sending terminal and/or, sharing records of the receiving terminal.

In an embodiment, before the operation A10, the method further includes:

determining whether the current mode of the sending terminal is a preset mode; and in determining that the current mode of the receiving terminal is a preset mode, performing operation A10.

In an embodiment, operation of processing information to be shared includes at least one of the following: performing a data type conversion, and translating, and performing the data type conversion including converting from a first data type to a second data type different from the first data type.

In an embodiment, the data type conversion is performed by the sending terminal, a server, or the receiving terminal, and in determining that the data type conversion is performed by the server or the receiving terminal, the data type conversion is performed by the server or the receiving terminal according to data type conversion parameters provided by the sending terminal.

In an embodiment, the data type conversion parameters includes at least one of the following: a data type and/or a file format of the information to be shared, a data type and/or a file format of processed information to be shared, time requirements, space requirements; and/or, the data type conversion parameters are determined according to selection operations of a user or system settings.

In an embodiment, operation A12 further includes: in determining that there is a piece of information in the target sharing information that cannot be shared by a current first application, utilizing a second application to share the piece of information, the second application being different from the current first application.

In an embodiment, the method further includes:

D10: obtaining the target sharing information;

D11: detecting whether the target sharing information is the same as first sharing information, wherein the first sharing information is original information to be shared;

D12: in determining that the first sharing information is different from the original information to be shared, obtaining description information corresponding to the target sharing information, and sending the target sharing information and the description information; and/or, D13: in determining that the first sharing information is the same as the original information to be shared, only sending the target sharing information.

In an embodiment, before operation of sending the target sharing information and description information, the method includes:

determining whether a current mode of the receiving terminal is a preset mode;

in determining that the current mode of the receiving terminal is a preset mode, sending the target sharing information and description information.

In an embodiment, the description information includes at least one of the following:

a data type of the target sharing information, a file format of the target sharing information, a size of the target sharing information, time information for processing the first sharing information, and execution body information for processing the first sharing information.

In an embodiment, the execution body information includes at least one of the following: sending terminal information, server information, and receiving terminal information.

In an embodiment, operation D10 includes:

D101: obtaining the first sharing information;

D102: obtain processing information corresponding to the first sharing information, and detect whether the processing information meets preset conditions;

D103: in determining that the processing information corresponding to the first sharing information does not meet preset conditions, determining whether an execution body is the sending terminal;

D104: in determining that the execution body is not the sending terminal but a server, taking the first sharing information as the target sharing information, thereby the execution body performs corresponding processing on the target sharing information according to the processing information.

To achieve the above purpose, the present application provides an information sharing method, the method includes the following operations:

D20: receiving sharing information, the sharing information including at least one of the following: first sharing information, second sharing information, description information, a link address of the first sharing information and/or the second shared information and the description information on a server, wherein the second sharing information is obtained by processing the first sharing information; and D21: in determining that the sharing information includes the description information, performing a corresponding processing according to the description information.

In an embodiment, the description information includes at least one of the following:

a data type of target sharing information, a file format of the target sharing information, a size of the target sharing information, time information for processing the first sharing information, and execution body information for processing the first sharing information, wherein the target sharing information includes the first sharing information and/or the second sharing information.

In an embodiment, operation D21 further includes:

in determining that the sharing information is the target sharing information, the corresponding processing includes at least one of the following: outputting the first sharing information, outputting the second sharing information, outputting the explanation information, outputting a processing identifier, and outputting interception information; or in determining that the sharing information is the link address, the corresponding processing includes outputting prompt information, and the prompt information includes at least one of the following:

the first sharing information corresponding to the link address, content preview of the first sharing information, and the second shared information corresponding to the link address, content preview of the second sharing information, and the description information.

In an embodiment, the content preview is displayed in a display window, and operation D21 further includes:

receiving the sharing information according to a user's selection operation on the display window.

To achieve the above purpose, the present application also provides an device, the device includes: a memory, a processor, and an information sharing program stored on the memory and executable on the processor, when the information sharing program is executed by the processor, the information sharing method described above is carried out.

To achieve the above purpose, the present application further provides a non-transitory computer-readable storage medium, a computer program is stored on the non-volatile computer-readable storage medium, and when the computer program is executed by a processor, the information sharing method described above is carried out Information to be shared can be detected to determine whether the information to be shared meet preset rule, and in determining that the preset rule is met, the information to be shared can be sent according to a preset policy. The preset policy may be sending the information to be shared through another application different from a current application, through another communication mode different from a current communication mode, or through another communication card different from a current communication card. Or, the preset strategy may further include processing the information to be shared using processing information to obtain target sharing information, and then sending the target sharing information. The processing may be using the filtering information to filter the information to be shared to obtain the target sharing information. By filtering, the information not suitable for sharing can be filtered out, only the information suitable for sharing can be shared. Or the information not suitable for sharing can be further processed. For example, compressing and encrypting the information not suitable for sharing to make it suitable for sharing. The processing may also be using association information or relevant information to process the information to be shared to obtain the target sharing information, which prevents the user of the receiving terminal from being inconvenient to receive the information or unable to be understood the information. After processing, the target sharing information may be the same as the original information to be shared, or be different from the original information to be shared. When the target sharing information is the same as the original information to be shared, only the target sharing information is sent, and When the target sharing information is different from the original information to be shared, the target sharing information and description information are sent, so that the receiving terminal outputs a corresponding prompt according to the description information.

The information sharing method, device and non-transitory computer readable storage medium thereof provided by the embodiment of the present application solves some problems that occur at present when sharing information by intelligently processing the information to be shared and sending the information to be shared, making information sharing more intelligent, safer, more convenient, more effective and in some cases, save users' costs.

The implementation, functional characteristics and advantages of the present application will be further described in conjunction with the embodiments and with reference to the drawings.

DETAILED DESCRIPTION OF THE EMBODIMENTS

It should be understood that the specific embodiments described herein are only used to explain the present application, and are not used to limit the present application.

At present, there exists that information cannot be shared or a sharing result is not what's expected (for example, a process of sharing information takes a long time).

A first embodiment to a fifth embodiment of the present application provide solutions to enable information to be shared to be intelligently sent to conform to what the user is expected (such as with a rapid sharing process).

Figure 1:
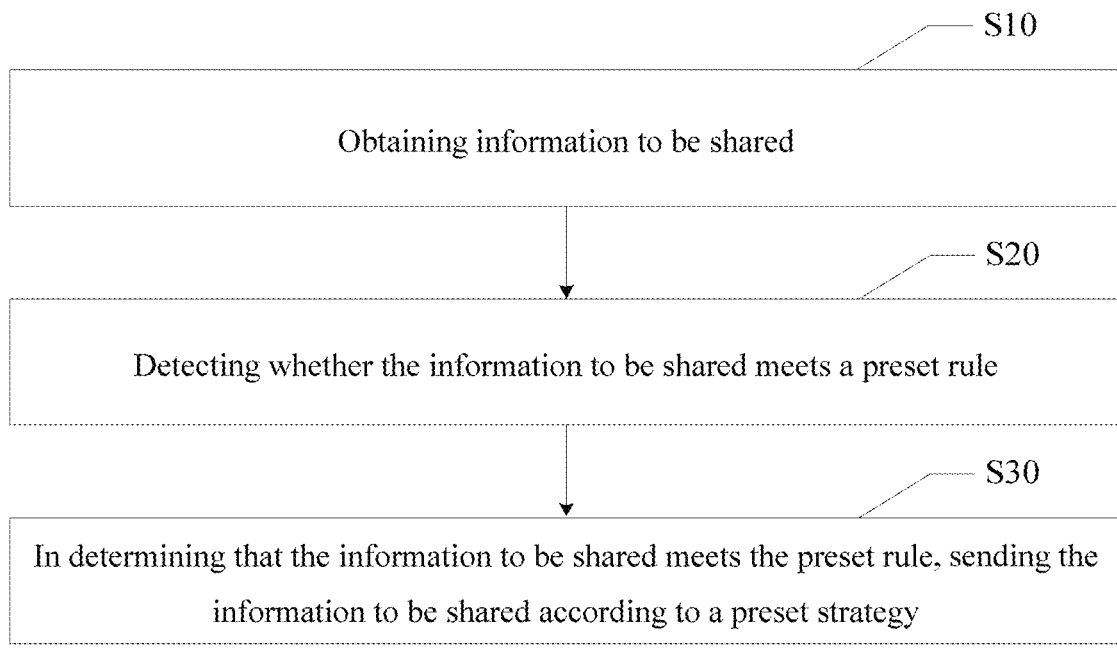
FIG. 1 is a schematic flowchart of a first embodiment of an information sharing method of the present application.

Referring to FIG. 1, in the first embodiment of the information sharing method of the present application, the information sharing method includes the following operations.

In operation S10, information to be shared is obtained.

The information to be shared can be some preset information of a terminal, be information downloaded by a user from the Internet (such as images, application software, etc.), be information input by the user on the terminal, or be information on an application of the terminal (such as news, application update information, etc.). The information to be shared can also be local information of the terminal (such as local files, etc.), or be sharing records on a social software (such as chat logs, shared information, etc.).

The above information to be shared may be one or more of audios, videos, animations, images, documents, files, texts, sharing records, writing notes, web page information, and web addresses.

In operation S20, it is detected whether the information to be shared meets a preset rule.

Not all information can be shared by a user of a sending terminal, and not all information is wanted by a user of a receiving terminal. Specifically, when the user of the sending terminal shares information to be shared, it needs to consider whether the information to be shared meets a first preset condition, or whether the receiving terminal and/or the sending terminal meets a second preset condition.

In operation S30, in determining that the information to be shared meets the preset rule, the information to be shared is sent according to a preset strategy.

In determining that the information to be shared meets the first preset condition, or the receiving terminal and/or the sending terminal meets the second preset condition, the information to be shared needs to be processed according to the first preset condition, or the information to be shared is sent in a manner different from a current manner according to the second preset condition.

In this embodiment, through operations S10: information to be shared is obtained, S20: it is detected whether the information to be shared matches a preset rule, and S30: in determining that the information to be shared matches the preset rule, the information to be shared is sent according to a preset strategy, specifically, a data type, a data size of the information to be shared and whether a language of the information to be shared is consistent with a language of the receiving terminal are checked, and a data type conversion, a file format conversion, a compression, an encryption, and/or a translation is applied to the information to be shared which is found to match the preset rule. In addition, whether a current network speed of the receiving terminal and/or a current network speed of the sending terminal, available traffic of the receiving terminal and/or available traffic of the sending terminal, available space of the receiving terminal, and file types supported by the receiving terminal meet sharing conditions of a first application and/or a first communication mode is checked, in determining not meeting the sharing conditions of the first application and/or the first communication mode, a second application and/or a second communication mode is used to share the information to be shared, so that the information to be shared is intelligently processed according to the preset rule during the sharing process, and so that the processed information to be shared can be presented to the user in the most needed way. The purpose of intelligently sending information to be shared is realized.

Further, in a second embodiment of the information sharing method of the present application, based on the above first embodiment, the information to be shared meets the first preset condition, including at least one of the followings:

the information to be shared including at least one preset data type;

a data size of the information to be shared being greater than or equal to a preset data threshold;

a language of the information to be shared being different from a language of the receiving terminal.

The information to be shared including at least one preset data type

When the data type of the information to be shared includes at least one of text, voice, audio, video, image, animation, and file, the data type conversion of the information to be shared may be performed.

In the information sharing process, the sending terminal generally sends information, and the receiving terminal receives the information. When receiving information, there may be certain situations causing the receiving terminal to be unable to obtain the content of the received information, or it is inconvenient for the receiving terminal to obtain the content of the received information, or the content of the received information cannot be understood by the user of the receiving terminal due to language barrier. In one embodiment, it can convert the texts to an image (for example, when a text is "Hi", it is easy to understand, the purpose of the user of the sending terminal sharing such text is to greet the user of the receiving terminal). Likewise, contrary to the conversion of texts to images, it can also convert an image to texts, texts and files (including only texts) to voices or audios. At present, converting texts to voices is already very mature, such as, listening to novels daily. Likewise, it can also convert voices to texts. In addition, texts and files can also be converted to each other. In addition, it can also convert videos to audios and images. It's easy to understand that videos themselves are composed of audios and images. Likewise, it can convert animations to audios and images.

Figure 2:
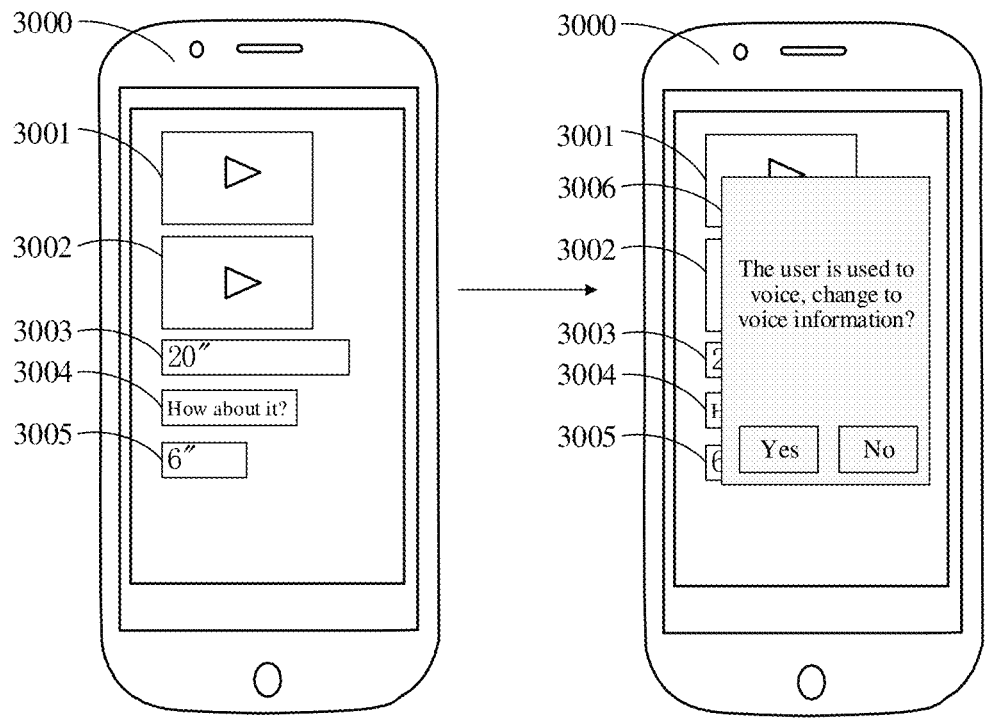
FIG. 2 is a schematic diagram of an interface scene in a second embodiment of the information sharing method of the present application.

For data type conversions between voices, audios, texts, and images, how to convert there between can be determined by habits of the user of the receiving terminal. The habits of the user of the receiving terminal can be obtained through chat records in a chat application of the receiving terminal. Taking converting texts to voices as an example, referring to FIG. 2, 3000 indicates a sending terminal, and 3001, 3002, 3003, 3004, and 3005 indicate some pieces of information in a chat log. Among them, 3004 indicates a piece of text information. When the user selects 3004, a dialog box indicated by 3006 is automatically popped up, to prompt the user of the sending terminal and provide processing options including automatic text-to-voice conversion and cancellation of sending.

For the conversions between either two of the video, audio, image, and animation, a data type conversion can be performed according to a need of the user of the sending terminal. For example, if the user of the sending terminal only wants to share a certain segment of a video, or even only an image or audio data of the segment, there is no need to share the whole video at this time. Therefore, it can perform a data type conversion to the video, and provide editing functions after the conversion is completed, thus to select or crop the obtained images or audio data as needed.

For the data type conversion between texts and files, texts are very convenient for users to browse, and files can prevent content therein from leaking. They all have their own advantages and disadvantages. When sharing information, users can specifically refer to content of texts or files to decide whether to perform a data type conversion.

The data size of the information to be shared being greater than or equal to a preset data threshold When sharing information and the data size is greater than or equal to a certain value, the information to be shared needs to be processed for subsequent sharing.

In an embodiment, the preset data threshold can be determined according to the daily traffic usage of the user of the sending terminal. To more intelligently decide whether to send the information to be shared and whether to restrict the user of the sending terminal from sending the information to be shared, it can take daily traffic usages of the user of the sending terminal within a certain period of time, for example an average daily traffic of the user of the sending terminal is 500 MB within one month, when the data size of the information to be shared is greater than or equal to 500 MB, it can prompt the user to perform a data type conversion, a file format conversion or a compression on the information to be shared.

In addition, we know that a data size of a video or a animation is very large as compared to an audio or images. When the data size of the information to be shared is very large, it can prompt the user to perform a data type conversion, a file format conversion or a compression processing on the information to be shared. The data type conversion can refer to the above process of converting video to images and audio, and will not be repeated here. Data of a same data type can have multiple file formats, and the sizes of the data in different file formats are generally different. Taking the lossless format and the standard format of audio data as an example, the sizes of a same song in these two file formats are different, and even differ by several times. For example, the size of a song in the lossless format is 20 MB, but the size of the same song in the standard format is only 3 MB. Therefore, it can perform a file format conversion to reduce the data size of the information to be shared. Except the above file format conversion, a more direct way to reduce the data size of the information to be shared is to compress the information to be shared. The compressed information is shared and original data can be recovered by decompression afterwards, without affecting the quality of the shared information. The above file format conversions are generally not applied to the information after being converted and then shared. The receiving terminal directly receives and presents the information to be shared after the file format conversion to the user of the receiving terminal. When the data size of the information to be shared is very large, it generally means that the information to be shared is more important. For more important information, the user of the sending terminal can encrypt it before sharing it.

A language of the information to be shared being different from a language of the receiving terminal When the language of the information to be shared is different from the language of the receiving terminal, the information to be shared is translated.

Specifically, when the user of the sending terminal shares information, since the source of the information is very wide, text content of the information shared by the sending terminal may not be understood by the user of the receiving terminal. After sharing the information to the user of the receiving terminal, the user of the receiving terminal needs to translate the information first if the user wants to browse the information, which is very troublesome. Therefore, before sharing information, it is necessary to obtain language information of the receiving terminal. The language information can be the system language of the system of the receiving terminal, the language set in an application, and/or the language of the chat logs. Of course, the most convenient way is to directly obtain the system language of the system of the receiving terminal because the system language set by the user must be understood by the user.

In this embodiment, by judging whether the information to be shared meets the first preset condition, a processing strategy is given to ensure that the information shared to the receiving terminal is what the user of the receiving terminal wishes to receive, and will not cause that the receiving terminal is unable to receive or the information received by the receiving terminal cannot be understood, and the presentation form of the information meets the habits of the user of the receiving terminal, thereby realizing the intelligence and humanization of information sharing.

In a third embodiment of the present application, based on the above-mentioned first embodiment, the receiving terminal and/or the sending terminal meeting the second preset condition includes at least one of the following:

a current network speed of the receiving terminal and/or the sending terminal being lower than a preset network speed threshold;

available traffic of the receiving terminal and/or the sending terminal being lower than a preset traffic threshold;

an available space of the receiving terminal is less than or equal to the size of the information to be shared; and the information to be shared including at least one data type or file format not supported by the receiving terminal.

Figure 3:
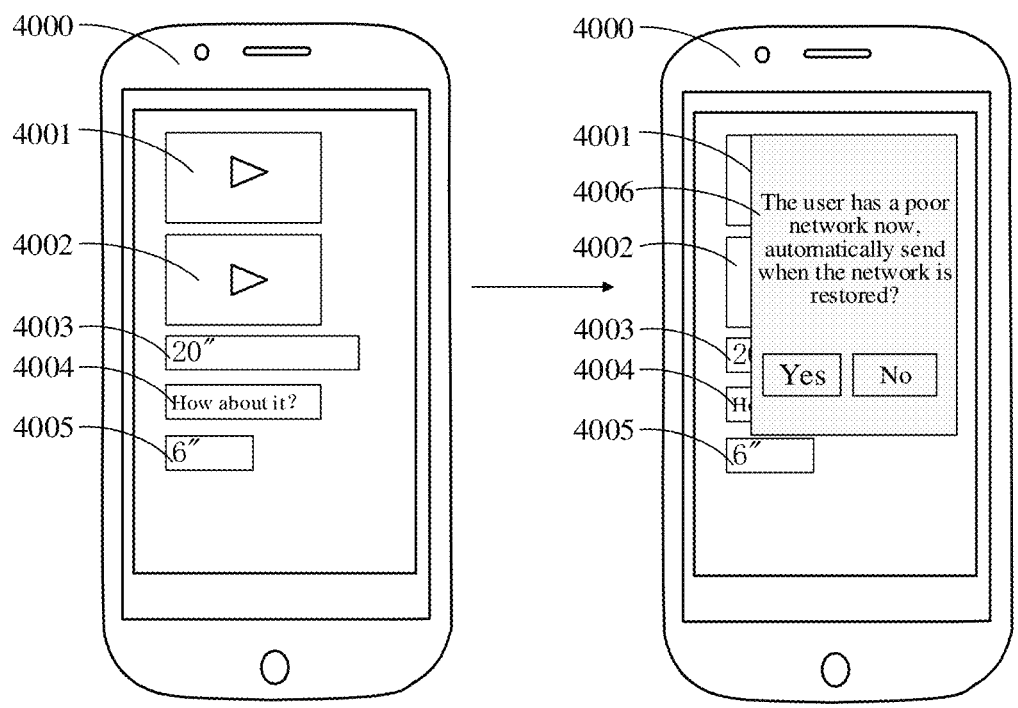
FIG. 3 is a schematic diagram of an interface scene in a third embodiment of the information sharing method of the present application.

A current network speed of the receiving terminal and/or the sending terminal being lower than a preset network speed threshold In an embodiment, when the size of the information to be shared that the user wants to share is much larger than a data size that can be received currently by the receiving unit per unit time, for example, the size of the information to be shared that the user wants to share is 1000 MB, and the current network speed of the receiving terminal can only reach 10 KB/s, it is conceivable that the sharing will be meaningless. Therefore, in the information sharing process, it is necessary to obtain the size of the information when the user chooses to share the information, and at the same time to obtain the network speed of the receiving terminal. When the network speed of the receiving terminal is much lower than a network speed required to share the information to be shared, it can use compression to ensure that the size of the information to be shared meets the network speed. It can also prompt the user that the current network condition is poor and it may take some time to send the information, and recommend the user to allow the sending terminal to automatically send the information when the network condition does not affect the sending. For example, referring to FIG. 3, 4000 indicates a sending terminal, 4001, 4002, 4003, 4004, and 4005 indicate some pieces of information in a chat log, and 4001 and 4002 indicate video files. When the user of the sending terminal selects 4001, because a data size of the video file is relatively large, but the current network condition at the receiving terminal are poor, a pop-up box indicated by 4006 is popped up, and options including automatic sending and canceling automatic sending and returning to the sharing interface are provided so that the user of the sending terminal can still share. In addition, considering that compression will affect the quality of the information to be shared, for example, when the information to be shared contains a video, for files of data type such as a video, compression will damage the original file, such as reduce a definition, distort sounds of the video, and etc. Therefore, there is a limit to compress the information to be shared. For this, it can compress the information to be shared to obtain target sharing information, and provide the user with a function to preview the target sharing information. It is up to the user to decide whether to send the target sharing information, if the user deems that the content has been excessively distorted by compression, the user can reselect the information to be shared, such as deleting the selected content. In addition, in the same way, there may be cases where the network speed of the sending terminal does not meet the sending requirements. Before sending the information to be shared, the network speed of the sending terminal also needs to be taken into account. When the network speed of the sending terminal is much less than that required for sharing the information to be shared, the above processing method can be applied.

Available traffic of the receiving terminal and/or the sending terminal being lower than a preset traffic threshold Specifically, the current traffic usage of common mobile phone users is monthly traffic usage, such as subscribing 10 GB of data traffic per month. If the user's traffic usage exceeds the subscribed amount in a month, it will cause a lot of charges. Thus, before sending the information to be shared, it needs to obtain the traffic information of the receiving terminal, that is, the available traffic of the receiving terminal. If the available traffic of the receiving terminal is not enough to receive the information to be shared, similarly, the larger size contents of the information to be shared can be compressed, that is, the larger size contents can undergo a format conversion in order to reduce a size of the information to be shared to a smaller size. Of course, the whole of the information to be shared can be compressed. In addition, considering that the compression will affect the quality of the information to be shared, for example, when the information to be shared contains a video, for files of the data type such as a video, compression will damage the original file, resulting in a reduction in a definition of the video and sound distortion, and etc. Therefore, there is a limit to compress the information to be shared. For this, it can compress the information to be shared to obtain target sharing information, and provide the user with a function to preview the target sharing information. It is up to the user to decide whether to send the target sharing information, if the user deems that the content has been excessively distorted by compression, the user can reselect the information to be shared, such as deleting the selected content. In addition, in the same way, there may also be insufficient available traffic for the sending terminal. Before sending the information to be shared, the available traffic of the sending terminal also needs to be taken into account. When the available traffic of the sending terminal is insufficient to send the information to be shared, the above compression can be applied.

An available space at the receiving terminal being less than or equal to the size of the information to be shared Specifically, for storage information of the receiving terminal, it is necessary to take into account whether the size of the information to be shared exceeds the available local storage space of the receiving terminal, so, it is necessary to obtain the size of the information to be shared before sending the information to be shared, and at the same time, to obtain the available local storage space of the receiving terminal. If the available local storage space of the receiving terminal is less than the size of the information to be shared, for example, if the size of the information to be shared is 300 MB, and the available local storage space is only 200 MB, it then compresses the larger size contents (such as the contents greater than 100 MB) of the information to be shared, that is, performs a format conversion, to obtain information to be shared with smaller size. Of course, the whole information to be shared can be compressed. In addition, considering that compression will affect the quality of the information to be shared, for example, when the information to be shared contains a video, for files of the data type such as a video, compression will damage the original file, such as reduce a definition, distort sounds of the video, and etc. Therefore, there is a limit to compress the information to be shared. For this, it can compress the information to be shared to obtain target sharing information, and provide the user with a function to preview the target sharing information. It is up to the user to decide whether to send the target sharing information, if the user deems that the content has been excessively distorted by compression, the user can reselect the information to be shared, such as deleting the selected content.

The information to be shared including at least one data type or file format not supported by the receiving terminal Specifically, the information to be shared that the user wants to share may has various data types, such as audios, videos, animations, images, documents, files, texts, and etc. The information to be shared under most situations, the receiving terminal supports reading the information to be shared, but for some non-smart phones, it may not support reading video files. Therefore, it is unnecessary for the user of the sending terminal to still send the contents that the receiving terminal does not support to the receiving terminal. Therefore, when sharing information, it is necessary to firstly obtain the data type supported by the receiving terminal. In addition, the user may have such a requirement to share a video file, but because the video file is particularly large, resulting that the sharing process takes a long time and requires a large storage space to store the video file. Further the user may just want a certain segment in the video file, or audio in the video file, or images in the video file. For the case that the user wants to share a certain segment in the video file, it can provide a video cropping function, and the user can select the segment at any time point and lasting for any length of time as needed. For the case the user wants to share is the audio in the video file, it can provide the user with a function of data type conversion. The data in the information to be shared can be converted into audio through data type conversion. An audio cropping function can also be provided. The user can select an audio segment at any time point and lasting for any length of time as needed. For the case the user wants to share is the images in the video file, similarly, it can only keep the images and remove the audio from the video file. Similarly, the user can select an image at any time point in the video file.

Regarding the file types of the information to be shared, one situation is that the information to be shared contains contents in a non-frequently used file format, such as video data including MPEG (Motion Picture Experts Group) format, but many mobile phones only support frequently used file formats. For the file formats that are not frequently used, it generally requires a specific software for format conversion, such as the format factory. But in daily life, users generally do not use such kind of professional software tool, so, before sharing information, it needs to determine whether the receiving terminal supports a file format of the information to be shared. If the receiving terminal does not support the file format of the information to be shared, there is no need to share the contents in such file format. Therefore, during sharing, it can format the contents in the file format that the receiving terminal does not support at the sending terminal and convert the contents to any format supported by the receiving terminal. Another situation is that for some privacy or confidential files, encryption is usually required during the information sharing process. Similarly, for sharing information is relatively convenient and fast, many times some company internal files (usually documents) are also shared through common software, such as through the social software WeChat. To ensure the security of the files in the sharing process, it needs to encrypt the information to be shared with the data type being document.

In this embodiment, by determining whether the receiving terminal and/or the sending terminal meets the second preset condition, a targeted preset strategy is adopted to process the information to be shared to ensure that the sharing of the information to be shared is conducted on the premise of meeting the sharing needs of the user of the sending terminal, thereby realizing the intelligence and humanization of information sharing.

In a fourth embodiment of the information sharing method of the present application, based on the first embodiment described above, the preset strategy includes at least one of the following:

sending the information to be shared through a second application different from a current first application;

sending the information to be shared through a second communication mode different from a current first communication mode;

sending the information to be shared through a second communication card different from a current first communication card.

Sending the information to be shared through a second application different from a current application The second application includes social applications, e-mail application, SMS, MMS, RCS applications, and file transfer applications. Of course, the current first application also includes social applications, e-mail applications, SMS, MMS, RCS applications, and file transfer applications. In the information sharing process, the current first application and the second application are different from each other. For example, when the current first application is an email application, the second application may be another application except the email application, such as MMS. When using a social application, such as WeChat, for WeChat does not support sharing certain types of information, such as voice, and WeChat does not support sharing files with a data size greater than 10 MB, in this case, it can share the information or files through other applications, such as the email application. Specifically, during sharing, it can use the information to be shared to filter the applications that support the information sharing, recommend the user to use the most frequently used applications, it can hide the remaining applications that support sharing, and only provide an "other sharing manners" button for the user to share information.

Sending the information to be shared through a second communication mode different from a current first communication mode The second communication mode includes WIFI (Wireless Fidelity, the network of which is open and insecure), Bluetooth, and NFC (Near field communication, a transmission distance of which is very short, but the encryption is strong, there is no data interception, and more secure). Of course, the current first communication mode also includes WIFI, Bluetooth, and NFC, but in the information sharing process, the first communication mode and the second communication mode used are different from each other. For example, when the current first communication mode adopts WIFI, the second communication mode can adopt a communication mode other than WIFI, such as NFC. Specifically, WIFI is relatively difficult to guarantee information security due to its openness, but it basically has no distance limitation between the receiving terminal and the sending terminal. Like the Ethernet, WIFI can achieve global interconnection and the data transmission speed is very fast. Although a transmission distance of Bluetooth is short, Bluetooth does not require a network, and will not generate costs of data traffic or other traffic, and the data transmission speed is very fast. The transmission distance requirement of NFC is the highest, NFC devices can only transmit data within 10 cm or less, but NFC has strong encryption, and there will be no data interception, thus NFC is more secure. Documents with high confidentiality can be shared using NFC. The user can select a communication mode according to his needs, or it can automatically select a communication mode by settings in advance.

Figure 4:
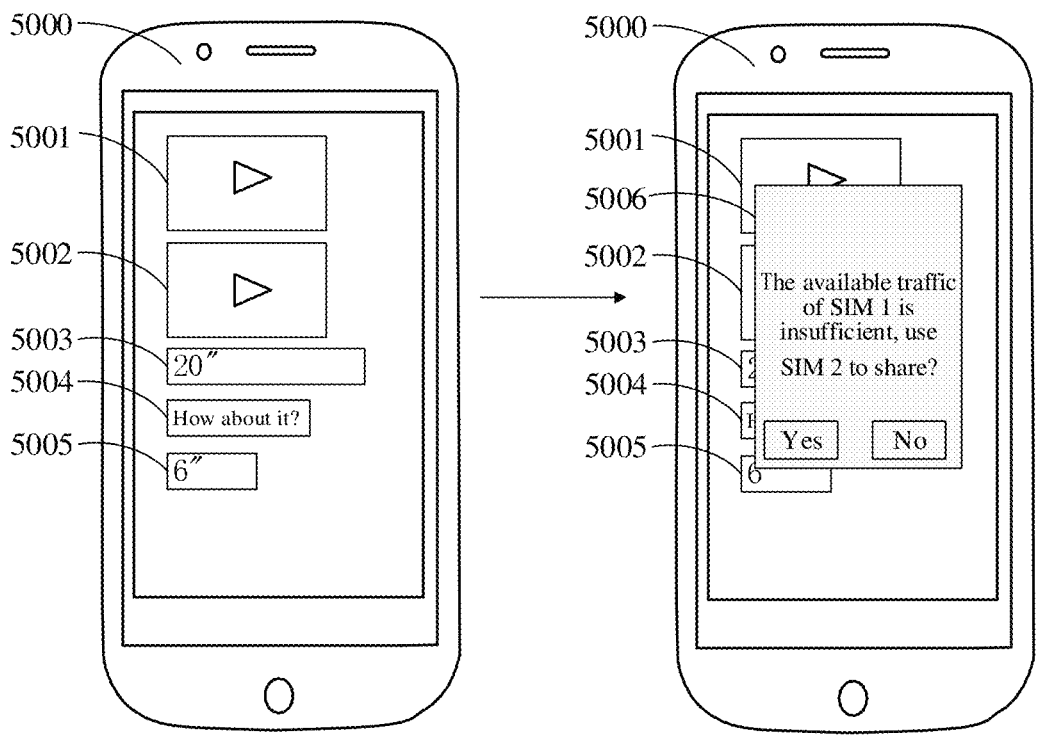
FIG. 4 is a schematic diagram of an interface scene in a fourth embodiment of the information sharing method of the present application.

Sending the information to be shared through a second communication card different from a current first communication card Communication cards include physical SIM cards and virtual SIM cards. The advantage of using a SIM card for sharing is that the SIM card can be used to share basically at anytime and anywhere, without liking restrictions as that other communication modes such as WIFI, Bluetooth, and NFC have. For a virtual SIM card, it can be used as long as there is an idle card slot (no physical SIM card is inserted). For example, referring to FIG. 4, 5000 indicates a sending terminal, 5001, 5002, 5003, 5004, and 5005 indicate some pieces of information that can be shared in a chat log, and 5006 indicates a prompt message output by the sending terminal when a size of the information selected by the user is greater than available traffic of a current SIM card 1. Both SIM card 1 and SIM card 2 can be physical SIM cards or virtual SIM cards. The prompt message provides an option to switch between the SIM cards.

In this embodiment, multiple applications that support sharing and multiple communication modes are provided to share the information that cannot be shared through a current application or a current communication mode. The user of the sending terminal can also choose a communication mode used for information sharing according to a distance between the receiving terminal and the sending terminal and actual needs. The intelligence and humanization of sharing information is thereby realized.

In the fifth embodiment of the information sharing method of the present application, based on the above-mentioned first embodiment, second embodiment or third embodiment, before the operation of sending the information to be shared, the method further includes:

saving the information to be shared as at least one temporary file.

Rather than directly sending the target sharing information, it can save the target sharing information as a temporary file; or save each piece of the information of the target sharing information as a temporary file, and then put all the temporary files together to be packaged as a temporary file or folder. Which one of the saving manners is used is up to the user's choice or determined according to presetting.

It can choose to compress the temporary file or folder to reduce a size of the transmission data, or encrypt the temporary file or folder to increase the security during transmission.

In addition, after the temporary file or folder is sent to the receiving terminal, it can also choose to delete the temporary file or folder to reduce a storage space used.

Specifically, when the data type conversion process is assigned to be executed by the sending terminal, the sending terminal directly packages the information to be shared into a temporary file or folder. When the data type conversion process is assigned to be executed by a server, the sending terminal can package the information to be shared into a temporary file or folder before sending the information to be shared to the server, or directly send the information to be shared to the server. After the data type conversion is completed by the server, the target sharing information is packaged into a temporary file or folder before it is sent to the receiving terminal. When the data type conversion process is assigned to be performed by the receiving terminal, likewise, the sending terminal can package the information to be shared into a temporary file or folder, the server sends the temporary file or folder directly to the receiving terminal after receiving the temporary file or folder from the sending terminal, or the sending terminal sends the information to be shared to the server and the server receives the information to be shared, packages the information to be shared into a temporary file or folder, and then send the temporary file or folder to the receiving terminal.

In this embodiment, the target sharing information is packaged as a temporary file or folder to facilitate compression, encryption, and transmission of the target sharing information. The purposes of improving the transmission speed of the target sharing information and the security of the transmission process are achieved.

Figure 5:
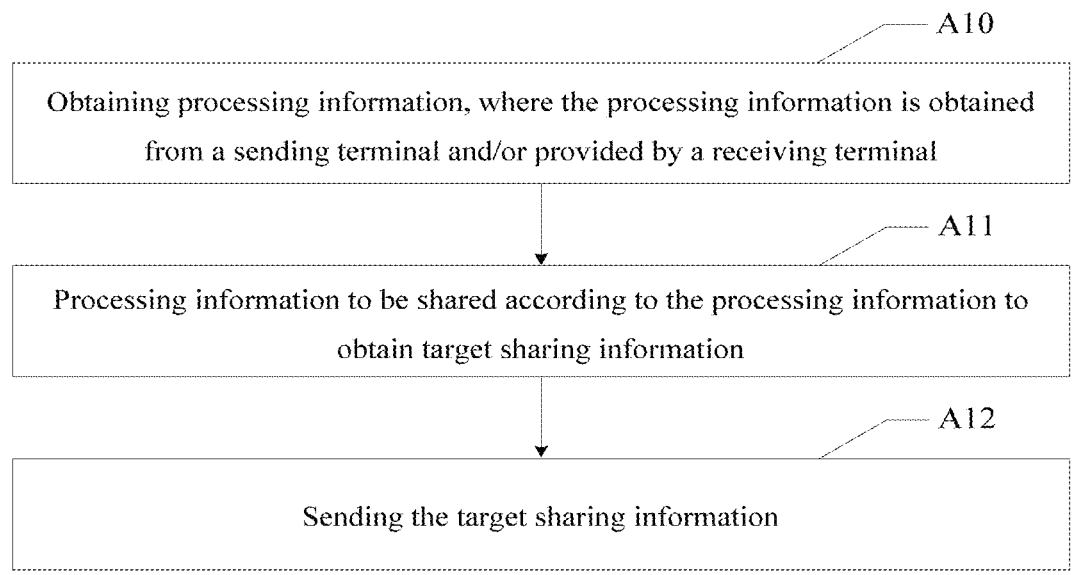
FIG. 5 is a schematic flowchart of a sixth embodiment of the information sharing method of the application.

Sixth to tenth embodiments of the information sharing method of the present application are provided below. The sixth to tenth embodiments involve processing the information to be shared using processing information to obtain the target sharing information and send the target sharing information, so that the processing of the information to be shared is more intelligent. Referring to FIG. 5, in the sixth embodiment of the information sharing method of the present application, the method includes the following operations.

In operation A10, processing information is obtained, the processing information being obtained from the sending terminal and/or provided by the receiving terminal.

During information sharing, there may be various reasons for the sending terminal and/or the receiving terminal to fail to complete the information sharing process, and those reasons may be avoided when the information to be shared undergoes some processing to enable the information sharing process to be completed. The processing information can be obtained from the sending terminal, or be provided by the receiving terminal, or come from the both.

In addition, not all information can be shared, and the information that the user of the sending terminal wants to share needs to meet certain preset rules or sharing conditions.

Specifically, for the case where the information that the user of the sending terminal wants to share does not meet the preset rules or sharing conditions, for example a current user of the sending terminal that is not an owner or an authorized user of the owner of the sending terminal shares information (chooses information to be shared or sends information to be shared), especially when the information chosen or sent by the current user contains a file, and more especially when the file is an encrypted file, it is necessary to prevent the current user from performing information sharing. A way to identify an identifier of a current user can be the biological recognition (such as fingerprint information or face information), passphrases, or passwords input, etc. For identifying a user's identifier based on face information, a terminal can detect whether a current user is the owner, and directly provides the current user the information sharing information function without displaying a prompt information when the current user is the owner and passes the verification. When the current user is not the owner, the current user is prompted that users not the owner are prohibited from sharing information, which thus not affect the user's normal use. For another example, if the information the user of the sending terminal wants to share is an article, a video, or the like that is copyrighted, the information is not allowed to be shared until the user is authorized by the author of the information. For still another example, the information involving the privacy of others, or violating national laws and regulations or social morals is not allowed to be spread. Similarly, the terminal system preset information, the information downloaded by the user from the Internet, the information entered by the user on the terminal, and the information on the terminal application are not allowed to be shared when the above conditions are not met. In addition, there is a possibility that the information itself is not supported to be shared by the application of the sending terminal or not supported to be received by the application of the receiving terminal. For example, voice information in WeChat is not supported to be shared.

Figure 6:
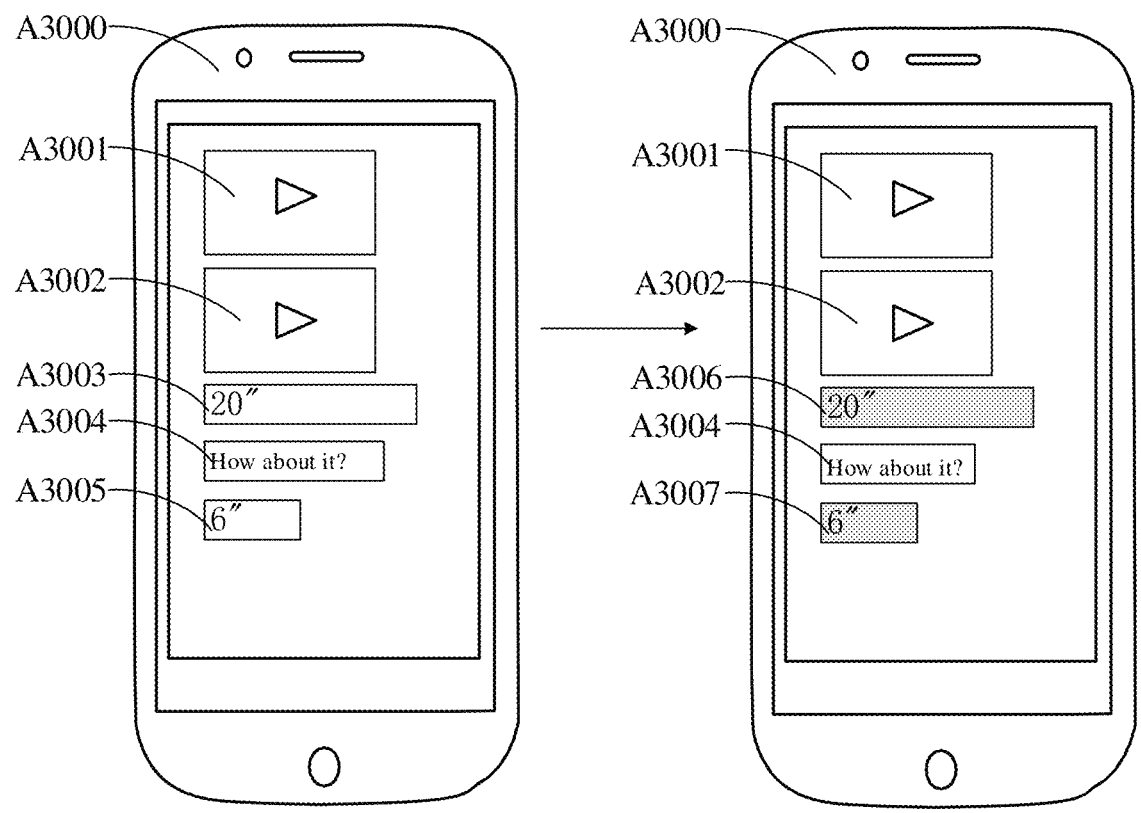
FIG. 6 is a schematic diagram of an interface scene of operation A10 of the information sharing method of the present application.
Figure 7:
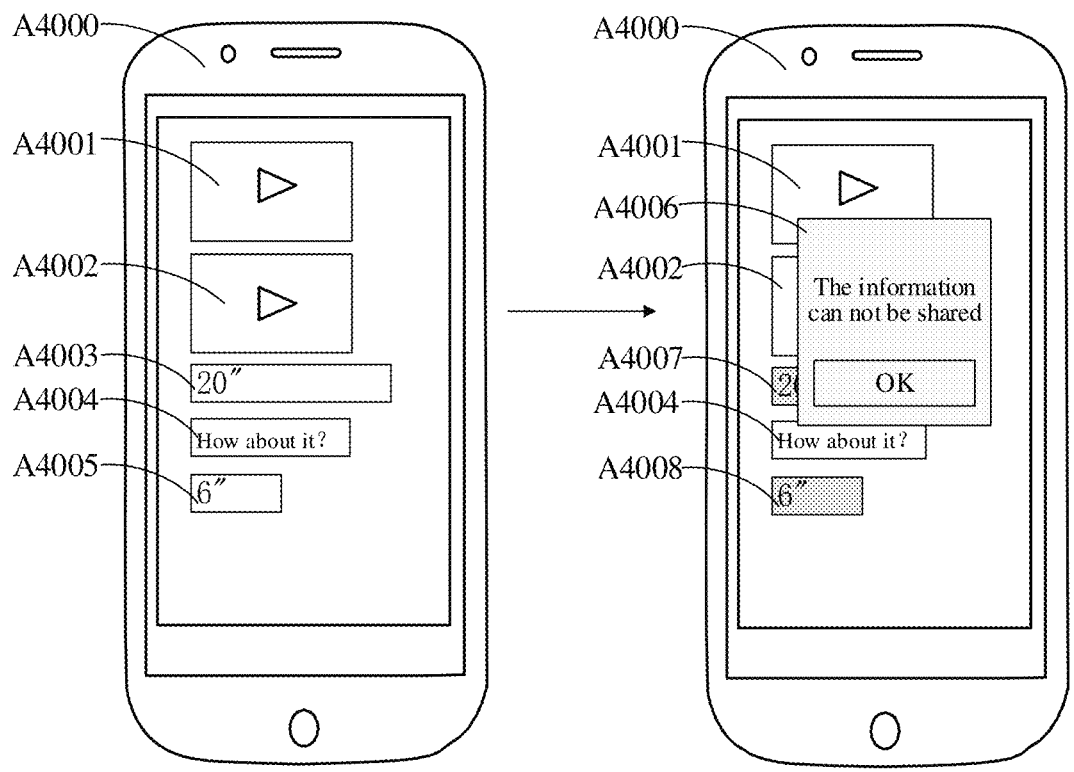
FIG. 7 is a schematic diagram of another interface scene of operation A10 of the information sharing method of the present application.

For those pieces of information that cannot be shared among the information to be shared, it can filter out or hide some or all of those pieces of information that cannot be shared according to the processing information, or make those pieces of information unselectable and give a prompt (such as a chat information area is set to be unselectable, referring to FIG. 6, A3000 indicates a sending terminal, A3001, A3002, and A3004 indicate some pieces of information that can be shared in a chat log, A3003 and A3005 indicate some pieces of information that cannot be shared in the chat log, and A3006 and A3007 indicate views that chat information areas of the pieces of information that cannot be shared are set to be unselectable. When the user selects A3003, the chat information areas indicated by A3006 and A3007 are set to be unselectable), or a mark indicating that the corresponding information cannot be shared is displayed next to those pieces of information (such as a text prompt, refer to FIG. 7, A4000 indicates a sending terminal, A4001, A4002, and A4004 indicate some pieces of information that can be shared in a chat log, A4003 and A4005 indicate some pieces of information that cannot be shared in the chat log, A4007, A4008 indicate views that chat information areas of those pieces of information that cannot be shared are set to be unselectable, and A4006 indicates a prompt box that pops up after the user selects A4003 or A4005, prompting that the selected information cannot be shared and providing a confirmation button, or, it does not provide the confirmation button, and the prompt box automatically disappears after a certain period of time (such as 1s), or a prompt message is output through a dialog box, or those pieces of information that cannot be shared is compressed or encrypted (for example the information of file type is encrypted). When all the information to be shared is not input by the user (such as voice messages), and the information selected by the user to be shared is sharable, remaining information that cannot be shared will also be filtered out or hidden, or be made unselectable and give a prompt (for example the chat information area of which is set to be unselectable), or it displays a corresponding mark (such as a text prompt) beside those pieces of information to indicate that those pieces of information cannot be shared, or it outputs a prompt message through a dialog box, or compresses or encrypt (such as encrypting the information of file type) those pieces of information that cannot be shared.

In operation A11, the information to be shared is processed according to the processing information to obtain the target sharing information.

The information to be shared is what the user of the sending terminal wants to share. Which information the user wants to share can be selected by the user on the terminal. There are many ways for the user to select the information that he wants to share. For example, the user can obtain the information through voices to control the terminal, or directly select the information on a terminal interface, or obtain the information through preset touch gestures or through remote control gestures.

After the above information selection process, the information to be shared is processed according to the processing information to obtain the target sharing information that meets the conditions of the receiving terminal. The processing method can be data type conversion, file format conversion, content conversion, compression, or encryption.

In operation A12, the target sharing information is sent.

In this embodiment, through operations A10: acquiring processing information, wherein the processing information being acquired from the sending terminal and/or provided by the receiving terminal, A11: processing the information to be shared according to the processing information to obtain the target sharing information, and A12: sending the target sharing information, when processing the information that the user of the sending terminal wants to share, it processes the information to be shared according to the processing information obtained from the sending terminal and/or provided by the receiving terminal, making it possible to share the information which is not sharable before the processing. The purpose of intelligently processing the information to be shared is realized.

Further, in a seventh embodiment of the information sharing method of the present application, based on the above-mentioned sixth embodiment, the processing information includes at least one of the following: data type, file type, storage information, traffic information, network speed information, mode information, time information, location information, language information, status information of the receiving terminal, and status information of the user of the receiving terminal.

Data Type, File Type

If the data type and/or the file type supported by the receiving terminal does not meet preset receiving conditions, that is, the receiving terminal does not support a data type or a file type of the information to be shared, the information to be shared is processed according to a first preset rule.

Specifically, the information to be shared that the user wants to share may be of various data types, such as being audio, video, animation, image, document, file, text, and etc. In most cases, the receiving terminal supports reading the information to be shared, but for some non-smart phones, it may not support reading video files. Therefore, it is unnecessary for the user of the sending terminal to still send the contents that the receiving terminal does not support to the receiving terminal. Therefore, when sharing information, it is necessary to first obtain the data type supported by the receiving terminal. In addition, the user may have such a requirement to share a video file, but because the video file are particularly large, the sharing process takes a long time and requires a large storage space to store. Further the user may just want a certain segment in the video file, or audio in the video file, or images in the video file. For the case that the user wants to share a certain segment in the video file, it can provide a video cropping function, and the user can select the segment at any time point and lasting for any length of time as needed. For the case the user wants to share is the audio in the video file, it can provide the user with a function of data type conversion. The video in the information to be shared can be converted into audio through data type conversion. An audio cropping function can also be provided. The user can select an audio segment at any time point and lasting for any length of time as needed. For the case the user wants to share is the images in the video file, similarly, it can only keep the images and remove the audio from the video file. Similarly, the user can select an image at any time point in the video file.

Regarding the file types of the information to be shared, one situation is that the information to be shared contains content in a non-frequently used file format, such as video data including MPEG (Motion Picture Experts Group) format, and many mobile phones only support frequently used file formats. For the file formats that are not frequently used, it generally requires a specific software for format conversion, such as the format factory. But in daily life, users generally do not use such kind of professional software tool, so, before sharing information, it needs to determine whether the receiving terminal supports a file format of the information to be shared, if the receiving terminal does not support the file format of the information to be shared, there is no need to share the contents in such file format. Therefore, during sharing, it can format the contents in the file format that the receiving terminal does not support at the sending terminal and convert the contents to any format supported by the receiving terminal. Another situation is that for some privacy or confidential files, encryption is usually required during the information sharing process. Similarly, for sharing information is relatively convenient and fast, many times some company internal files (usually documents) are also shared through common software, such as through the social software WeChat. To ensure the security of the files in the sharing process, it needs to encrypt the information to be shared with the data type being document.

Storage Information

For the storage information of the receiving terminal, it is necessary to consider whether a size of the information to be shared by the user exceeds available local storage space of the receiving terminal, so it is necessary to obtain the size of the information to be shared and the available local storage space of the receiving terminal before sending the information to be shared.

In determining that the storage information of the receiving terminal does not meet the preset receiving conditions, that is, in determining that the available space of the receiving terminal is less than the size of the information to be shared that the user of the sending terminal wants to share, the information to be shared is processed according to a second preset rule.

Figure 8:
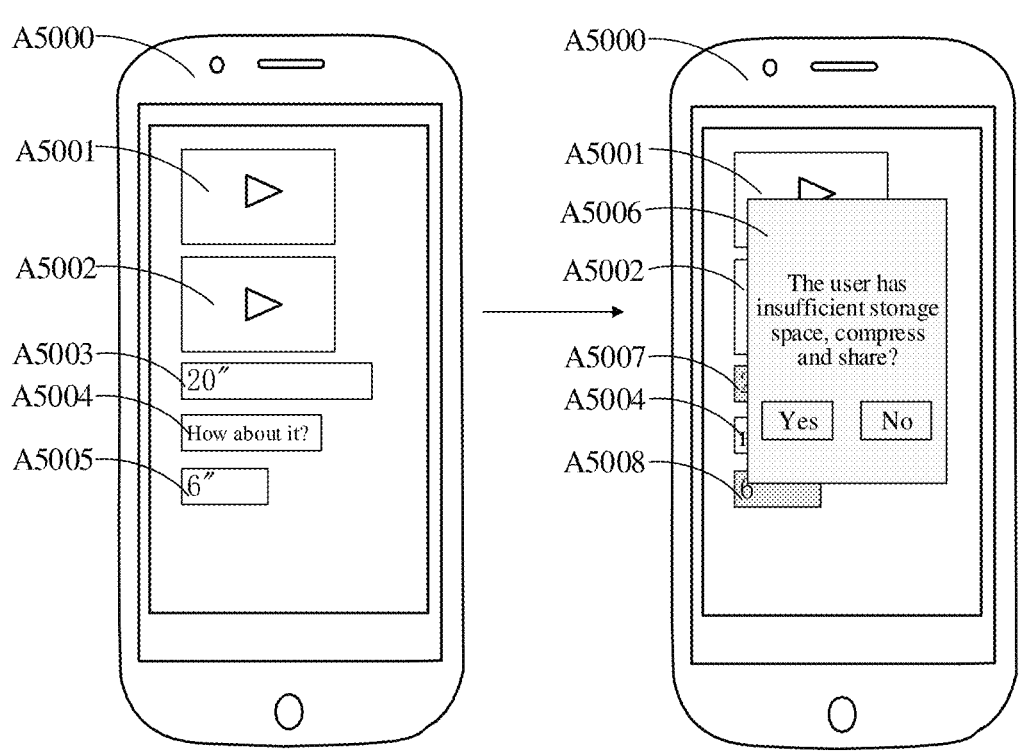
FIG. 8 is a schematic diagram of an interface scene in a seventh embodiment of the information sharing method of the present application.

Specifically, in determining that the available local storage space of the receiving terminal is less than the information to be shared that the user wants to share, the larger size pieces of the information to be shared are compressed, that is, the larger size pieces undergo a format conversion processing, to reduce a size of the information to be shared, of course it can also compress the whole information to be shared. In addition, considering that compression will affect the quality of the information to be shared, for example, when the information to be shared contains a video, for files of the data type such as a video, compression will damage the original files, such as reduce a definition, distort sounds of the original video, and etc. Therefore, there is a limit to compress the information to be shared. For this, it can compress the information to be shared to obtain the target sharing information, and provide the user with a function to preview the target sharing information. It is up to the user to decide whether to send the target sharing information. If the user deems that the content has been excessively distorted by compression, the user can reselect the information to be shared, such as delete the selected content, etc. For example, it prompts that a size of the current available space of the receiving terminal is smaller than the size of the information to be shared that the user of the sending terminal wants to share for 300 MB, and it recommends to cancel a video with a size of 310 MB from sharing and continue sharing the remaining contents. For example, referring to FIG. 8, A5000 indicates a sending terminal, A5001, A5002, and A5004 indicate some pieces of information that can be shared in a chat log, A5003 and A5005 indicate some pieces of information that cannot be shared in the chat log, A5007 and A5008 indicate views that chat information areas of the pieces of information that cannot be shared in the chat log are set to be unselectable, and A5006 indicates a prompt box that pops up after the user selects A5001 or A5002, prompting that the shared contact has insufficient storage space, and asks the user of the sending terminal whether to compress the information to be shared, and providing a confirmation button and a cancel button.

Traffic Information, Network Speed Information

The current traffic usage of common mobile phone users is monthly traffic usage, such as subscribing 10 GB of data traffic per month. If the user's traffic usage exceeds the subscribed amount in a month, it will cause a lot of charges. Before sending the information to be shared, it needs to obtain the traffic information of the receiving terminal, that is, the available traffic of the receiving terminal.

In determining that the traffic information and/or network speed information of the receiving terminal does not meet the preset receiving conditions, that is, in determining that an amount of the available traffic of the receiving terminal is smaller than the size of the information to be shared the user of the sending terminal want to share and/or the size of the information to be shared is much larger than a data size that can be received currently by the receiving terminal per unit time, the information to be shared is processed according to a third preset rule.

Specifically, if the available traffic of the receiving terminal is insufficient to receive the information to be shared, the large size pieces of the information to be shared can be compressed, that is, the large size pieces undergo a format conversion processing, to reduce a size of the information to be shared. Of course, it can also compress the whole information to be shared. In addition, considering that compression will affect the quality of the information to be shared, for example, when the information to be shared contains a video, for files of the data type such as a video, compression will damage the original files, such as reduce a definition, distort sounds of the original video, and etc. Therefore, there is a limit to compress the information to be shared. For this, it can compress the information to be shared to obtain the target sharing information, and provide the user with a function to preview the target sharing information. It is up to the user to decide whether to send the target sharing information. If the user deems that the content has been excessively distorted after compression, the user can reselect the information to be shared, such as delete the selected content, etc. For example, it prompts that a size of the available traffic of the receiving terminal is smaller than the size of the information to be shared that the user of the sending terminal wants to share for 300 MB, and it recommends to cancel a video with a size of 310 MB from sharing and continue sharing the remaining contents.

Figure 9:
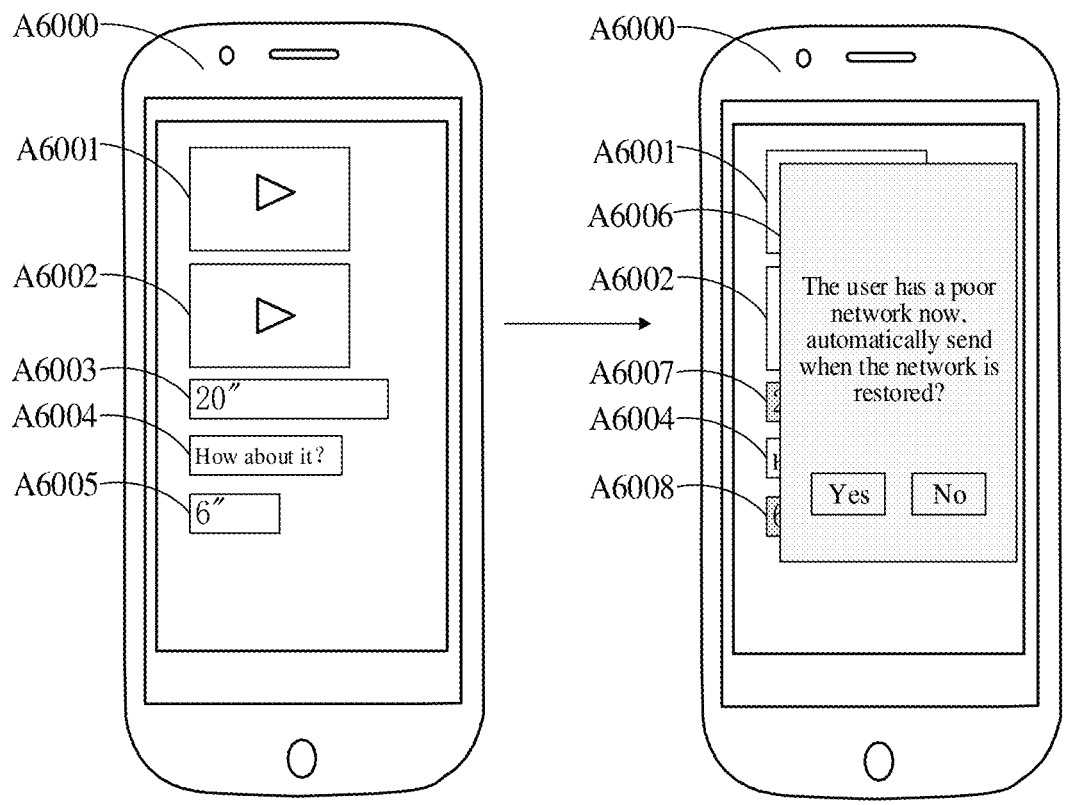
FIG. 9 is a schematic diagram of another interface scene in the seventh embodiment of the information sharing method of the present application.

In addition, when the size of the information to be shared that the user wants to share is much larger than the data size that can be currently sent per unit time by the receiving terminal, for example, the size of the information to be shared that the user wants to share is 1000 MB, and the current network speed of the receiving terminal can only reach 10 KB/s, it is conceivable that the sharing will be meaningless. Therefore, in the information sharing process, it is necessary to obtain the size of the information when the user chooses to share the information, and at the same time to obtain the network speed of the receiving terminal. When the network speed of the terminal is much lower than the network speed required by the user of the sending terminal to share the information to be shared, it can use compression to ensure that the size of the information to be shared meets the network speed. It can also prompt the user that the current network condition is poor and it may take some time to send the information, and recommend that user to allow the sending terminal to automatically send the information when the network condition does not affect the sending. As shown in FIG. 9, A6000 indicates a sending terminal, A6001, A6002, and A6004 indicate some pieces of information that can be shared in a chat log, A6003 and A6005 indicate some pieces of information that cannot be shared in the chat log, A6007 and A6008 indicate views that chat information areas of the pieces of information that cannot be shared are set to be unselectable, and A6006 is a prompt box that pops up after the user selects A6001 or A6002, prompting that the network condition of the shared contact is poor, and asking the user of the sending terminal whether to automatically send the information to be shared after the shared contact's network is restored, and providing a confirmation button and a cancel button. In addition, considering that compression will affect the quality of the information to be shared, for example, when the information to be shared contains a video, for files of the data type such as a video, compression will damage the original files, such as reduce a definition, distort sounds of the original video, and etc. Therefore, there is a limit to compress the information to be shared. For this, it can compress the information to be shared to obtain the target sharing information, and provide the user with a function to preview the target sharing information. It is up to the user to decide whether to send the target sharing information. If the user deems that the content has been excessively distorted by compression, he can reselect the information to be shared, such as delete the selected content.

In addition, in the same way, there may be a situation where the available traffic of the sending terminal is insufficient and/or a network speed of the sending terminal does not meet the sending requirements. Before sending the information to be shared, the available traffic and/or the network speed of the sending terminal must also be taken into account. A processing manner referring to the above-mentioned situations where the traffic information and/or network speed information of the receiving terminal does not meet the preset receiving conditions is adopted, and details of which are not described herein.

If the traffic information and/or network speed information of the sending terminal does not meet the preset sending conditions, that is, if a size of the available traffic of the sending terminal is smaller than a size of the information to be shared by the user of the sending terminal and/or the size of the information to be shared is much larger than a data size that can be sent currently by the sending terminal per unit time, the information to be shared is processed according to an eighth preset rule.

Specifically, when the available traffic of the sending terminal is insufficient to send the information to be shared, the above-mentioned compression process may be used. When the network speed of the sending terminal is much lower than a network speed required by the user to share the information to be shared, the same processing manner referring to the above-mentioned situations of the receiving terminal can be adopted.

Mode information, time information, location information, language information, status information of the receiving terminal, status information of the user of the receiving terminal If mode information of the receiving terminal does not meet the preset receiving conditions, the information to be shared is processed according to a fourth preset rule.

Specifically, for the mode information, the user of the sending terminal can set a mode of the sending terminal as needed. For example, when the sending terminal is in a guest mode, the current user of the sending terminal is generally not the owner, that is, the owner considers privacy protection or other situations, and sets the terminal (such as a mobile phone) to be in the guest mode when the terminal is lent to others, thereby to prevent the others from revealing the owner's privacy during use. In addition, when the sending terminal is in a safe mode, if the information chosen to be shared by the user of the sending terminal is a file (such as a video, a document, an image, or the like), there may be leakage of confidential files and personal privacy. In addition, when the sending terminal is in a child mode, generally at this moment, the user of the sending terminal is not the owner but the owner's child or another junior, the user of the sending terminal may be unfamiliar with the mobile phone, and in such case, a series of misoperation may occur and may trigger a sharing process. It is understandable under such a situation, the user of the sending terminal does not need to share information. In addition, the sending terminal may also be in an elderly mode. Similarly, the user of the sending terminal at this moment is generally the owner's elder, and is unfamiliar with the current mobile phone. When the elder uses the mobile phone, it will also produce a series of misoperation that lead to a sharing process.

Similarly, the user of the receiving terminal can set a mode of the receiving terminal as needed. For example, when the receiving terminal is in a guest mode, the user of the receiving terminal is generally not the owner, that is, the owner considers privacy protection or other situations, and sets the terminal (such as a mobile phone) to be in the guest mode when the terminal is lent to others, thereby to prevent the others from revealing the owner's privacy during use. Therefore, in the guest mode, if the information chosen to be shared by the user of the sending terminal is a locally stored file (such as a video, a document, an image, or the like), the user can be prompted that the receiving terminal is currently in the guest mode, continuing to send may reveal privacy and ask the user of the sending terminal whether to still share the information or not, or prompt the user to encrypt the information to be shared. In addition, when the receiving terminal is in a safe mode, if the information chosen to be shared by the user of the sending terminal is a file (such as a video, a document, an image, or the like), it can prompt the user that the receiving terminal is in a safe mode and prohibit such information sharing, or prompt the user to encrypt the information to be shared. In addition, when the receiving terminal is in a child mode, the user of the receiving terminal is generally not the owner at this moment but the child of the owner or another junior. It is understandable it is not largely another but the owner that the user of the sending terminal wants to share the information to be shared with. It can remind the user of the sending terminal that the current receiving terminal is in a child mode, or it prompts the user to encrypt the information to be shared. In addition, the receiving terminal may also be in an elderly mode. Similarly, the user of the receiving terminal at this time is generally the owner's elder. It is understandable it is not largely another but the owner that the user of the sending terminal wants to share the information to be shared with. It can prompt the user of the sending terminal that the receiving terminal is currently in the elderly mode, or prompt the user to encrypt the information to be shared.

In addition to the above modes, due to different needs, the receiving terminal may also be in a navigation mode. When the receiving terminal is in the navigation mode, it is obviously inconvenient to receive information. At this time, the sharing of the sending terminal will pose a threat to the driving safety of the user of the receiving terminal. In addition, when the receiving terminal is in a conference mode, the user of the receiving terminal is also inconvenient to receive information. Therefore, in the information sharing process, it is necessary to obtain a current mode of the receiving terminal before the user of the sending terminal sends the information to be shared, thus to avoid disturb the user of the receiving terminal when the user of the receiving terminal is inconvenient to receive information. Therefore, when it is acquired that the receiving terminal is in the navigation mode or the conference mode, the user of the sending terminal may be prompted that the receiving terminal is currently in the navigation mode or the conference mode.

In addition, at present most mobile phones' profile modes are still manually set by the user. However, in some scenarios, a mobile phone can automatically enter a profile mode according to a current usage scenario. For example, when entering a game application, the mobile phone will automatically enter a game mode. Therefore, regardless of whether the above-mentioned guest mode, safety mode, child mode, and elderly mode are manually set or automatically entered by the mobile phone, those modes all belong to the category of profile modes.

In addition, it can be known from the above that the mobile phone can automatically enter a corresponding profile mode according to the current usage scenario, and the mobile phone can also be set to be in a corresponding smart mode to enter the corresponding profile mode in a faster and smarter way. Considering the problem of a degree of intelligence in the smart mode, it may affect the normal use of the mobile phone by the user at the beginning, so a switch for entering the smart mode can be set in a developer mode or a debugging mode.

In addition, in addition to that the mobile phone can be set to a preset profile mode, it can also put a certain application of the mobile phone alone in a preset profile mode, and the mobile phone being in the preset mode may not affect the application being in the preset mode, for example, the mobile phone is in a smart mode, and the application is in a normal mode. Certain preset modes of the mobile phone may also affect a preset mode of the application, for example, if the mobile phone is in a traffic saving mode, the application cannot be in the normal mode. Specifically, whether a profile mode of the mobile phone has a higher priority than the profile mode of the application can be preset in the system of the mobile phone. When the receiving terminal is in a preset mode, that is, which profile mode of the mobile phone being in and/or which profile mode of an application being in determines whether to execute operation A10 to process the information to be shared.

In addition, for the sending terminal, if the mode information of the sending terminal does not meet the preset sending conditions, the information to be shared is processed according to a ninth preset rule.

Specifically, the user of the sending terminal can set a mode of the sending terminal as needed. For example, when the sending terminal is in a guest mode, the current user of the sending terminal is generally not the owner, that is, the owner considers privacy protection or other situations, and sets the terminal (such as a mobile phone) to be in the guest mode when the terminal is lent to others, thereby to prevent the others from revealing the owner's privacy during use. Therefore, in the guest mode, if the information the user of the sending terminal chooses to share is a locally stored files (such as a video, a document, an image, etc.), the user can be prompted to be in the guest mode, and that such information sharing is prohibited. In addition, when the sending terminal is in a safe mode, if the information the user of the sending terminal chooses to share is a file (such as a video, a document, an image, etc.), the user can be prompted to be in the safe mode and that such information sharing is prohibited. In addition, when the sending terminal is in the child mode at the current time, the user of the sending terminal is generally not the owner but the owner's child or another junior. The current user of the sending terminal may be unfamiliar with the mobile phone, and in such case, a series of misoperation may occur and may trigger a sharing process. It is understandable under such a situation, the user of the sending terminal at this moment does not have the need to share information. It can prompt the user it is in the child mode and information sharing is prohibited. In addition, the sending terminal may also be in an elderly mode. Similarly, the current user of the sending terminal is generally an elder of the owner, and is not familiar with the current mobile phone. When the elder uses the mobile phone, it will also produce a series of misoperation that lead to a sharing process, but the user of the sending terminal at this moment does not have the need to share information. It can prompt the user it is in the elderly mode and information sharing is prohibited.

In addition, at present most mobile phones' profile modes are still manually set by the user. However, in some scenarios, a mobile phone can automatically enter a profile mode according to a current usage scenario. For example, when entering a game application, the mobile phone will automatically enter a game mode. Therefore, regardless of whether the above-mentioned guest mode, safety mode, child mode, and elderly mode are manually set or automatically entered by the mobile phone, those modes all belong to the category of profile modes.

In addition, it can be known from the above that the mobile phone can automatically enter a corresponding profile mode according to the current usage scenario, and the mobile phone can also be set to be in a corresponding smart mode to enter the corresponding profile mode in a faster and smarter way. Considering the problem of a degree of intelligence in the smart mode, it may affect the normal use of the mobile phone by the user at the beginning, so a switch for entering the smart mode can be set in a developer mode or a debugging mode.

In addition, in addition to that the mobile phone can be set to a preset profile mode, it can also put a certain application of the mobile phone alone in a preset profile mode, and the mobile phone being in the preset profile mode may not affect the application being in the preset profile mode, for example, the mobile phone is in a smart mode, and the application is in a normal mode. Certain preset modes of the mobile phone may also affect a preset mode of the application, for example, if the mobile phone is in a traffic saving mode, the application cannot be in the normal mode. Specifically, whether a profile mode of the mobile phone has a higher priority than a profile mode of the application can be preset in the system of the mobile phone. When the sending terminal is in a preset mode, that is, which profile mode of the mobile phone being in and/or which profile mode of an application being in determines whether to execute operation A10 to process the information to be shared according to the third processing rule.

In determining that the time information and/or location information of the receiving terminal does not meet the preset receiving conditions, that is, in determining that a region of the receiving terminal is different from a region of the sending terminal and/or in determining that a time zone of the receiving terminal is different from a time zone of the sending terminal, the information to be shared is processed according to a fifth preset rule.

Specifically, for time information and location information, the user of the receiving terminal may be in the same time zone as the user of the sending terminal, or may be in a time zone different from that of the user of the sending terminal. In the case where the two are in the same zone, the user of the sending terminal generally considers based on the current time whether it is suitable for sharing information; and in the case where the two are in different time zones, for example, the user of the sending terminal is in the east eight time zone, and the user of the receiving terminal is in the west eight time zone, at this time, it is obviously unsuitable for the user of the sending terminal neglects to consider the current time information of the user of the receiving terminal, for example, if the current time of the user of the sending terminal is two o'clock in the afternoon, but the current time of the user of the receiving terminal is two o'clock in the morning, obviously, it is not suitable for sharing information at this time. Therefore, if the user of the receiving terminal and the user of the sending terminal are not in the same time zone, the sending terminal needs to prompt the user of the sending terminal with the current time information of the user of the receiving terminal, and prompts the user of the sending terminal whether it is suitable for the user of the receiving terminal to receive the information to be shared at current time.

In addition, the user of the sending terminal may be in the same region as the user of the receiving terminal, or may be in a region different from a region of the user of the receiving terminal. In the case where the two are in different regions, the user of the sending terminal needs to consider whether the location information of the user of the receiving terminal is suitable for receiving the information to be shared at current time. For example, the user of the receiving terminal may be on vacation, and it is obviously inappropriate to share work-related information to the user of the receiving terminal. Therefore, when sharing information, the sending terminal prompts the user of the sending terminal with a geographic location of the user of the receiving terminal, and prompts the user of the sending terminal whether it is suitable for the user of the receiving terminal to receive the information to be shared at current time.

In determining that the language information of the receiving terminal does not meet the preset receiving conditions, that is, in determining that a system language of the receiving terminal is different from a system language of the sending terminal and/or an application language of the receiving terminal is different from an application language of the sending terminal, the information to be shared is processed according to a sixth preset rule.

Specifically, if the user of the receiving terminal cannot understand the content of the information shared by the user of the sending terminal to the user of the receiving terminal due to language barrier, sharing information under such a situation is meaningless. Therefore, during information sharing, the system language and/or current application language of the receiving terminal can be obtained (generally, obtaining the current application language is for instant messaging software, because such software each usually has a dedicated terminal client, the acquisition of system language is aimed at the situation where the receiving terminal does not need to use a dedicated client to receive information during the information sharing process). After the system language and/or the current application language of the receiving terminal is obtained, if the system language and/or the current application language of the receiving terminal is different from a language of the information to be shared by the sending terminal, the user of the sending terminal is prompted and a function to convert the language of the information to be shared into the system language of the receiving terminal and/or the current application language is provided.

In determining that status information of the receiving terminal and/or status information of the user of the receiving terminal does not meet the preset receiving conditions, that is, in determining that the status information of the receiving terminal and/or the status information of the user of the receiving terminal does not support information sharing, the information to be shared is processed according to a seventh preset rule.

Specifically, for the status information of the receiving terminal, the receiving terminal's power is too low due to the user forgetting to charge or being unable to charge currently, and the power is not enough to complete the information sharing process. At this time, it is obvious not appropriate if the sending terminal still sends the information to be shared. Similarly, for the sending terminal, the power also affects the process of sharing information. For the status information of the user of the receiving terminal, when the user of the receiving terminal is in motion, such as the user of the receiving terminal is currently using a software recording an exercise process (running speed, running time, etc.), it is inconvenient for the user of the receiving terminal to receive information at current time.

In addition to the above prompts and encryption processing, the sending terminal can also automatically send the information to be shared when the sending terminal exits a mode that does not support information sharing or when the user of the receiving terminal is convenient to receive information.

In this embodiment, through operations A10: obtaining processing information, the processing information being obtained from the sending terminal and/or provided by the receiving terminal, A11: processing the shared information according to the processing information to obtain target sharing information, A12: sending the target sharing information, when sharing information, the information to be shared can be filtered, hidden, set to be in an unselectable state, displayed with a mark indicating sharing not supported, or output with a prompt to avoid that the information cannot be opened by the user of the receiving terminal, or avoid sharing the information when the receiving terminal has insufficient storage space or insufficient available traffic, according to the processing information obtained from the sending terminal and/or provided by the receiving terminal. The purpose of intelligently processing the information to be shared is realized.

Further, in an eighth embodiment of the information sharing method of the present application, based on the seventh embodiment, before operation A10, the method further includes determining whether a current mode is a preset mode.

According to the user's selection, it is determined whether an information selection mode of selecting information to be shared of the current terminal (such as a mobile phone) is in a smart mode or in a normal mode when to share information. A switch of the smart mode can only appear when the mobile phone is in the developer mode or in the debugging mode defined in the system settings. The switch can also be built into an application (such as in the laboratory function of the application). In addition, because at the current, a mobile phone can automatically enters a profile mode according to the current usage scenario, one of the profile modes of the mobile phone can be the smart mode (for example, when the user opens a game application, the mobile phone automatically enters a game mode), and when the user of the mobile phone performs a sharing operation, the information selection mode of the mobile phone will automatically enter the smart mode. Specifically, when the mobile phone is in the smart mode, the mobile phone can automatically enter a traffic saving mode according to certain conditions (such as when the available traffic is insufficient, the mobile phone automatically enters the traffic saving mode) or the safe mode (such as when the information to be shared contains files, the mobile phone automatically enters the safe mode). When the information selection mode is in the smart mode, operation A10 is performed. When the information selection mode is in the normal mode, a follow-up processing is performed according to rules of the system or a corresponding application, such as according to rules of sharing function that comes with WeChat.

Of course, even when the information selection mode is in the normal mode, the method can be chose for execution.

In determining that the current mode is a preset mode, performing operation A10.

In determining that the current mode is a preset mode, operation A10 is executed. In addition, the above method may be executed by the sending terminal or the server. A specific execution manner can be determined according to the user's selection operation or the system settings.

In this embodiment, whether to perform the information sharing after operation A10 is determined by judging whether the current profile mode of the mobile phone is any one of the smart mode, the normal mode, the traffic saving mode, and the safe mode, and the above modes can be selected by the user to turn on or off, thereby making information processing more intelligent.

Further, in a ninth embodiment of the information sharing method of the present application, based on the eighth embodiment, the information sharing method further includes at least one of the following:

in determining that the method is executed by the sending terminal, the target sharing information includes at least one of original information to be shared and processed information to be shared.

The data processing capability of current smart phones is already excellent, so this method can be directly executed on the sending terminal, and the sending terminal processes the information to be shared according to the processing information obtained from the sending terminal and/or provided by the receiving terminal. But the use of a mobile phone may be affected due to additional data processing that may cause lags in the mobile phone. When the method is executed at the sending terminal, the information to be shared is processed at the sending terminal according to the processing information to obtain the target sharing information, where the target sharing information includes original information to be shared and/or processed information to be shared. When the target sharing information is the original information to be shared, it indicates that the information to be shared selected by the user of the sending terminal can be shared without needing to be processed, so the information to be shared can be sent. When the target sharing information is the processed information to be shared, or includes the original information to be shared and the processed information to be shared, it indicates that the information to be shared selected by the user of the sending terminal needs to be processed before sharing. The case where the target sharing information includes the original information to be shared is to provide the user of the receiving terminal with choices. The user of the receiving terminal can choose to display the original information to be shared or the processed information to be shared. Of course, the choice of displaying the original information to be shared or the processed information to be shared can be preset, or the user of the receiving terminal can choose after receiving the target sharing information.

In determining that the method is executed by the server, the target sharing information includes at least one of the following: the original information to be shared, the processed sharing information to be shared, a link address, and a logo.

Although the data processing capability of current smart phones is already very good, correspondingly, the application software on a mobile phone become more and more. In order to avoid situations such as lags of the sending terminal which affect the use of the mobile phone, this method can also be executed on the server. Similarly, when the method is executed on the server, the information to be shared is processed on the server according to the processing information to obtain the target sharing information, where the target sharing information includes original information to be shared and/or processed shared information to be shared. When the target sharing information is the original information to be shared, it indicates that the information to be shared selected by the user of the sending terminal can be shared without needing to be processed, thus the information to be shared can be directly sent. The target sharing information is the processed information to be shared, or includes the original information to be shared and the processed information to be shared, it indicates that the information to be shared selected by the user of the sending terminal needs to be processed before sharing. The case where the target sharing information also includes the original information to be shared is to provide the user of the receiving terminal with choices. The user of the receiving terminal can choose to display the original information to be shared or the processed information to be shared. Of course, the choice of displaying the original information to be shared or the processed information to be shared can be preset, or the user of the receiving terminal can choose after receiving the target sharing information.

The advantage of sharing information in a form of a link address is that: for some content (such as documents), users can preview the content online without having to download it completely to browse the specific content. In addition, as compared to the information to be shared, a data size of the link address is very small and easy to share.

In addition, excepting the way of sharing the target sharing information in the form of a link address, the target sharing information can also be shared in a form of a logo, which is essentially an image containing a hyperlink. The advantage of sharing information in the form of a logo is that: it avoids a shortcoming of link addresses that cannot indicate data types of the target sharing information. When sharing information in the form of a logo, a specific logo can be provided for each data type in the target sharing information, and the user of the receiving terminal can know which specific data types the shared content includes. In addition, the logos can be conventional data type logos, such as a common music logo, video logo, document logo, etc. The logos can also be specially designed, because in the target sharing information, there exists many data types at the same time, it is very complicated to display the logo of each data type through an image. At this moment, it can put the logo of each data type in a same circle, and represents the logo of each data type with a fan-shaped area, and a size of each fan-shaped area can represent a ratio of a data size of a corresponding data type to a size of the target sharing information. Similarly, a size of each fan-shaped area can also be used to represent a ratio of the number of pieces of a corresponding data type (such as in a chat log, the number of voice messages and the number of image messages) to the total number of pieces of target sharing information.

In addition, the above first preset rule, second preset rule, third preset rule, fourth preset rule, fifth preset rule, sixth preset rule, seventh preset rule, eighth preset rule, ninth preset rule and tenth preset rule respectively include one or more of preset strategies (filtering, hiding, setting to be a unselectable state, displaying a mark indicating not support sharing, and outputting prompt information).

In this embodiment, any method in the above sixth to eighth embodiments can be executed by the sending terminal or the server, and the execution manner is determined according to the user's selection operation or the system settings, which meets different requirements in different usage scenarios, thereby realizing intelligent selection of information processing methods.

In a tenth embodiment of the information sharing method of the present application, the information sharing method includes:

operation A20, obtaining information to be shared;

operation A21, detecting whether the information to be shared meets sharing conditions; and operation A22, in determining that the information to be shared does not meet the sharing conditions, processing the information to be shared according to a preset rule to obtain target sharing information.

It needs to detect whether the information to be shared meets the sharing conditions according to relevant information. If the information to be shared is found not to meet the sharing conditions through the detection based on the relevant information, the information to be shared is processed according to the preset rule. The relevant information is provided by the sending terminal and/or by the receiving terminal, and the relevant information defines requirements includes at least one of data type requirement, file type requirement, presentation form requirement, content requirement, and display location information requirement.

For example, in an embodiment, the relevant information includes at least one of the following: data type, file type, storage information, traffic information, network speed information, mode information, time information, location information, status information of the receiving terminal, and status information of the user of the receiving terminal.

Data Type, File Type

The data type and/or file type of the receiving terminal does not meet the preset receiving condition, that is, the receiving terminal does not support the data type and/or file type of the information to be shared.

Specifically, the information to be shared that the user wants to share may be of various data types, such as being audio, video, animation, image, document, file, text, and etc. In most cases, the receiving terminal supports reading the information to be shared, but for some non-smart phones, it may not support reading video files. Therefore, it is unnecessary for the user of the sending terminal to still send the contents that the receiving terminal does not support to the receiving terminal. Therefore, when sharing information, it is necessary to first obtain the data type supported by the receiving terminal. In addition, the user may have such a requirement to share a video file, but because the video file are particularly large, the sharing process takes a long time and requires a large storage space to store. Further the user may just want a certain segment in the video file, or audio in the video file, or images in the video file. For the case that the user wants to share a certain segment in the video file, it can provide a video cropping function, and the user can select the segment at any time point and lasting for any length of time as needed. For the case the user wants to share is the audio in the video file, it can provide the user with a function of data type conversion. The video in the information to be shared can be converted into audio through data type conversion. An audio cropping function can also be provided. The user can select an audio segment at any time point and lasting for any length of time as needed. For the case the user wants to share is the images in the video file, similarly, it can only keep the images and remove the audio from the video file. Similarly, the user can select an image at any time point in the video file.

Regarding the file types of the information to be shared, one situation is that the information to be shared contains content in a non-frequently used file format, such as video data including MPEG (Motion Picture Experts Group) format, and many mobile phones only support frequently used file formats. For the file formats that are not frequently used, it generally requires a specific software for format conversion, such as the format factory. But in daily life, users generally do not use such kind of professional software tool, so, before sharing information, it needs to determine whether the receiving terminal supports a file format of the information to be shared, if the receiving terminal does not support the file format of the information to be shared, there is no need to share the contents in such file format. Therefore, during sharing, it can format the contents in the file format that the receiving terminal does not support at the sending terminal and convert the contents to any format supported by the receiving terminal. Another situation is that for some privacy or confidential files, encryption is usually required during the information sharing process. Similarly, for sharing information is relatively convenient and fast, many times some company internal files (usually documents) are also shared through common softwares, such as through the social software WeChat. To ensure the security of the files in the sharing process, it needs to encrypt the information to be shared with the data type being document.

Storage Information

The storage information of the receiving terminal does not meet the preset receiving conditions, that is, the available local storage space of the receiving terminal is smaller than a size of the information to be shared that the user wants to share.

Specifically, for the storage information of the receiving terminal, it is necessary to consider whether the size of the information to be shared that the user of the sending terminal wants to share exceeds the available local storage space of the receiving terminal, so it is necessary to obtain the size of the information to be shared and the available local storage space of the receiving terminal. In determining that the available local storage space of the receiving terminal is less than the size of the information to be shared that the user wants to share, the large size pieces of the information to be shared are compressed, that is, the large size pieces undergo a format conversion processing, to reduce a size of the information to be shared. Of course, it can also compress the whole information to be shared. In addition, considering that compression will affect the quality of the information to be shared, for example, when the information to be shared contains a video, for files of the data type such as videos, compression will damage the original files, such as reduce definitions, distort sounds of the original videos, and etc. Therefore, there is a limit to compress the information to be shared. For this, it can compress the information to be shared to obtain the target sharing information, and provide the user with a function to preview the target sharing information. It is up to the user to decide whether to send the target sharing information. If the user deems that the content has been excessively distorted by compression, the user can reselect the information to be shared, such as delete the selected content, etc. For example, it prompts that a size of the current available space of the receiving terminal is smaller than the size of the information to be shared that the user of the sending terminal wants to share for 300 MB, and it recommends to cancel a video with a size of 310 MB from sharing and continue sharing the remaining contents. For example, referring to FIG. 8, A5000 indicates a sending terminal, A5001, A5002, and A5004 indicate some pieces of information that can be shared in a chat log, A5003 and A5005 indicate some pieces of information that cannot be shared in the chat history, A5007 and A5008 indicate views that chat information areas of those pieces of information that cannot be shared in the chat history are set to be unselectable, and A5006 indicates a prompt box that pops up after the user selects A5001 or A5002, prompting that the shared user has insufficient storage space, and asks the user of the sending terminal whether to compress the information to be shared, and providing a confirmation button and a cancel button.

Traffic Information, Network Speed Information

The traffic information and/or the network speed information of the receiving terminal does not meet the preset receiving conditions, that is, the available traffic of the receiving terminal is not enough to receive the information to be shared and/or the size of the information to be shared that the user wants to share is much larger than a data size that can be received currently by the receiving terminal per unit time.

Specifically, the current traffic usage of common mobile phone users is monthly traffic usage, such as subscribing 10 GB of data traffic per month. If the user's traffic usage exceeds the subscribed amount in a month, it will cause a lot of charges. Before sending the information to be shared, it needs to obtain the traffic information of the receiving terminal, that is, the available traffic of the receiving terminal. If the available traffic of the receiving terminal is insufficient to receive the information to be shared, likewise, the large size pieces of the information to be shared can be compressed, that is, the large size pieces undergo a format conversion processing, to reduce a size of the information to be shared. Of course, it can also compress the whole information to be shared. In addition, considering that compression will affect the quality of the information to be shared, for example, when the information to be shared contains a video, for files of the data type such as videos, compression will damage the original files, such as reduce definitions, distort sounds of the original videos, and etc. Therefore, there is a limit to compress the information to be shared. For this, it can compress the information to be shared to obtain the target sharing information, and provide the user with a function to preview the target sharing information. It is up to the user to decide whether to send the target sharing information. If the user deems that the content has been excessively distorted after compression, the user can reselect the information to be shared, such as delete the selected content, etc. For example, it prompts that a size of the available traffic of the receiving terminal is smaller than the size of the information to be shared that the user of the sending terminal wants to share for 300 MB, and it recommends to cancel a video with a size of 310 MB from sharing and continue sharing the remaining contents.

In addition, when the size of the information to be shared that the user wants to share is much larger than the data size that can be currently sent per unit time by the receiving terminal, for example, the size of the information to be shared that the user wants to share is 1000 MB, and the current network speed of the receiving terminal can only reach 10 KB/s, it is conceivable that the sharing will be meaningless. Therefore, in the information sharing process, it is necessary to obtain the size of the information when the user chooses to share the information, and at the same time to obtain the network speed of the receiving terminal. When the network speed of the terminal is much lower than the network speed required by the user of the sending terminal to share the information to be shared, it can use compression to ensure that the size of the information to be shared meets the network speed. It can also prompt the user that the current network condition is poor and it may take some time to send the information, and recommend the user to allow the sending terminal to automatically send the information when the network condition does not affect the sending. As shown in FIG. 9, A6000 indicates a sending terminal, A6001, A6002, and A6004 indicate some pieces of information that can be shared in a chat log, A6003 and A6005 indicate some pieces of information that cannot be shared in the chat log, A6007 and A6008 indicate views that chat information areas of those pieces of information that cannot be shared are set to be unselectable, and A6006 is a prompt box that pops up after the user selects A6001 or A6002, prompting that the network condition of the shared user is poor, and asking the user of the sending terminal whether to automatically send the information to be shared after the shared user's network is restored, and providing options including automatic sending and canceling automatic sending and returning to the sharing interface to facilitate the user of the sending terminal to still share. In addition, considering that compression will affect the quality of the information to be shared, for example, when the information to be shared contains a video, for files of the data type such as videos, compression will damage the original files, such as reduce definitions, distort sounds of the original videos, and etc.

Therefore, there is a limit to compress the information to be shared. For this, it can compress the information to be shared to obtain the target sharing information, and provide the user with a function to preview the target sharing information. It is up to the user to decide whether to send the target sharing information. If the user deems that the content has been excessively distorted by compression, he can reselect the information to be shared, such as delete the selected content.

For the case that the traffic information and/or the network speed information of the sending terminal does not meet the preset sending conditions Specifically, for the sending terminal, there may be a situation where the available traffic is insufficient and/or the network speed condition does not meet the sending requirements. Before sending the information to be shared, the available traffic and/or the network speed condition of the sending terminal must also be taken into account.

Mode information, time information, location information, status information of the receiving terminal, status information of the user of the receiving terminal The mode information of the receiving terminal does not meet the preset receiving conditions, that is, the receiving terminal is in a profile mode, an intelligent mode, a safety mode, a navigation mode, a conference mode, a guest mode, a child mode, or an elderly mode.

Specifically, for the mode information, the user of the sending terminal can set a mode of the sending terminal as needed. For example, when the sending terminal is in a guest mode, the current user of the sending terminal is generally not the owner, that is, the owner considers privacy protection or other situations, and sets the terminal (such as a mobile phone) to be in the guest mode when the terminal is lent to others, thereby to prevent the others from revealing the owner's privacy during use. In addition, when the sending terminal is in a safe mode, if the information chosen to be shared by the user of the sending terminal is a file (such as a video, a document, an image, or the like), there may be leakage of confidential files and personal privacy. In addition, when the sending terminal is in a child mode, generally at this moment, the user of the sending terminal is not the owner but the owner's child or another junior, the user of the sending terminal may be unfamiliar with the mobile phone, and in such case, a series of misoperation may occur and may trigger a sharing process. It is understandable under such a situation, the user of the sending terminal does not need to share information. In addition, the sending terminal may also be in an elderly mode. Similarly, the user of the sending terminal at this moment is generally the owner's elder, and they are unfamiliar with the current mobile phone. When the elder using the mobile phone, it will also produce a series of misoperation that lead to a sharing process.

Similarly, the user of the receiving terminal can set a mode of the receiving terminal as needed. For example, when the receiving terminal is in a guest mode, the user of the receiving terminal is generally not the owner, that is, the owner considers privacy protection or other situations, and sets the terminal (such as a mobile phone) to be in the guest mode when the terminal is lent to others, thereby to prevent the others from revealing the owner's privacy during use. Therefore, in the guest mode, if the information chosen to be shared by the user of the sending terminal is a locally stored file (such as a video, a document, an image, or the like), the user can be prompted that the receiving terminal is currently in a guest mode, continuing to send may reveal privacy and the user of the sending terminal is asked whether to still share the information or not, or is prompted to encrypt the information to be shared. In addition, when the receiving terminal is in a safe mode, if the information chosen to be shared by the user of the sending terminal is a file (such as a video, a document, an image, or the like), it can prompt the user that the receiving terminal is in the safe mode and prohibit such information sharing, or prompt the user to encrypt the information to be shared. In addition, when the receiving terminal is in a child mode, the user of the receiving terminal is generally not the owner at this moment but the child of the owner or another junior. It is understandable it is not largely another but the owner that the user of the sending terminal wants to share the information to be shared with. It can remind the user of the sending terminal that the current receiving terminal is in the child mode, or it prompts the user to encrypt the information to be shared. In addition, the receiving terminal may also be in an elderly mode. Similarly, the user of the receiving terminal at this time is generally the owner's elder. It is understandable it is not largely another but the owner that the user of the sending terminal wants to share the information to be shared with. It can prompt the user of the sending terminal that the receiving terminal is currently in the elderly mode, or prompt the user to encrypt the information to be shared.

In addition to the above modes, due to different needs, the receiving terminal may also be in a navigation mode. When the receiving terminal is in the navigation mode, it is obviously inconvenient to receive information. At this time, the sharing of the sending terminal will pose a threat to the driving safety of the user of the receiving terminal. In addition, when the receiving terminal is in a conference mode, the user of the receiving terminal is also inconvenient to receive information. Therefore, in the information sharing process, it is necessary to obtain a current mode of the receiving terminal before the user of the sending terminal sends the information to be shared, thus to avoid disturb the user of the receiving terminal when the user of the receiving terminal is inconvenient to receive information. Therefore, when it is acquired that the receiving terminal is in the navigation mode or the conference mode, the user of the sending terminal may be prompted that the receiving terminal is currently in the navigation mode or the conference mode.

In addition, at present most mobile phones' profile modes are still manually set by the user. However, in some scenarios, a mobile phone can automatically enter a profile mode according to a current usage scenario. For example, when entering a game application, the mobile phone will automatically enter a game mode. Therefore, regardless of whether the above-mentioned guest mode, safety mode, child mode, and elderly mode are manually set or automatically entered by the mobile phone, those modes all belong to the category of profile modes.

In addition, it can be known from the above that the mobile phone can automatically enter a corresponding profile mode according to the current usage scenario, and the mobile phone can also be set to be in a corresponding smart mode to enter the corresponding profile mode in a faster and smarter way. Considering the problem of a degree of intelligence in the smart mode, it may affect the normal use of the mobile phone by the user at the beginning, so a switch for entering the smart mode can be set in a developer mode or a debugging mode.

In addition, in addition to that the mobile phone can be set to a preset profile mode, it can also put a certain application of the mobile phone alone in a preset profile mode, and the mobile phone being in the preset mode may not affect the application being in the preset mode, for example, the mobile phone is in a smart mode, and the application is in a normal mode. Certain preset modes of the mobile phone may also affect a preset mode of the application, for example, if the mobile phone is in a traffic saving mode, the application cannot be in the normal mode. Specifically, whether a profile mode of the mobile phone has a higher priority than the profile mode of the application can be preset in the system of the mobile phone. When the receiving terminal is in a preset mode, whether to execute operation A10 to process the information to be shared is determined according to which profile mode of the mobile phone being in and/or which profile mode of an application being in.

For the case the time information and/or location information of the receiving terminal does not meet the preset receiving conditions, that is, the time zone of the receiving terminal is different from the time zone of the sending terminal and/or the region of the receiving terminal is different from the region of the sending terminal.

Specifically, for time information and location information, the user of the receiving terminal may be in the same time zone as the user of the sending terminal, or may be in a time zone different from a time zone of the user of the sending terminal. In the case where the two are in the same zone, the user of the sending terminal generally considers based on the current time whether it is suitable for sharing information; and in the case where the two are in different time zones, for example, the user of the sending terminal is in the east eight time zone, and the receiving terminal end user is in the west eight time zone, at this time, it is obviously unsuitable for the user of the sending terminal neglects to consider the current time information of the user of the receiving terminal, for example, if the current time of the user of the sending terminal is two o'clock in the afternoon, but the current time of the user of the receiving terminal is two o'clock in the morning, obviously, it is not suitable for information sharing at this time. Therefore, if the user of the receiving terminal and the user of the sending terminal are not in the same time zone, the sending terminal needs to prompt the user of the sending terminal with the current time information of the user of the receiving terminal, and prompts the user of the sending terminal whether it is suitable for the user of the receiving terminal to receive the information to be shared at current time.

In addition, the user of the sending terminal may be in the same region as the user of the receiving terminal, or may be in a region different from a region of the user of the receiving terminal. In the case where the two are in different regions, the user of the sending terminal needs to consider whether the location information of the user of the receiving terminal is suitable for receiving the information to be shared at current time. For example, the user of the receiving terminal may be on vacation, and it is obviously inappropriate to share work-related information to the user of the receiving terminal. Therefore, when sharing information, the sending terminal prompts the user of the sending terminal with a geographic location of the user of the receiving terminal, and prompts the user of the sending terminal whether it is suitable for the user of the receiving terminal to receive the information to be shared at current time.

For the case where the language information of the receiving terminal does not meet the preset receiving conditions, that is, the system language and/or current application language of the receiving terminal is different from the language of the information to be shared.

Specifically, if the user of the receiving terminal cannot understand the content of the information shared by the user of the sending terminal to the user of the receiving terminal due to language barrier, sharing information under such a situation is meaningless. Therefore, during information sharing, the system language and/or current application language of the receiving terminal can be obtained (generally, obtaining the current application language is for instant messaging software, because such software each usually has a dedicated terminal client, the acquisition of system language is aimed at the situation where the receiving terminal does not need to use a dedicated client to receive information during the information sharing process). After the system language and/or the current application language of the receiving terminal is obtained, if the system language and/or the current application language of the receiving terminal is different from a language of the information to be shared by the sending terminal, the user of the sending terminal is prompted and a function is provided to convert the language of the information to be shared into the system language of the receiving terminal and/or the current application language.

For the case where the status information of the receiving terminal and/or the status information of the user of the receiving terminal does not meet the preset receiving conditions, that is, the status information of the receiving terminal and/or the status information of the user of the receiving terminal is insufficient to support the completion of information sharing.

Specifically, for the status information of the receiving terminal, the receiving terminal's power is too low due to the user forgetting to charge or being unable to charge currently, and the power is not enough to complete the information sharing process. At this time, it is obvious not appropriate if the sending terminal still sends the information to be shared. For the sending terminal, the power also affects the process of sharing information. For the status information of the user of the receiving terminal, when the user of the receiving terminal is in motion, such as the user of the receiving terminal is currently using a software recording an exercise process (running speed, running time, etc.), it is inconvenient for the user of the receiving terminal to receive information at current time.

In operation A23: the target sharing information is sent.

In this embodiment, through operations A20: obtaining information to be shared; A21: detecting whether the information to be shared meets sharing conditions, A22: in determining that the information to be shared does not meet the sharing conditions, processing the information to be shared according to a preset rule to obtain target sharing information, and A23: sending the target sharing information, when the information that the user of the sending terminal wants to share is obtained, relevant information obtained from the sending terminal and/or provided by the receiving terminal is combined with the preset rules to complete the processing of the information to be shared, so that the information that cannot be shared can be shared after the processing. The purpose of intelligently processing the information to be shared is realized.

Figure 10:
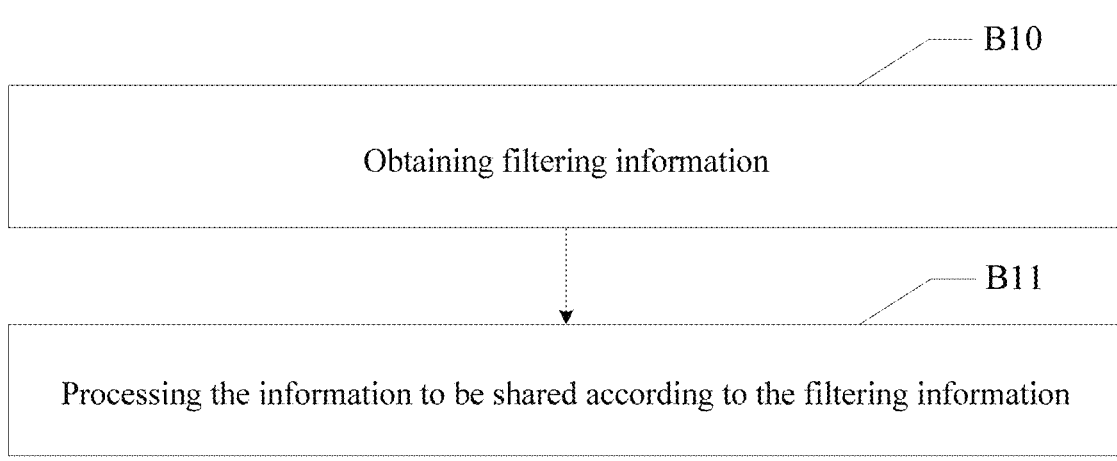
FIG. 10 is a schematic flowchart of an eleventh embodiment of the information sharing method of the present application.

Referring to FIG. 10, in an eleventh embodiment of the information sharing method of the present application, the information sharing method includes the following operations.

In operation B10, filtering information is obtained.

When the user of the sending terminal sends the sharing information, the user of the receiving terminal may not be convenient for receiving the sharing information at that time, for example, the user of the receiving terminal is driving. In this case, some information of the user of the receiving terminal can be obtained to determine whether the user of the receiving terminal is convenient to receive the sharing information. In addition, the sending terminal may also have a time not suitable for sharing, such as the sending terminal has insufficient power to complete the process of sending the information to be shared. All information obtained from the sending terminal and/or the receiving terminal are collected to determine whether the receiving terminal and/or the sending terminal supports information sharing, and used as the filtering information. The filtering information obtained from the sending terminal is the first type filtering information, and the filtering information provided by the receiving terminal is the second type filtering information.

In operation B11, the information to be shared is processed according to the filtering information.

The information to be shared can be some preset information of a terminal, be information downloaded by a user from the Internet (such as images, application software, etc.), be information input by the user on the terminal, or be information on an application of the terminal (such as news, application update information, etc.). The information to be shared can also be local information of the terminal (such as local files, etc.), or be a sharing record on social software (such as chat logs, shared information, etc.).

The above information to be shared may be one or more of audios, videos, animations, images, documents, files, texts, sharing records, writing notes, web page information, and web addresses.

Figure 11:
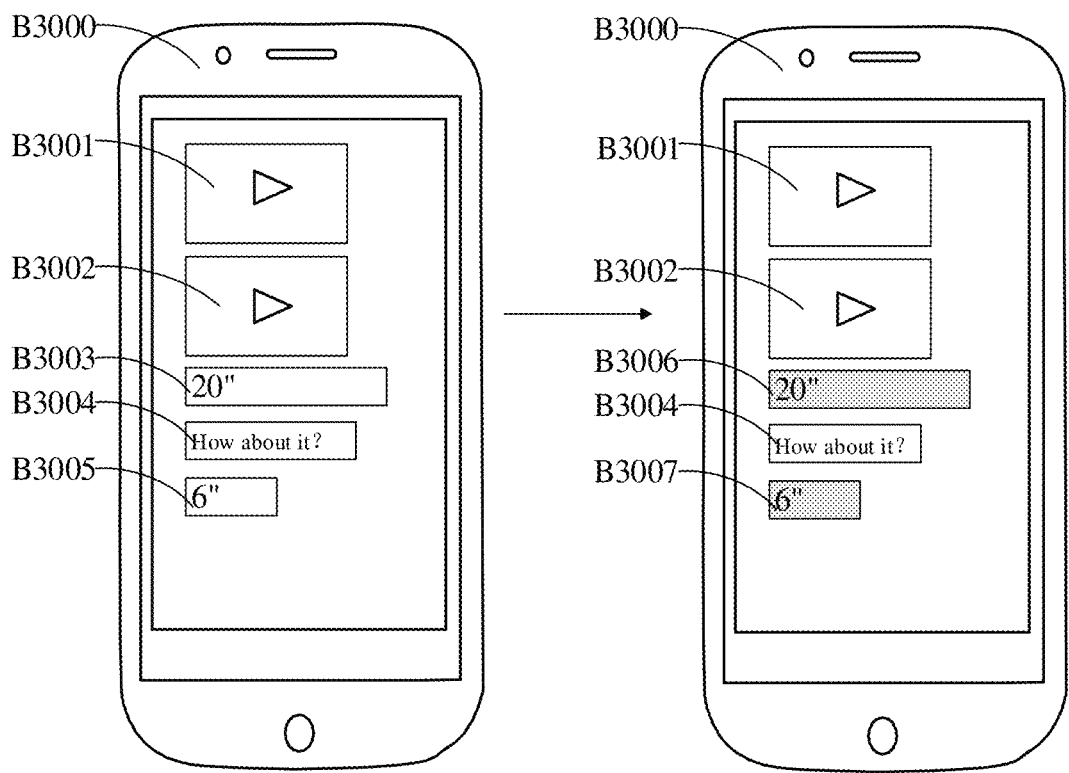
FIG. 11 is a schematic diagram of an interface scene of operation B10 of the information sharing method of the present application.
Figure 12:
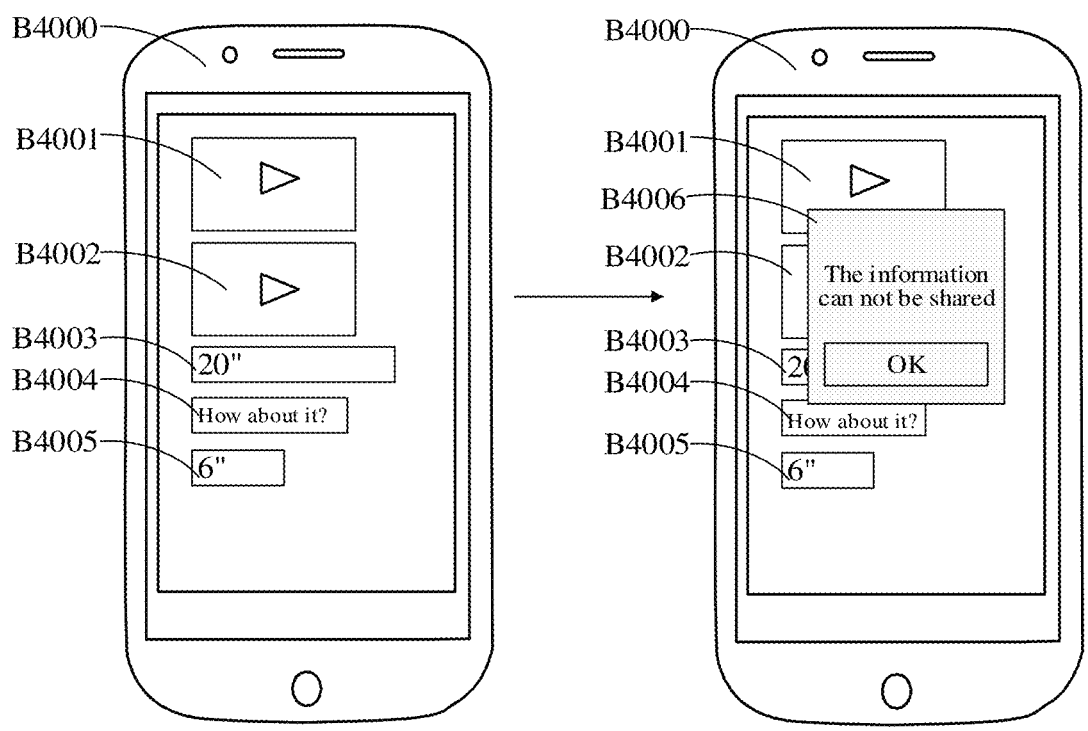
FIG. 12 is a schematic diagram of another interface scene of operation B10 of the information sharing method of the present application.

When the information to be shared is chat logs, as in the user's WeChat chat logs, not all information can be shared. Before filtering the chat logs based on the filtering information, when the user selects more than one piece of information that he wants to share and a piece of information of which cannot be shared, it prompts the user that the piece of information cannot be shared and hides the piece of information that cannot be shared, or makes the piece of information unselectable and gives a prompt (for example, the chat information area of the piece of information is set to be an unselectable state. Referring to FIG. 11, B3000 indicates a sending terminal, B3001, B3002, B3004 indicate some pieces of information that can be shared in a chat log, B3003 and B3005 indicate some pieces of information that cannot be shared in the chat log, B3006 and B3007 indicate views that chat information areas of those pieces of information that cannot be shared are set to be unselectable. When the user selects B3003, the chat information area indicated by B3006 and B3007 are set to be unselectable), or a mark indicating that the corresponding information cannot be shared is displayed next to the information (such as a text prompt), refer to FIG. 12, B4000 indicates a sending terminal, B4001, B4002, B4004 indicate some pieces of information that can be shared in a chat log, B4003 and B4005 indicate some pieces of information that cannot be shared in the chat log, B4006 indicates a prompt box that pops up after the user selects B4003 or B4005, prompting that the selected information cannot be shared and providing a confirmation button, or it does not provide the confirmation button, and the prompt box automatically disappears after a certain period of time (such as Is)). If the information selected by the user to be shared is sharable, remaining information that cannot be shared is also hidden, or is made to be unselectable and a prompt (such as the chat information area is set to be a unselectable state) is given, or a corresponding mark (such as a text prompt) indicating not support sharing is displayed next to the information.

There are many ways for the user to select the information that he wants to share. For example, the user can obtain the information through voices to control the terminal, or directly select the information on a terminal interface, or obtain the information through preset touch gestures or through remote control gestures.

For chat logs, in many cases, users do not just want to share a certain piece or pieces of information, but a lot of pieces of information, which can generally be divided into several categories according to category information, such as display forms of the information, contents of the information, and data types of the information. The display forms can be URL (Uniform Resource Locator) links. When the user shares an interesting website or information useful to a contact which has been recommended to the user by another contact, the user can directly share the URL of the website to the contact. The contact only needs to click the URL link to enter an accurate and specific page to obtain information. Then, when the information required by the contact is distributed on different websites, the user needs to select the websites one by one. In order to facilitate user to share, the sending terminal can intelligently select other URLs in the chat log according to a URL selected by the user, and finally the user can choose which URL to share specifically. The contents of the information can be keywords in the information, if a same keyword appears multiple times or there are multiple identical keywords, multiple times or multiple identical keywords can be set and adjusted according to the user experience. In addition, the contents of the information can also be location information, such as positioning information, for example, the location information that the user wants to share is the location information of the user at different times. The data types can be images, texts, videos, documents, etc. There may also be multiple pieces of information of a same data type in the user's chat log, when the user is sharing information, it can intelligently select information similar to the information selected by the user according to the data type, and then the user determines a specific piece of information to be shared. The information that the user wants to share can be intelligently selected through the category information.

Figure 13:
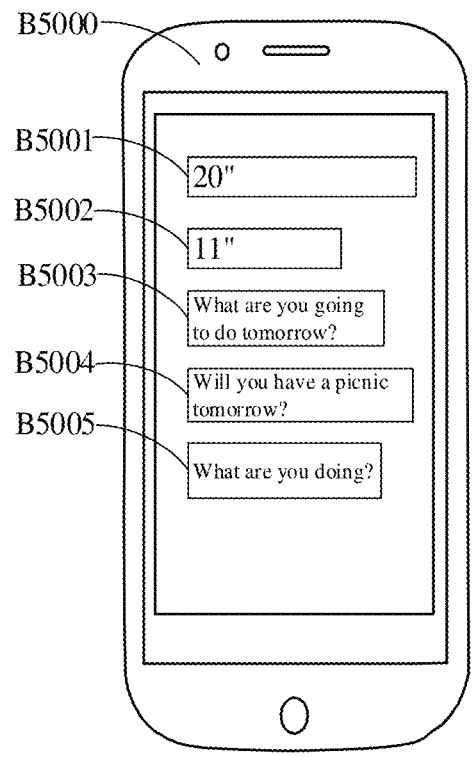
FIG. 13 is a schematic diagram of still another interface scene of operation B10 of the information sharing method of the present application.

Specifically, the sending terminal acquires information belonging to a same category with the information selected by the user within a preset time interval according to the acquired category information. For example, referring to FIG. 13, B5000 indicates a sending terminal, B5001 and B5002 indicate voice messages, and B5003, B5004, and B5005 indicate text messages. After the user selects the text message B5003, the sending terminal uses the keyword "tomorrow" as the category information. The sending terminal selects the text message B5004 that also contains the keyword "tomorrow", and the text messages B5003 and B5004 are collectively used under a same category.

In addition, after the chat log is processed according to the above filtering information, the pieces of information under a same category are intelligently selected from the remaining information that can be shared according to the category information. There may be some pieces of information only partly meeting the above filtering information, or there may be all of the pieces of the information wholly meeting the above filtering information. For the situation that some pieces of information only partly meet the above-mentioned filtering information, it is also necessary to continue filtering and processing the information through the filtering information.

Not all the information to be shared can be shared. For information that cannot be shared, part or all of the information that cannot be shared can be filtered out or hidden according to the filtering information, or be made to be unselectable and a prompt (such as the chat information area is set to be in an unselectable state) is given, or a corresponding mark (such as a text prompt) indicating not support sharing is displayed next to the information or output through a dialog box, or the information that cannot be shared is compressed or encrypted (for example the information of file type is encrypted). When all the information to be shared is not input by the user (such as voice messages), and the information selected by the user to be shared is sharable, remaining information that cannot be shared will also be filtered out or hidden, or be made unselectable and give a prompt (for example the chat information area of which is set to be unselectable), or it displays a corresponding mark (such as a text prompt) beside the information to indicating that the information cannot be shared, or it outputs a prompt message through a dialog box, or compresses or encrypt (such as encrypting the information of file type) the information that cannot be shared.

In this embodiment, through operations B10: obtaining filtering information, and B11: processing the information to be shared according to the filtering information, before sharing information, it obtains filtering information from the sending terminal and/or receiving terminal to process the information to be shared, so that the user of the sending terminal selects part of the information that is convenient for sending at the sending terminal according to the result of the above processing, and the user of the receiving terminal to selects part of the information that is convenient for the receiving terminal to receive at that time according to the result of the above processing. The user of the sending terminal can also choose to directly cancel the sharing process according to the result of the above processing, avoiding the sending terminal and/or the receiving terminal not suitable for sharing information is still in a sharing progress. The purpose of intelligently selecting information to be shared is realized.

Further, in the twelfth embodiment of the information sharing method of the present application, based on the above eleventh embodiment, the first type filtering information includes at least one of the following:
  authentication information of a current user of the sending terminal;
  permission information of the information to be shared;
  available traffic of the sending terminal;
  current network speed of the sending terminal; and
  a current mode of the sending terminal.

Authentication information of a current user of the sending terminal

When the current user of the sending terminal who is not the owner or an authorized user of the owner of the sending terminal shares information (chooses information to be shared or sends information to be shared), especially when the information chosen or sent by the current user's contains a file, and more especially when the file is an encrypted file, it is necessary to prevent the current user from performing information sharing. A way to identify an identifier of a current user can be the biological recognition (such as fingerprint information or face information), passphases or passwords, etc. For identifying a user's identifier based on face information, a terminal can detect whether a current user is the owner, and directly provides the current user the information sharing information function without displaying a prompt information when the current user is the owner and passes the verification. When the current user is not the owner, the current user is prompted that users not the owner are prohibited from sharing information, which thus not affect the user's normal use.

Permission Information of the Information to be Shared

There are many situations in which information of a chat log cannot be shared. For example, if the information the user of the sending terminal wants to share is an article, a video, or the like that is copyrighted, the information is not allowed to be shared until the user is authorized by the author of the information. For still another example, the information involving the privacy of others, or violating national laws and regulations or social morals that is not allowed to be spread; similarly, the terminal system preset information, the information downloaded by the user from the Internet, the information entered by the user on the terminal, and the information on the terminal application are not allowed to be shared when the above conditions are not met. There is also a possibility that the information itself is not supported to be shared by the application of the sending terminal or not supported to be received by the application of the receiving terminal. For example, voice information in WeChat is not supported to be shared.

Available Traffic of the Sending Terminal

Figure 14:
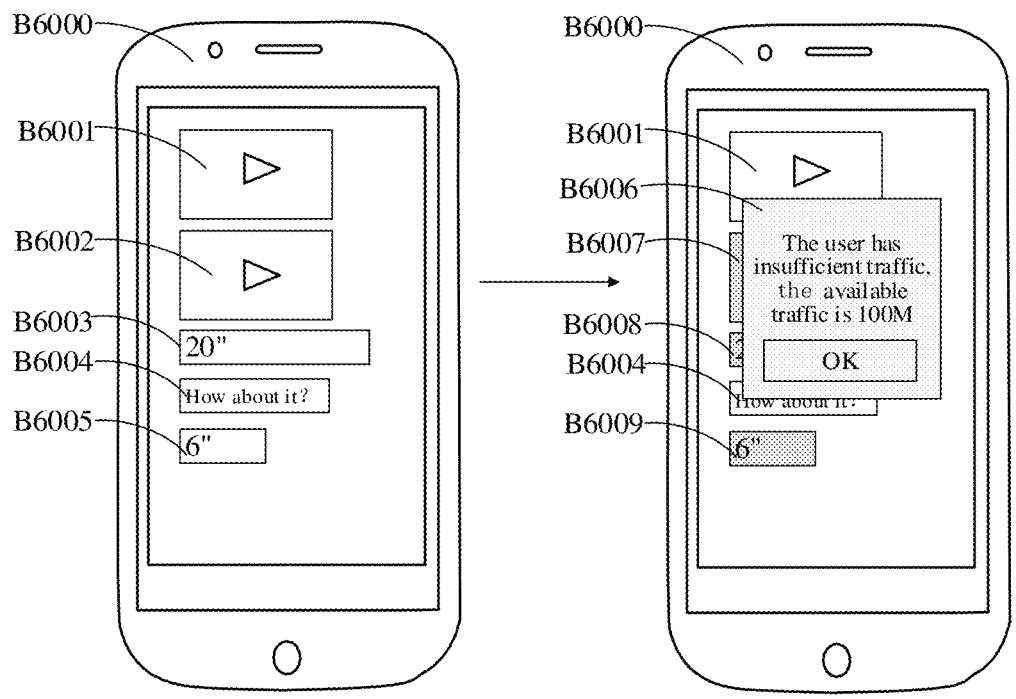
FIG. 14 is a schematic diagram of an interface scene in a twelfth embodiment of the information sharing method of the present application.

We know that extra traffic used by terminals (such as mobile phones) exceeding the subscribed traffic package is quite expensive. Therefore, it is necessary to take into account whether the data traffic used when sharing information by the sending terminal will exceed the subscribed data package. So, when selecting information to be shared, it is necessary to obtain a size of the information to be shared and at the same time to obtain the available traffic of the sending terminal (refer to FIG. 14, at current mobile phones generally have functions to obtain the data traffic usage of the mobile phones and the available traffic, B6000 indicates a sending terminal, B6001, B6002, B6004 indicate some pieces of information that can be shared in a chat log, B6003 and B6005 indicate some pieces of information that cannot be shared in the chat log, B6006 indicates a prompt box that pops up after the user selects B6001, B6002, or B6004 to remind the user that the available traffic is insufficient and an amount of the available traffic and provide a confirmation button, or it does not provides the confirmation button, and the prompt box automatically disappears after a certain period of time (such as Is). B6007 indicates a view that chat information area of the piece of information indicated by B6002 and having a size exceeding the amount of the available traffic of the receiving terminal is set to be in a unselectable state. B6008 and B6009 indicate views that chat information areas of the pieces of information that cannot be shared are set to be in a unselectable state).

In determining that the available traffic of the sending terminal does not meet preset sending conditions, that is, in determining that an amount of the available traffic of the sending terminal is smaller than the size of the information to be shared that the user of the sending terminal wants to share, the information to be shared is processed according to a first preset rule.

Specifically, the user of the sending terminal is prompted that the current available traffic of the sending terminal is insufficient to send the information to be shared that the user wants to share, and the user is also prompted with a different between the amount of the available traffic of the sending terminal at current and a size of the information to be shared, and a specific solution is given. For example, it displays a size of each piece of the information to be shared and suggests canceling which piece from sharing, for further example, it prompts that an amount of the available traffic of the receiving terminal is smaller than the size of the information to be shared that the user of the sending terminal wants to share for 300 MB, and it recommends to cancel a video with a size of 310 MB from sharing and continue sharing the remaining contents. Generally, when there are multiple pieces of information to be shared, the sizes of those pieces of information are basically different. In such case, it can hide the piece of information whose size is larger than the amount of the available traffic, set it to be unselectable, or output prompt information. The user determines which piece of information to be shared is canceled from sharing. Each time the user chooses to send the remaining information to be shared, if the size of the remaining information to be shared is still greater than the amount of the available traffic, the user is prompted that the current available traffic of the sending terminal is not enough to send the information to be shared, and the user is reminded with a different between the amount of the available traffic of the sending terminal at current and a size of the remaining information to be shared. As such, the user reselects the pieces of information to be shared till a size of the information to be shared is less than an amount of the available traffic. In addition to suggesting the user to cancel which piece of information from sharing, compression can also be used to ensure that the size of the information to be shared is less than the amount of the available traffic. Of course, the amount of the available traffic does not affect the specific sharing process. That is to say, when the amount of the available traffic is smaller than the size of the information to be shared that the user wants to share, the user is only prompted, and not limited from sharing. When each time the user is prompted, an option to still send the information is also given to the user.

Current Network Speed of the Sending Terminal

The network speed of the sending terminal (such as a real-time network speed of a mobile phone obtained from a floating window of a certain management tool (such as the Tencent housekeeper)) is also needed to be taken into account.

In determining that the current network speed of the sending terminal does not meet the preset sending conditions, that is, when the size of the information to be shared by the user of the sending terminal is much larger than the data size of that the sending terminal can send per unit time, the information to be shared is processed according to a second preset rule.

Figure 15:
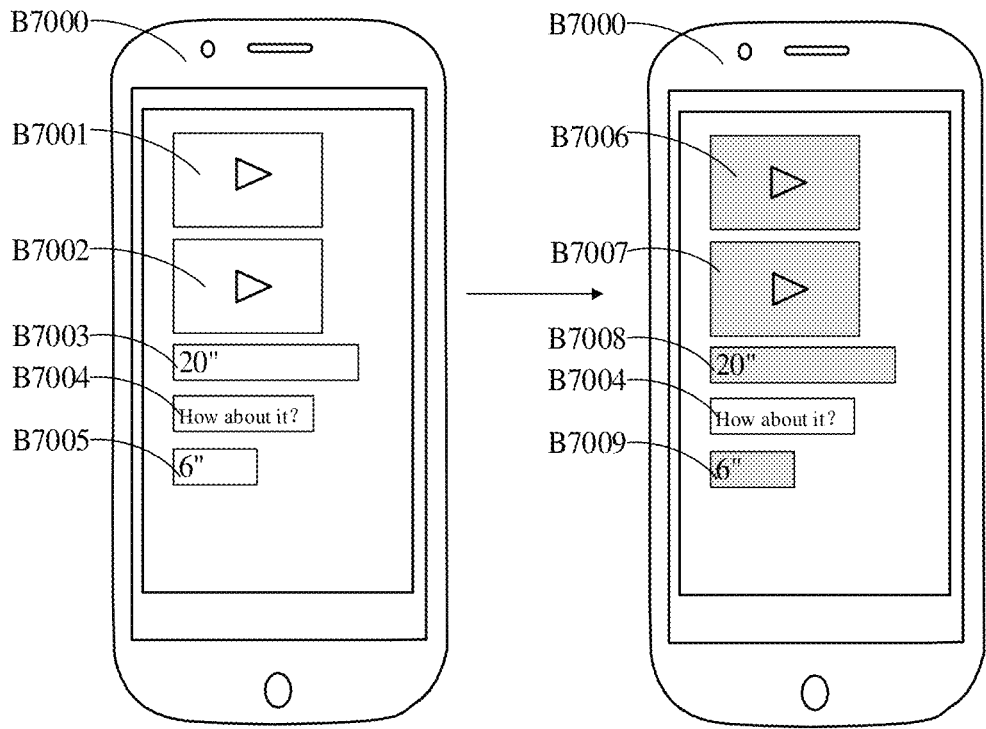
FIG. 15 is a schematic diagram of another interface scene in the twelfth embodiment of the information sharing method of the present application.

Specifically, when the size of the information to be shared is much larger than the data size that the sending terminal can send per unit time at current, for example, the size of the information to be shared is 1000 MB, and the current network speed of the sending terminal can only reach 10 KB/s, the sharing will be meaningless. Therefore, in the information sharing process, it is necessary to obtain the size of the information when the user chooses to share the information, as well as the network speed of the sending terminal. In determining that the current network speed of the sending terminal is far less than a network speed required by the sending terminal to share the information to be shared, the user is prompted that the current network speed of the sending terminal is too slow to send the information, and a specific solution is given. For example, a size of each piece of information to be shared is displayed and which piece of information to be shared that can be canceled is recommended. Generally, when there are multiple pieces of information to be shared, the size of the pieces of information are basically different. In such case, it can hide the piece of information whose size is much larger than the data size that can be sent by the sending terminal per unit time at current, set it to be unselectable (refer to FIG. 15, B7000 indicates a sending terminal, B7001, B7002, and B7004 indicate some pieces of information that can be shared in a chat log, B7003 and B7005 indicate some pieces of information that cannot be shared in the chat log, and B7006 and B7007 indicate views that chat information areas of the pieces of information that cannot be shared because each of which has a size much larger than the data size that can be sent by the sending terminal per unit time at current, are set to be unselectable. B7008 and B7009 indicate views that chat information areas of the pieces of information that cannot be shared are set to be unselectable. After B7006 is selected by the user, it automatically sets the chat information areas indicated respectively by B7006, B7007, B7008, and B7009 to be unselectable) or outputs a prompt. Then the user determines which piece of information to be shared is canceled from sharing. Each time the user chooses to send the remaining information to be shared, if the size of the remaining information to be shared is still much larger than the data size that can be sent by the sending terminal per unit time at current, the user is prompted that the current network speed of the sending terminal is insufficient to send the information to be shared that the user wants to share, and the user is reminded with a specific value of the current network speed of the sending terminal, and suggested to wait for the network speed to be restored and sufficient to support the sharing of the information that the user wants to share, or the user is prompted to choose to let the sending terminal to automatically sent the information that the user wants to share when the network speed is sufficient to support the sending of the information. In addition to the above method of processing information that does not meet the network speed, compression can also be used to ensure that the size of the information to be shared meets the network speed. Of course, the network speed will not affect the specific sharing process. That is to say, when the network speed of the sending terminal is much less than that required by the sending terminal to share the information to be shared, the user is only prompted, and not limited from sharing. When each time the user is prompted, an option to still send the information is also given to the user.

Current Mode of the Sending Terminal

The user of the sending terminal can set a mode of the sending terminal as needed. For example, when the sending terminal is in a guest mode, the current user of the sending terminal is generally not the owner, that is, the owner considers privacy protection or other situations, and sets the terminal (such as a mobile phone) to be in the guest mode when the terminal is lent to others, thereby to prevent the others from revealing the owner's privacy during use. Therefore, in the guest mode, if the information chosen to be shared by the user of the sending terminal is a locally stored file (such as a video, a document, an image, or the like), the user can be prompted that the sending terminal is currently in a guest mode and such information sharing is forbidden. In addition, when the sending terminal is in a safe mode, if the information chosen to be shared by the user of the sending terminal is a file (such as a video, a document, an image, or the like), the user can be prompted that the sending terminal is currently in a safety mode and such information sharing is forbidden. In addition, when the sending terminal is in a child mode, generally at this moment, the user of the sending terminal is not the owner but the owner's child or another junior, the user of the sending terminal may be unfamiliar with the mobile phone, and in such case, a series of misoperation may occur and may trigger a sharing process. It is understandable under such a situation, the user of the sending terminal does not need to share information. Thus, the user can be prompted that the sending terminal is currently in the child mode and such information sharing is forbidden. In addition, the sending terminal may also be in an elderly mode. Similarly, the user of the sending terminal at this moment is generally the owner's elder, and they are unfamiliar with the current mobile phone. When the elder use the mobile phone, it will also produce a series of misoperation that lead to a sharing process. But the user of the sending terminal actually does not need to share information. Thus, the user can be prompted that the sending terminal is currently in the elderly mode and such information sharing is forbidden.

In addition, at present most mobile phones' profile modes are still manually set by the users. However, in some scenarios, a mobile phone can automatically enter a profile mode according to a current usage scenario. For example, when entering a game application, the mobile phone will automatically enter a game mode. Therefore, regardless of whether the above-mentioned guest mode, safety mode, child mode, and elderly mode are manually set or automatically entered by the mobile phone, those modes all belong to the category of profile modes.

In addition, it can be known from the above that the mobile phone can automatically enter a corresponding profile mode according to the current usage scenario, and the mobile phone can also be set to be in a corresponding smart mode to enter the corresponding profile mode in a faster and smarter way. Considering the problem of a degree of intelligence in the smart mode, it may affect the normal use of the mobile phone by the user at the beginning, so a switch for entering the smart mode can be set in a developer mode or a debugging mode.

In addition, in addition to that the mobile phone can be set to a preset profile mode, it can also put a certain application of the mobile phone alone in a preset profile mode, and the mobile phone being in a preset profile mode may not affect the application being in a preset profile mode, for example, the mobile phone is in a smart mode, and the application is in a normal mode. Certain preset modes of the mobile phone may also affect a preset mode of the application, for example, if the mobile phone is in a traffic saving mode, the application cannot be in the normal mode. Specifically, whether a profile mode of the mobile phone has a higher priority than a profile mode of the application can be preset in the system of the mobile phone. When the sending terminal is in a preset mode, that is, which profile mode of the mobile phone being in and/or which profile mode of an application being in determines whether to execute operation B10 to process the information to be shared according to the third processing rule.

In this embodiment, the first type filtering information is obtained from the sending terminal, and the information to be shared is processed according to the obtained first type filtering information, so as to ensure that the sending terminal does not use extra traffic, and the user of the sending terminal does not have to wait for the information to be sent for a long time to protect the privacy of the user of the sending terminal. The purpose of intelligently selecting information to be shared is realized.

Further, in a thirteenth embodiment of the information sharing method of the present application, based on the eleventh embodiment, the second type filtering information includes at least one of the following:

the data type and/or file type supported by the receiving terminal;

the available space and/or available traffic of the receiving terminal;

the time information and/or location information of the receiving terminal;

the current network speed of the receiving terminal;

the current mode of the receiving terminal;

the system language and/or current application language of the receiving terminal;

status information of the receiving terminal and/or status information of the the user of the receiving terminal.

The data type and/or file type supported by the receiving terminal

For the receiving terminal, the data types and file types it can handle have certain limitations.

In determining that the data types supported by the receiving terminal do not meet the preset receiving conditions, that is, the receiving terminal does not support a data type of the information to be shared that is shared by the sending terminal, the information to be shared is processed according to the fourth preset rule. In determining that the file types supported by the receiving terminal do not meet the preset receiving conditions, that is, the receiving terminal does not support a file type of the information to be shared that is shared by the sending terminal, the information to be shared is processed according to the fifth preset rule.

Specifically, the information that the user wants to share may be of various data types, such as voice, video, image, text, etc. Each data type includes one or more various file types, such as video including AVI (Audio Video Interleaved) format, MPEG (Motion Picture Experts Group) format, and etc. If the receiving terminal is a non-smart phone, it is unable to view a video in MPEG format. Therefore, it is unnecessary for the user of the sending terminal to still send information that is not supported by the receiving terminal to the receiving terminal. Therefore, before sharing information, it can firstly obtain the data types and file types supported by the receiving terminal. Generally, when there are multiple pieces of information to be shared, the data types and/or file types of those pieces of information may be different. In such case, the pieces of information to be shared whose data types and/or file types are not supported by the receiving terminal are hidden, or set to be unselectable, or a prompt message is output.

Available Space and/or Available Traffic of the Receiving Terminal

The local storage space of a phone is limited. In determining that the available space of the receiving terminal does not meet the preset receiving conditions, that is, in determining that a size of the available space of the receiving terminal is less than a size of the information to be shared that the user of the sending terminal wants to share, the information to be shared is processed according to the sixth preset rule.

Figure 16:
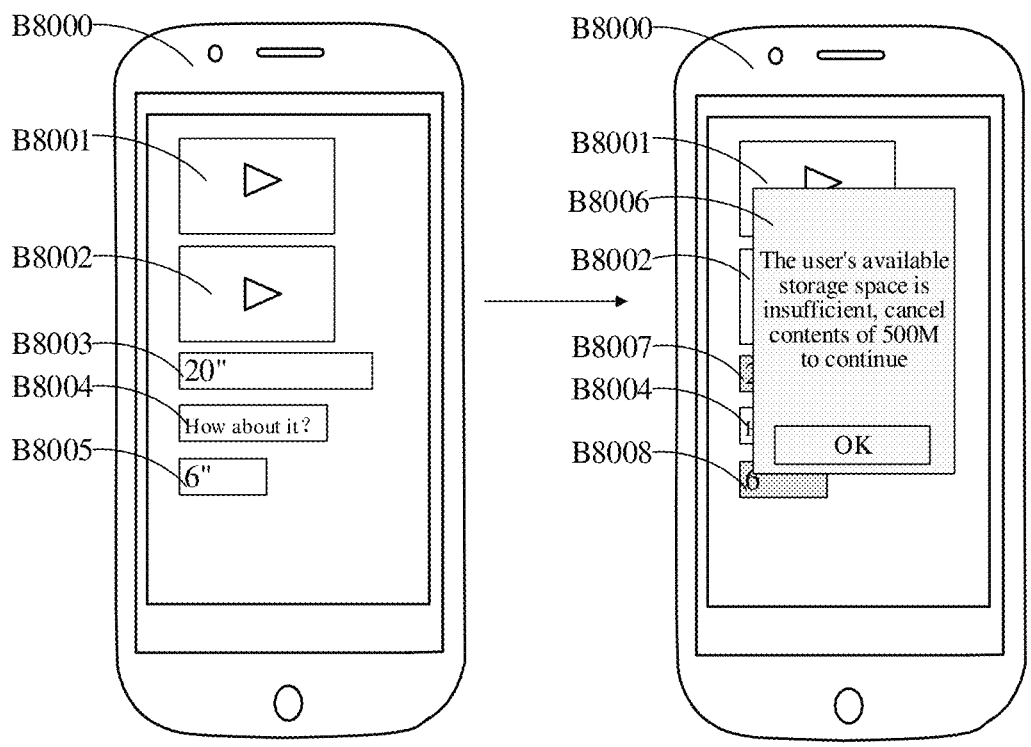
FIG. 16 is a schematic diagram of an interface scene in a thirteenth embodiment of the information sharing method of the present application.

Specifically, when the user of the sending terminal performs information sharing, the size of the information to be shared by the user of the sending terminal may exceed the size of the available local storage space of the receiving terminal, causing failure of the sharing, which not only wastes time but also wastes traffic. Therefore, it is necessary to take into account whether the size of the information to be shared exceeds the size of the available local storage space of the receiving terminal, so it is necessary to obtain the size of information when selecting information to be shared and obtain the size of the available local storage space of the receiving terminal at the same time. If the available local storage space of the receiving terminal is less than the information to be shared that the user wants to share, the user of the sending terminal is prompted that the available local storage space of the receiving terminal is not enough to receive the information to be shared, and reminded with a specific difference between the available local storage space of the receiving terminal and the information to be shared that the user wants to share (referring to FIG. 16, B8000 indicates a sending terminal, B8001, B8002, and B8004 indicate some pieces of information that can be shared in a chat log, B8003, B8005 indicate some pieces of information that cannot be shared in the chat log. B8006 indicates a prompt box that pops up after the user selects B8001 or B8002, prompting that the contact has insufficient storage space, and how big a sharing information needs to be canceled so as to support a continuing sharing, a confirmation button is also provided, or no confirmation button is provided, the prompt box automatically disappears after a certain period of time (such as 1s). B8007 and B8008 indicate views that chat information areas of the pieces of information that cannot be shared are set to be unselectable). For example, it reminds that that a size of the available space of the receiving terminal is smaller than the size of the information to be shared that the user of the sending terminal wants to share for 300 MB, and it recommends to cancel a video with a size of 310 MB from sharing and continue sharing the remaining contents, and it also provide a specific solutions, for example, it compresses the information to be shared and then shares the compressed information, for another example, it displays a size of each piece of the information to be shared that the user wants to share and recommends to cancel which piece from sharing.

In addition, extra traffic used by a mobile phone exceeding the subscribed traffic package is quite expensive, the same is true for the receiving terminal.

In determining that the available traffic of the receiving terminal does not meet the preset receiving conditions, that is, in determining that the amount of the available traffic of the receiving terminal is smaller than the size of the information to be shared by the user of the sending terminal, the information to be shared is processed according to the seventh preset rule.

Specifically, it is necessary to consider whether the traffic used in the information sharing by the sending terminal exceeds the traffic package of the receiving terminal, so it is necessary to obtain the size of the information when selecting the information to be shared, and obtain the amount of the available traffic of the receiving terminal at the same time. If the amount of the available traffic of the receiving terminal is less than the size of the information to be shared that the user wants to share, then the user of the sending terminal is prompted that the current available traffic of the receiving terminal is insufficient to receive the information to be shared that the user wants to share, and the user is also prompted with a different between the amount of the available traffic of the receiving terminal at current and the size of the information to be shared, and a specific solution is given. For example, it displays a size of each piece of the information to be shared and suggests canceling which piece from sharing, for further example, it prompts that the amount of the available traffic of the receiving terminal is smaller than the size of the information to be shared that the user of the sending terminal wants to share for 300 MB, and it recommends to cancel a video with a size of 310 MB from sharing and continue sharing the remaining contents. Generally, when there are multiple pieces of information to be shared, the sizes of the pieces of information are basically different. In such case, it can hide the piece of information whose size is larger than the amount of the available traffic, set it to be unselectable, or output prompt information. The user determines which piece of information to be shared is canceled from sharing. Each time the user chooses to send the remaining information to be shared, if the size of the remaining information to be shared is still greater than the amount of the available traffic, the user is prompted that the current available traffic of the receiving terminal is not enough to receive the information to be shared, and the user is reminded with a different between the amount of the available traffic of the receiving terminal at current and a size of the remaining information to be shared. As such, the user reselects the pieces of information to be shared till the size of the information to be shared is less than the amount of the available traffic. In addition to suggesting the user to cancel which piece of information from sharing, compression can also be used to ensure that the size of the information to be shared is less than the amount of the available traffic. Of course, the amount of the available traffic does not affect the specific sharing process. That is to say, when the amount of the available traffic is smaller than the size of the information to be shared that the user wants to share, the user is only prompted, and not limited from sharing. When each time the user is prompted, an option to still send the information is also given to the user.

Time information and/or location information of the receiving terminal

The user of the receiving terminal may be in a same time zone as the user of the sending terminal, or may be in a time zone different from that of the user of the sending terminal.

In determining that the time information of the receiving terminal does not meet the preset receiving conditions, that is, in determining that the time zone of the receiving terminal is different from the time zone of the sending terminal, the information to be shared is processed according to the tenth preset rule.

Specifically, in the case where the two are in the same zone, the user of the sending terminal generally considers based on the current time whether it is suitable for sharing information; and in the case where the two are in different time zones, for example, the user of the sending terminal is in the east eight time zone, and the receiving terminal end user is in the west eight time zone, at this time, it is obviously unsuitable for the user of the sending terminal neglects to consider the current time information of the user of the receiving terminal, for example, if the current time of the user of the sending terminal is two o'clock in the afternoon, but the current time of the user of the receiving terminal is two o'clock in the morning, obviously, it is not suitable for sharing information at this time. Therefore, if the user of the receiving terminal and the user of the sending terminal are not in the same time zone, the sending terminal needs to prompt the user of the sending terminal with the current time information of the user of the receiving terminal, and prompts the user of the sending terminal whether it is suitable for the user of the receiving terminal to receive the information to be shared at current time.

In addition, the user of the sending terminal may be in a same region as the user of the receiving terminal, or may be in a region different from that of the receiving terminal.

In determining that the location information of the receiving terminal does not meet the preset receiving conditions, that is, in determining that the region of the receiving terminal is different from the region of the sending terminal, the information to be shared is processed according to the eleventh preset rule.

Specifically, in the case where the two are in different regions, the user of the sending terminal needs to consider whether the location information of the user of the receiving terminal is suitable for receiving the information to be shared at current time. For example, the user of the receiving terminal may be on vacation, and it is obviously inappropriate to share work-related information to the user of the receiving terminal. Therefore, when sharing information, the sending terminal prompts the user of the sending terminal with a geographic location of the user of the receiving terminal, and prompts the user of the sending terminal whether it is suitable for the user of the receiving terminal to receive the information to be shared at current time.

Of course, the time information and/or location information of the receiving terminal does not affect the specific sharing process, that is to say, when the user of the receiving terminal and the user of the sending terminal are not in the same time zone and/or the same region, the user is only reminded, and not limited from sharing, so when prompting the user, an option is also provided to the user to still send the information to be shared.

Current Network Speed of the Receiving Terminal

Correspondingly, the network speed of the receiving terminal is also needed to be considered.

In determining that the current network speed of the receiving terminal does not meet the preset receiving conditions, that is, in determining that a size of the information to be shared by the user of the sending terminal is much larger than a data size that the receiving terminal can send per unit time at current, the information to be shared is processed according to the eighth preset rule.

Specifically, when the size of the information to be shared is much larger than the data size that the receiving terminal can send per unit time at current, for example, the size of the information to be shared is 1000 MB, and the current network speed of the receiving terminal can only reach 10 KB/s, the sharing will be meaningless. Therefore, in the information sharing process, it is necessary to obtain the size of the information when the user chooses to share the information, as well as the network speed of the receiving terminal. In determining that the current network speed of the receiving terminal is far less than a network speed required by the sending terminal to share the information to be shared, the user of the sending terminal is prompted that the current network speed of the receiving terminal is too slow to receive the information, and a specific solution is given. For example, a size of each piece of information to be shared is displayed and which piece of information to be shared that can be canceled is recommended. Generally, when there are multiple pieces of information to be shared, the sizes of the pieces of information are basically different. In such case, it can hide the piece of information whose size is much larger than the data size that can be sent by the receiving terminal per unit time at current, set it to be unselectable or output a prompt. Then the user determines which piece of information to be shared is canceled from sharing. Each time the user chooses to send the remaining information to be shared, if the size of the remaining information to be shared is still much larger than the data size that can be sent by the receiving terminal per unit time at current, the user is prompted that the current network speed of the receiving terminal is insufficient to send the information to be shared that the user wants to share, and the user is reminded with a specific value of the current network speed of the receiving terminal, and suggested to wait for the network speed to be restored and sufficient to support the sharing of the information that the user wants to share, or the user is prompted to choose to let the sending terminal to automatically sent the information that the user wants to share when the network speed is sufficient to support the receiving of the information. In addition to the above method of processing information that does not meet the network speed, compression can also be used to ensure that the size of the information to be shared meets the network speed. Of course, the network speed will not affect the specific sharing process. That is to say, when the network speed of the receiving terminal is much less than that required by the sending terminal to share the information to be shared, the user is only prompted, and not limited from sharing. When each time the user is prompted, an option to still send the information is also given to the user.

Current Mode of the Receiving Terminal

In determining that the receiving terminal is in a preset profile mode, the information to be shared is processed according to the ninth preset rule.

The user of the receiving terminal can set a mode of the receiving terminal as needed. For example, when the receiving terminal is in a guest mode, the user of the receiving terminal is generally not the owner, that is, the owner considers privacy protection or other situations, and sets the terminal (such as a mobile phone) to be in the guest mode when the terminal is lent to others, thereby to prevent the others from revealing the owner's privacy during use. Therefore, in the guest mode, if the information chosen to be shared by the user of the sending terminal is a locally stored file (such as a video, a document, an image, or the like), the user can be prompted that the receiving terminal is currently in the guest mode, continuing to send may reveal privacy. It asks the user of the sending terminal whether to still share the information or not, or prompts the user to encrypt the information to be shared. In addition, when the receiving terminal is in a safe mode, if the information chosen to be shared by the user of the sending terminal is a file (such as a video, a document, an image, or the like), it can prompt the user that the receiving terminal is in the safe mode and prohibit such information sharing, or prompt the user to encrypt the information to be shared. In addition, when the receiving terminal is in a child mode, the user of the receiving terminal is generally not the owner at this moment but the child of the owner or another junior. It is understandable it is not largely another but the owner that the user of the sending terminal wants to share the information to be shared with. It can remind the user of the sending terminal that the current receiving terminal is in the child mode, or it prompts the user to encrypt the information to be shared. In addition, the receiving terminal may also be in an elderly mode. Similarly, the user of the receiving terminal at this time is generally the owner's elder. It is understandable it is not largely another but the owner that the user of the sending terminal wants to share the information to be shared with. It can prompt the user of the sending terminal that the receiving terminal is currently in the elderly mode, or prompt the user to encrypt the information to be shared.

For the child mode and the elderly mode do not affect the specific sharing process, that is, when the receiving terminal is in the child mode and/or the elderly mode, it only prompts the user, not restricts the user from sharing. When the user is prompted, the user is also given a choice to still send the information to be shared.

In addition to the above modes, due to different needs, the receiving terminal may also be in a navigation mode. When the receiving terminal is in the navigation mode, it is obviously inconvenient to receive information. At this time, the sharing of the sending terminal will pose a threat to the driving safety of the user of the receiving terminal. In addition, when the receiving terminal is in a conference mode, the user of the receiving terminal is also inconvenient to receive information. Therefore, in the information sharing process, it is necessary to obtain a current mode of the receiving terminal before the user of the sending terminal sends the information to be shared, thus to avoid disturb the user of the receiving terminal when the user of the receiving terminal is inconvenient to receive information. Therefore, when it is acquired that the receiving terminal is in the navigation mode or the conference mode, the user of the sending terminal may be prompted that the receiving terminal is currently in the navigation mode or the conference mode. Of course, the receiving terminal being in the navigation mode or the conference mode does not affect the specific sharing process. That is to say, when the receiving terminal is in the navigation mode or the conference mode, it only prompts the user, not restricts the user from sharing. Therefore, when the user is prompted, the user is also given a choice to still send the information to be shared.

In addition, at present most mobile phones' profile modes are still manually set by the user. However, in some scenarios, a mobile phone can automatically enter a profile mode according to a current usage scenario. For example, when entering a game application, the mobile phone will automatically enter a game mode. Therefore, regardless of whether the above-mentioned guest mode, safety mode, child mode, and elderly mode are manually set or automatically entered by the mobile phone, those modes all belong to the category of profile modes.

In addition, it can be known from the above that the mobile phone can automatically enter a corresponding profile mode according to the current usage scenario, and the mobile phone can also be set to be in a corresponding smart mode to enter the corresponding profile mode in a faster and smarter way. Considering the problem of a degree of intelligence in the smart mode, it may affect the normal use of the mobile phone by the user at the beginning, so a switch for entering the smart mode can be set in a developer mode or a debugging mode.

In addition, in addition to that the mobile phone can be set to a preset profile mode, it can also put a certain application of the mobile phone alone in a preset profile mode, and the mobile phone being in a preset mode may not affect the application being in a preset mode, for example, the mobile phone is in a smart mode, and the application is in a normal mode. Certain preset modes of the mobile phone may also affect a preset mode of the application, for example, if the mobile phone is in a traffic saving mode, the application cannot be in the normal mode. Specifically, whether a profile mode of the mobile phone has a higher priority than the profile mode of the application can be preset in the system of the mobile phone. When the receiving terminal is in a preset mode, that is, which profile mode of the mobile phone being in and/or which profile mode of an application being in determines whether to execute operation B10 to process the information to be shared.

System Language and/or Current Application Language of the Receiving Terminal

For the user of the sending terminal, when performing the information sharing operation, the user may be given no attention to whether the user of the receiving terminal has a language ability to browse the information shared by the user of the sending terminal.

If the system language of the receiving terminal is different from the system language of the sending terminal, and/or the application language of the receiving terminal is different from the application language of the sending terminal, the information to be shared is processed according to the thirteenth preset rule.

Specifically, if the user of the receiving terminal cannot understand the content of the information shared by the user of the sending terminal to the user of the receiving terminal due to language barrier, sharing information under such a situation is meaningless. Therefore, during information sharing, the system language and/or current application language of the receiving terminal can be obtained (generally, obtaining the current application language is for instant messaging software, because such software each usually has a dedicated terminal client, the acquisition of system language is aimed at the situation where the receiving terminal does not need to use a dedicated client to receive information during the information sharing process). After the system language and/or the current application language of the receiving terminal is obtained, if the system language and/or the current application language of the receiving terminal is different from a language of the information to be shared by the sending terminal, the user of the sending terminal is prompted and a function to convert the language of the information to be shared into the system language of the receiving terminal and/or the current application language is provided.

Status information of the receiving terminal and/or status information of the user of the receiving terminal The size of the information to be shared affects a time length of sending and/or receiving the information.

Specifically, when the status of the sending terminal, such as the power is not enough to complete the process of sending the information to be shared; or when the power of the receiving terminal is not enough to complete the process of receiving the information to be shared, information sharing may fail. Therefore, it is necessary to obtain the status information of the sending terminal and/or the receiving terminal when sharing information to ensure that the process of sharing information is successfully completed. If the status information of the receiving terminal and/or the status information of the user of the receiving terminal is insufficient to complete the information sharing process, then the sharing of information is canceled, or the user is prompted to cancel the sharing of certain piece of information to ensure the successful sharing of information.

In this embodiment, the second type filtering information is obtained from the receiving terminal, and the information to be shared is processed according to the obtained second type filtering information, so as to ensure that the receiving terminal does not use extra traffic, the user of the receiving terminal does not have to wait for the information to be sent for a long time to protect the privacy of the user of the sending terminal, the user of the receiving terminal is not affect and is facilitated to browse the information, and it enables the sending terminal to complete the sending of the information to be shared and/or enables the receiving terminal to complete the receiving of the information to be shared. The purpose of intelligently selecting information to be shared is realized.

Further, in a fourteenth embodiment of the information sharing method of the present application, based on the twelfth or thirteenth embodiment, before operation B10, the method further includes: determining whether a currently selected mode is a preset mode.

According to the user's selection, it is determined whether the information selection mode of the current terminal (such as a mobile phone) is currently in the smart mode or the normal mode when to share information. The switch of the smart mode can only appear when the phone is in the developer mode or the debugging mode in the system settings. The switch can also be built into an application (such as in the laboratory function of the application). In addition, because at the current, a mobile phone can automatically enters a profile mode according to the current usage scenario, one of the profile modes of the mobile phone can be the smart mode (for example, when the user opens a game application, the mobile phone automatically enters a game mode), and when the user of the mobile phone performs a sharing operation, information selection mode of the mobile phone will automatically enter the smart mode. Specifically, when the mobile phone is in the smart mode, the mobile phone can automatically enter a traffic saving mode according to certain conditions (such as when the available traffic is insufficient, the mobile phone automatically enters the traffic saving mode) or enter the safe mode (such as when the information to be shared contains files, the mobile phone automatically enters the safe mode). When the information selection mode is in the normal mode, a follow-up processing is performed according to the rules of the system or a corresponding application, such as according to the rules of sharing function that comes with WeChat.

Of course, even when the selection mode is in the normal mode, the method can be selected for execution.

In determining that the currently selected profile mode is a preset profile mode, operation B10 is performed.

In determining that the current profile mode of the mobile phone is any one of the above-mentioned smart mode, normal mode, traffic saving mode, and security mode, operation B10 is performed.

In this embodiment, whether to perform the information sharing method after operation B10 is determined by judging whether the current profile mode of the mobile phone is any one of smart mode, normal mode, traffic saving mode, and safe mode, and the above modes can be selected by the user to switch therebetween, thereby making information processing more intelligent.

Further, in a fifteenth embodiment of the information sharing method of the present application, based on the above fourteenth embodiment, the first type filtering information includes at least one of the following:

authentication information of a current user of the sending terminal;

permission information of the information to be shared;

the available traffic of the sending terminal;

the current network speed of the sending terminal; and the current mode of the sending terminal.

Authentication Information of a Current User of the Sending Terminal

When the current user of the sending terminal who is not the owner or an authorized user of the owner of the sending terminal shares information (chooses information to be shared or sends information to be shared), especially when the information chosen or sent by the current user's contains a file, and more especially when the file is an encrypted file, it is necessary to prevent the current user from performing information sharing. A way to identify an identifier of a current user can be the biological recognition (such as fingerprint information or face information), or passwords, etc. For identifying a user's identifier based on face information, a terminal can detect whether a current user is the owner, and directly provides the current user the information sharing information function without displaying a prompt information when the current user is the owner and passes the verification. When the current user is not the owner, the current user is prompted that users not the owner are prohibited from sharing information, which thus not affect the user's normal use.

Permission Information of the Information to be Shared

There are many situations in which information of a chat log cannot be shared. For example, if the information the user of the sending terminal wants to share is an article, a video, or the like that is copyrighted, the information is not allowed to be shared until the user is authorized by the author of the information. For still another example, the information involving the privacy of others, or violating national laws and regulations or social morals that is not allowed to be spread; similarly, the terminal system preset information, the information downloaded by the user from the Internet, the information entered by the user on the terminal, and the information on the terminal application are not allowed to be shared when the above conditions are not met. There is also a possibility that the information itself is not supported to be shared by the application of the sending terminal or not supported to be received by the application of the receiving terminal. For example, voice information in WeChat is not supported to be shared.

The Available Traffic of the Sending Terminal

We know that extra traffic used by terminals (such as mobile phones) exceeding the subscribed traffic package is quite expensive. Therefore, it is necessary to take into account whether the data traffic used when sharing information by the sending terminal will exceed the subscribed data package. So, when selecting information to be shared, it is necessary to obtain a size of the information to be shared and at the same time to obtain the available traffic of the sending terminal (refer to FIG. 14, at current mobile phones generally have functions to obtain the data traffic usage of the mobile phones and the available traffic, B6000 indicates a sending terminal, B6001, B6002, B6004 indicate some pieces of information that can be shared in a chat log, B6003 and B6005 indicate some pieces of information that cannot be shared in the chat log, B6006 indicates a prompt box that pops up after the user selects B6001, B6002, or B6004 to remind the user that the available traffic is insufficient and an amount of the available traffic and provide a confirmation button, or it does not provides the confirmation button, and the prompt box automatically disappears after a certain period of time (such as Is). B6007 indicates a view that chat information area of the piece of information indicated by B6002 and having a size exceeding the amount of the available traffic of the receiving terminal is set to be in a unselectable state. B6008 and B6009 indicate views that chat information areas of the pieces of information that cannot be shared are set to be in an unselectable state).

In determining that the available traffic of the sending terminal does not meet the preset sending conditions, that is, in determining that an amount of the available traffic of the sending terminal is less than the size of the information to be shared that the user of the sending terminal wants to share, the information to be shared is processed according to the first preset rule.

Specifically, the user of the sending terminal is prompted that the current available traffic of the sending terminal is insufficient to send the information to be shared that the user wants to share, and the user is also prompted with a different between the amount of the available traffic of the sending terminal at current and a size of the information to be shared, and a specific solution is given. For example, it displays a size of each piece of the information to be shared and suggests canceling which piece from sharing, for further example, it prompts that an amount of the available traffic of the receiving terminal is smaller than the size of the information to be shared that the user of the sending terminal wants to share for 300 MB, and it recommends to cancel a video with a size of 310 MB from sharing and continue sharing the remaining contents. Generally, when there are multiple pieces of information to be shared, the sizes of the pieces of information are basically different. In such case, it can hide the piece of information whose size is larger than the amount of the available traffic, set it to be unselectable, or output prompt information. The user determines which piece of information to be shared is canceled from sharing. Each time the user chooses to send the remaining information to be shared, if the size of the remaining information to be shared is still greater than the amount of the available traffic, the user is prompted that the current available traffic of the sending terminal is not enough to send the information to be shared, and the user is reminded with a different between the amount of the available traffic of the sending terminal at current and a size of the remaining information to be shared. As such, the user reselects the pieces of information to be shared till a size of the information to be shared is less than an amount of the available traffic. In addition to suggesting the user to cancel which piece of information from sharing, compression can also be used to ensure that the size of the information to be shared is less than the amount of the available traffic. Of course, the amount of the available traffic does not affect the specific sharing process. That is to say, when the amount of the available traffic is less than the size of the information to be shared that the user wants to share, the user is only prompted, and not limited from sharing. When each time the user is prompted, an option to still send the information is also given to the user.

Current Network Speed of the Sending Terminal

The network speed of the sending terminal (such as a real-time network speed of a mobile phone obtained from a floating window of a certain management tool (such as the Tencent housekeeper)) is also needed to be taken into account.

In determining that the current network speed of the sending terminal does not meet the preset sending conditions, that is, when the size of the information to be shared by the user of the sending terminal is much larger than the data size of that the sending terminal can send per unit time, the information to be shared is processed according to a second preset rule.

Specifically, when the size of the information to be shared is much larger than the data size that the sending terminal can send per unit time at current, for example, the size of the information to be shared is 1000 MB, and the current network speed of the sending terminal can only reach 10 KB/s, it is conceivable that the sharing will be meaningless. Therefore, in the information sharing process, it is necessary to obtain the size of the information when the user chooses to share the information, as well as the network speed of the sending terminal. In determining that the current network speed of the sending terminal is far less than a network speed required by the sending terminal to share the information to be shared, the user is prompted that the current network speed of the sending terminal is too slow to send the information, and a specific solution is given. For example, a size of each piece of information to be shared is displayed and which piece of information to be shared that can be canceled is recommended. Generally, when there are multiple pieces of information to be shared, the sizes of the pieces of information are basically different. In such case, it can hide the piece of information whose size is much larger than the data size that can be sent by the sending terminal per unit time at current, set it to be unselectable (refer to FIG. 15, B7000 indicates a sending terminal, B7001, B7002, and B7004 indicate some pieces of information that can be shared in a chat log, B7003 and B7005 indicate some pieces of information that cannot be shared in the chat log, and B7006 and B7007 indicate views that chat information areas of the pieces of information that cannot be shared because each of which has a size much larger than the data size that can be sent by the sending terminal per unit time at current, are set be unselectable. B7008 and B7009 indicate views that chat information areas of the pieces of information that cannot be shared are set to be unselectable. After B7006 is selected by the user, it automatically sets the chat information areas indicated respectively by B7006, B7007, B7008, and B7009 to unselectable) or outputs a prompt. Then the user determines which piece of information to be shared is canceled from sharing. Each time the user chooses to send the remaining information to be shared, if the size of the remaining information to be shared is still much larger than the data size that can be sent by the sending terminal per unit time at current, the user is prompted that the current network speed of the sending terminal is insufficient to send the information to be shared that the user wants to share, and the user is reminded with a specific value of the current network speed of the sending terminal, and suggested to wait for the network speed to be restored and sufficient to support the sharing of the information that the user wants to share, or the user is prompted to choose to let the sending terminal to automatically sent the information that the user wants to share when the network speed is sufficient to support the sending of the information. In addition to the above method of processing information that does not meet the network speed, compression can also be used to ensure that the size of the information to be shared meets the network speed. Of course, the network speed will not affect the specific sharing process. That is to say, when the network speed of the sending terminal is much less than that required by the sending terminal to share the information to be shared, the user is only prompted, and not limited from sharing. When each time the user is prompted, an option to still send the information is also given to the user.

Current Mode of the Sending Terminal

The user of the sending terminal can set a mode of the sending terminal as needed. For example, when the sending terminal is in a guest mode, the current user of the sending terminal is generally not the owner, that is, the owner considers privacy protection or other situations, and sets the terminal (such as a mobile phone) to be in the guest mode when the terminal is lent to others, thereby to prevent the others from revealing the owner's privacy during use. Therefore, in the guest mode, if the information chosen to be shared by the user of the sending terminal is a locally stored file (such as a video, a document, an image, or the like), the user can be prompted that the sending terminal is currently in the guest mode and such information sharing is forbidden. In addition, when the sending terminal is in a safe mode, if the information chosen to be shared by the user of the sending terminal is a file (such as a video, a document, an image, or the like), the user can be prompted that the sending terminal is currently in the safety mode and such information sharing is forbidden. In addition, when the sending terminal is in a child mode, generally at this moment, the user of the sending terminal is not the owner but the owner's child or another junior, the user of the sending terminal may be unfamiliar with the mobile phone, and in such case, a series of misoperation may occur and may trigger a sharing process. It is understandable under such a situation, the user of the sending terminal does not need to share information. Thus the user can be prompted that the sending terminal is currently in the child mode and such information sharing is forbidden. In addition, the sending terminal may also be in an elderly mode. Similarly, the user of the sending terminal at this moment is generally the owner's elder, and they are unfamiliar with the current mobile phone. When the elder use the mobile phone, it will also produce a series of misoperation that lead to a sharing process. But the user of the sending terminal actually does not need to share information. Thus the user can be prompted that the sending terminal is currently in the elderly mode and such information sharing is forbidden.

In addition, at present most mobile phones' profile modes are still manually set by the user. However, in some scenarios, a mobile phone can automatically enter a profile mode according to a current usage scenario. For example, when entering a game application, the mobile phone will automatically enter a game mode. Therefore, regardless of whether the above-mentioned guest mode, safety mode, child mode, and elderly mode are manually set or automatically entered by the mobile phone, those modes all belong to the category of profile modes.

In addition, it can be known from the above that the mobile phone can automatically enter a corresponding profile mode according to the current usage scenario, and the mobile phone can also be set to be in a corresponding smart mode to enter the corresponding profile mode in a faster and smarter way. Considering the problem of a degree of intelligence in the smart mode, it may affect the normal use of the mobile phone by the user at the beginning, so a switch for entering the smart mode can be set in a developer mode or a debugging mode.

In addition, in addition to that the mobile phone can be set to a preset profile mode, it can also put a certain application of the mobile phone alone in a preset profile mode, and the mobile phone being in a preset profile mode may not affect the application being in a preset profile mode, for example, the mobile phone is in a smart mode, and the application is in a normal mode. Certain preset modes of the mobile phone may also affect a preset mode of the application, for example, if the mobile phone is in a traffic saving mode, the application cannot be in the normal mode. Specifically, whether a profile mode of the mobile phone has a higher priority than a profile mode of the application can be preset in the system of the mobile phone. When the sending terminal is in a preset mode, that is, which profile mode of the mobile phone being in and/or which profile mode of an application being in determines whether to execute operation B10 to process the information to be shared according to the third processing rule.

In this embodiment, the first type filtering information is obtained from the sending terminal, and the information to be shared is processed according to the obtained first type filtering information, so as to ensure that the sending terminal does not use extra traffic, and the user of the sending terminal does not have to wait for the information to be sent for a long time to protect the privacy of the user of the sending terminal. The purpose of intelligently selecting information to be shared is realized.

Further, in a sixteenth embodiment of the information sharing method of the present application, based on the fourteenth embodiment, the second type filtering information includes at least one of the following:

the data type and/or file type supported by the receiving terminal;

the available space and/or available traffic of the receiving terminal;

the time information and/or location information of the receiving terminal;

the current network speed of the receiving terminal;

the current mode of the receiving terminal.

The data type and/or file type supported by the receiving terminal

For the receiving terminal, the data types and file types it can handle have certain limitations.

In determining that the data types supported by the receiving terminal do not meet the preset receiving conditions, that is, the receiving terminal does not support a data type of the information to be shared that is shared by the sending terminal, the information to be shared is processed according to the fourth preset rule. In determining that the file types supported by the receiving terminal do not meet the preset receiving conditions, that is, the receiving terminal does not support a file type of the information to be shared that is shared by the sending terminal, the information to be shared is processed according to the fifth preset rule.

Specifically, the information that the user wants to share may be of various data types, such as voice, video, image, text, etc. Each data type includes one or more various file types, such as video including AVI (Audio Video Interleaved) format, MPEG (Motion Picture Experts Group) format, and etc. If the receiving terminal is a non-smart phone, it is unable to view a video in MPEG format. Therefore, it is unnecessary for the user of the sending terminal to still send information that is not supported by the receiving terminals to the receiving terminal. Therefore, before sharing information, it can firstly obtain the data types and file types supported by the receiving terminal. Generally, when there are multiple pieces of information to be shared, the data types and/or file types of those pieces of information may be different. In such case, the pieces of information to be shared whose data types and/or file types are not supported by the receiving terminal are hidden, or set to be unselectable, or a prompt message is output.

Available Space and/or Available Traffic of the Receiving Terminal

The local storage space of a phone is limited. In determining that the available space of the receiving terminal does not meet the preset receiving conditions, that is, in determining that a size of the available space of the receiving terminal is less than the size of the information to be shared that the user of the sending terminal wants to share, the information to be shared is processed according to the sixth preset rule.

Specifically, when the user of the sending terminal performs information sharing, the size of the information to be shared by the user of the sending terminal may exceed the size of the available local storage space of the receiving terminal, causing failure of the sharing, which not only wastes time but also wastes traffic. Therefore, it is necessary to take into account whether the size of the information to be shared exceeds the size of the available local storage space of the receiving terminal, so it is necessary to obtain the size of information when selecting information to be shared and obtain the size of available local storage space of the receiving terminal at the same time. If the available local storage space of the receiving terminal is smaller than the information to be shared that the user wants to share, the user of the sending terminal is prompted that the available local storage space of the receiving terminal is not enough to receive the information to be shared, and reminded with a specific different between the available local storage space of the receiving terminal and the information to be shared that the user wants to share (referring to FIG. 16, B8000 indicates a sending terminal, B8001, B8002, and B8004 indicate some pieces of information that can be shared in a chat log, B8003 and B8005 indicate some pieces of information that cannot be shared in the chat log. B8006 indicates a prompt box that pops up after the user selects B8001 or B8002, prompting that the contact has insufficient storage space, and how big a piece of sharing information needs to be canceled so as to support a continuing sharing, a confirmation button is also provided, or no confirmation button is provided, the prompt box automatically disappears after a certain period of time (such as Is). B8007 and B8008 indicate views that chat information areas of the pieces of information that cannot be shared are set to be unselectable). For example, it reminds that that the size of the available space of the receiving terminal is smaller than the size of the information to be shared that the user of the sending terminal wants to share for 300 MB, and it recommends to cancel a video with a size of 310 MB from sharing and continue sharing the remaining contents, and it also provides a specific solutions, for example, it compresses the information to be shared and then shares the compressed information, for another example, it displays a size of each piece of the information to be shared that the user wants to share and recommends to cancel which piece from sharing.

In addition, extra traffic used by a mobile phone exceeding the subscribed traffic package is quite expensive, the same is true for the receiving terminal.

In determining that available traffic of the receiving terminal does not meet the preset receiving conditions, that is, in determining that the amount of the available traffic of the receiving terminal is smaller than the size of the information to be shared by the user of the sending terminal, the information to be shared is processed according to the seventh preset rule.

Specifically, it is necessary to consider whether the traffic used in the information sharing by the sending terminal exceeds the traffic package of the receiving terminal, so it is necessary to obtain the size of the information when selecting the information to be shared, and obtain the amount of the available traffic of the receiving terminal at the same time. If the amount of the available traffic of the receiving terminal is less than the size of the information to be shared that the user wants to share, then the user of the sending terminal is prompted that the current available traffic of the receiving terminal is insufficient to receive the information to be shared that the user wants to share, and the user is also prompted with a different between the amount of the available traffic of the receiving terminal at current and the size of the information to be shared, and a specific solution is given. For example, it displays a size of each piece of the information to be shared and suggests canceling which piece from sharing, for further example, it prompts that the amount of the available traffic of the receiving terminal is smaller than the size of the information to be shared that the user of the sending terminal wants to share for 300 MB, and it recommends to cancel a video with a size of 310 MB from sharing and continue sharing the remaining contents. Generally, when there are multiple pieces of information to be shared, the sizes of those pieces of information are basically different. In such case, it can hide the piece of information whose size is larger than the amount of the available traffic, set it to be unselectable, or output prompt information. The user determines which piece of information to be shared is canceled from sharing. Each time the user chooses to send the remaining information to be shared, if the size of the remaining information to be shared is still greater than the amount of the available traffic, the user is prompted that the current available traffic of the receiving terminal is not enough to receive the information to be shared, and the user is reminded with a different between the amount of the available traffic of the receiving terminal at current and a size of the remaining information to be shared. As such, the user reselects the pieces of information to be shared till the size of the information to be shared is less than the amount of the available traffic. In addition to suggesting the user to cancel which piece of information from sharing, compression can also be used to ensure that the size of the information to be shared is less than the amount of the available traffic. Of course, the amount of the available traffic does not affect the specific sharing process. That is to say, when the amount of the available traffic is smaller than the size of the information to be shared that the user wants to share, the user is only prompted, and not limited from sharing. When each time the user is prompted, an option to still send the information is also given to the user.

The Time Information and/or Location Information of the Receiving Terminal

The user of the receiving terminal may be in a same time zone as the user of the sending terminal, or may be in a time zone different from that of the user of the sending terminal.

In determining that the time information of the receiving terminal does not meet the preset receiving conditions, that is, in determining that the time zone of the receiving terminal is different from the time zone of the sending terminal, the information to be shared is processed according to the tenth preset rule.

Specifically, in the case where the two are in the same zone, the user of the sending terminal generally considers based on the current time whether it is suitable for sharing information; and in the case where the two are in different time zones, for example, the user of the sending terminal is in the east eight time zone, and the receiving terminal end user is in the west eight time zone, at this time, it is obviously unsuitable for the user of the sending terminal neglects to consider the current time information of the user of the receiving terminal, for example, if the current time of the user of the sending terminal is two o'clock in the afternoon, but the current time of the user of the receiving terminal is two o'clock in the morning, obviously, it is not suitable for sharing information at this time. Therefore, if the user of the receiving terminal and the user of the sending terminal are not in the same time zone, the sending terminal needs to prompt the user of the sending terminal with the current time information of the user of the receiving terminal. In addition, the user of the sending terminal may be in a same region as the user of the receiving terminal, or may be in a region different from that of the receiving terminal.

In determining that the location information of the receiving terminal does not meet the preset receiving conditions, that is, in determining that the region of the receiving terminal is different from the region of the sending terminal, the information to be shared is processed according to the eleventh preset rule.

Specifically, in the case where the two are in different regions, the user of the sending terminal needs to consider whether the location information of the user of the receiving terminal is suitable for receiving the information to be shared at current time. For example, the user of the receiving terminal may be on vacation, and it is obviously inappropriate to share work-related information to the user of the receiving terminal. Therefore, when sharing information, the sending terminal prompts the user of the sending terminal with a geographic location of the user of the receiving terminal.

Of course, the time information and/or location information of the receiving terminal does not affect the specific sharing process, that is to say, when the user of the receiving terminal and the user of the sending terminal are not in the same time zone and/or the same region, the user is only reminded, and not limited from sharing, so when prompting the user, an option is also provided to the user to still send the information to be shared.

Current Network Speed of the Receiving Terminal

Correspondingly, the network speed of the receiving terminal is also needed to be considered.

In determining that the current network speed of the receiving terminal does not meet the preset receiving conditions, that is, in determining that the size of the information to be shared by the user of the sending terminal is much larger than a data size that the receiving terminal can send per unit time at current, the information to be shared is processed according to the eighth preset rule.

Specifically, when the size of the information to be shared is much larger than the data size that the receiving terminal can send per unit time at current, for example, the size of the information to be shared is 1000 MB, and the current network speed of the receiving terminal can only reach 10 KB/s, the sharing will be meaningless. Therefore, in the information sharing process, it is necessary to obtain the size of the information when the user chooses to share the information, as well as the network speed of the receiving terminal. In determining that the current network speed of the receiving terminal is far less than a network speed required by the sending terminal to share the information to be shared, the user of the sending terminal is prompted that the current network speed of the receiving terminal is too slow to receive the information, and a specific solution is given. For example, a size of each piece of information to be shared is displayed and which piece of information to be shared that can be canceled is recommended. Generally, when there are multiple pieces of information to be shared, the sizes of those pieces of information are basically different. In such case, it can hide the piece of information whose size is much larger than the data size that can be sent by the receiving terminal per unit time at current, set it to be unselectable or outputs a prompt. Then the user determines which piece of information to be shared is canceled from sharing. Each time the user chooses to send the remaining information to be shared, if the size of the remaining information to be shared is still much larger than the data size that can be sent by the receiving terminal per unit time at current, the user is prompted that the current network speed of the receiving terminal is insufficient to send the information to be shared that the user wants to share, and the user is reminded with a specific value of the current network speed of the receiving terminal, and suggested to wait for the network speed to be restored and sufficient to support the sharing of the information that the user wants to share, or the user is prompted to choose to let the sending terminal to automatically sent the information that the user wants to share when the network speed is sufficient to support the receiving of the information. In addition to the above method of processing information that does not meet the network speed, compression can also be used to ensure that the size of the information to be shared meets the network speed. Of course, the network speed will not affect the specific sharing process. That is to say, when the network speed of the receiving terminal is much less than that required by the sending terminal to share the information to be shared, the user is only prompted, and not limited from sharing. When each time the user is prompted, an option to still send the information is also given to the user.

Current Mode of the Receiving Terminal

The user of the receiving terminal can set a mode of the receiving terminal as needed. For example, when the receiving terminal is in a guest mode, the user of the receiving terminal is generally not the owner, that is, the owner considers privacy protection or other situations, and sets the terminal (such as a mobile phone) to be in the guest mode when the terminal is lent to others, thereby to prevent the others from revealing the owner's privacy during use. Therefore, in the guest mode, if the information chosen to be shared by the user of the sending terminal is a locally stored file (such as a video, a document, an image, or the like), the user can be prompted that the receiving terminal is currently in a guest mode, continuing to send may reveal privacy and ask the user of the sending terminal whether to still share the information or not, or prompts the user to encrypt the information to be shared. In addition, when the receiving terminal is in a safe mode, if the information chosen to be shared by the user of the sending terminal is a file (such as a video, a document, an image, or the like), it can prompt the user that the receiving terminal is in the safe mode and prohibit such information sharing, or prompt the user to encrypt the information to be shared. In addition, when the receiving terminal is in a child mode, the user of the receiving terminal is generally not the owner at this moment but the child of the owner or another junior. It is understandable it is not largely another but the owner that the user of the sending terminal wants to share the information to be shared with. It can remind the user of the sending terminal that the current receiving terminal is in the child mode, or it prompts the user to encrypt the information to be shared. In addition, the receiving terminal may also be in an elderly mode. Similarly, the user of the receiving terminal at this time is generally the owner's elder. It is understandable it is not largely another but the owner that the user of the sending terminal wants to share the information to be shared with. It can prompt the user of the sending terminal that the receiving terminal is currently in the elderly mode, or prompt the user to encrypt the information to be shared.

For the child mode and the elderly mode do not affect the specific sharing process, that is, when the receiving terminal is in the child mode and/or the elderly mode, it only prompts the user, not restricts the user from sharing. When the user is prompted, the user is also given a choice to still send the information to be shared.

In addition to the above modes, due to different needs, the receiving terminal may also be in a navigation mode. When the receiving terminal is in the navigation mode, it is obviously inconvenient to receive information. In addition, when the receiving terminal is in a conference mode, the user of the receiving terminal is also inconvenient to receive information. Therefore, in the information sharing process, it is necessary to obtain a current mode of the receiving terminal before the user of the sending terminal sends the information to be shared, thus to avoid disturb the user of the receiving terminal when the user of the receiving terminal is inconvenient to receive information. Therefore, when it is acquired that the receiving terminal is in the navigation mode or the conference mode, the user of the sending terminal may be prompted that the receiving terminal is currently in the navigation mode or the conference mode. Of course, the receiving terminal being in the navigation mode or the conference mode does not affect the specific sharing process. That is to say, when the receiving terminal is in the navigation mode or the conference mode, it only prompts the user, not restricts the user from sharing. Therefore, when the user is prompted, the user is also given a choice to still send the information to be shared.

In addition, at present most mobile phones' profile modes are still manually set by the user. However, in some scenarios, a mobile phone can automatically enter a profile mode according to a current usage scenario. For example, when entering a game application, the mobile phone will automatically enter a game mode. Therefore, regardless of whether the above-mentioned guest mode, safety mode, child mode, and elderly mode are manually set or automatically entered by the mobile phone, those modes all belong to the category of profile modes.

In addition, it can be known from the above that the mobile phone can automatically enter a corresponding profile mode according to the current usage scenario, and the mobile phone can also be set to be in a corresponding smart mode to enter the corresponding profile mode in a faster and smarter way. Considering the problem of a degree of intelligence in the smart mode, it may affect the normal use of the mobile phone by the user at the beginning, so a switch for entering the smart mode can be set in a developer mode or a debugging mode.

In addition, in addition to that the mobile phone can be set to a preset profile mode, it can also put a certain application or some applications of the mobile phone alone in a preset profile mode, and the profile modes of the mobile phone may not affect the preset modes of the application. For example, the mobile phone is in a smart mode, and the application is in a normal mode. Certain preset modes of the mobile phone may affect a preset mode of the application, for example, if the mobile phone is in a traffic saving mode, the application cannot be in the normal mode. Specifically, whether a profile mode of the mobile phone has a higher priority than a profile mode of the application can be preset in the system of the mobile phone. When the receiving terminal is in a preset mode, that is, which profile mode of the mobile phone being in and/or which profile mode of an application being in determines whether to execute operation B10 to process the information to be shared according to the twelfth preset rule.

In this embodiment, the second type filtering information is obtained from the receiving terminal, and the information to be shared is processed according to the obtained second type filtering information, so as to ensure that the receiving terminal does not use extra traffic, and the user of the receiving terminal does not have to wait for the information to be sent for a long time, and so that the privacy of the user of the sending terminal is protected and the user of the receiving terminal does not be affected. The purpose of intelligently selecting information to be shared is realized.

In addition, the above first preset rule, second preset rule, third preset rule, fourth preset rule, fifth preset rule, sixth preset rule, seventh preset rule, eighth preset rule, ninth preset rule, tenth preset rule, eleventh preset rule, twelfth preset rule, thirteenth preset rule, fourteenth preset rule each includes one or more of filtering, hiding, and setting to an unselectable state, displaying one or more of corresponding mark(s) indicating not support sharing, outputting prompt information, compressing, and encrypting, and those preset rules may be the same or different.

In addition, on the basis that the information sharing method of the present application can be implemented, any two or more embodiments of the above information sharing method can be combined, with repeated schemes in which are appropriately deleted, to form a new embodiment.

Figure 17:
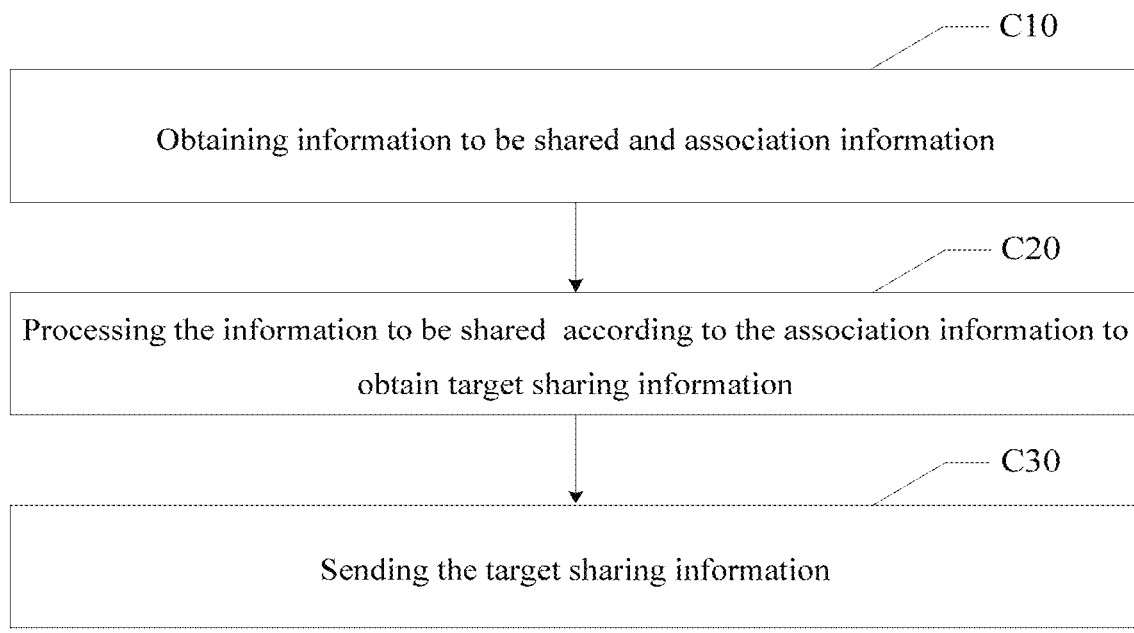
FIG. 17 is a schematic flowchart of a seventeenth embodiment of the information sharing method of the application.

Referring to FIG. 17, in a seventeenth embodiment of the present application, the information sharing method includes the following operations.

In operation C10, information to be shared and association information are obtained.

Before this operation is executed, a condition for determining a current mode of a terminal may be added. If the current mode of the terminal is a preset mode (including at least one of a smart mode, a normal mode, a traffic saving mode, and a security mode), this operation C10 is executed.

According to the user's selection, it is determined whether an information selection mode of the current terminal (such as a mobile phone) is in a smart mode or in a normal mode when to share information. A switch of the smart mode can only appear when the mobile phone is in the developer mode or in the debugging mode defined in the system settings. The switch can also be built into an application (such as in the laboratory function of the application). In addition, because at the current, a mobile phone can automatically enters a profile mode according to the current usage scenario, one of the profile modes of the mobile phone can be the smart mode (for example, when the user opens a game application, the mobile phone automatically enters a game mode). When the user of the mobile phone performs a sharing operation, the information selection mode of the mobile phone will automatically enter the smart mode. Specifically, when the mobile phone is in the smart mode, the mobile phone can automatically enter a traffic saving mode according to certain conditions (such as when the available traffic is insufficient, the mobile phone automatically enters a traffic saving mode) or a safe mode (such as when the information to be shared contains files, the mobile phone automatically enters the safe mode). When the information selection mode is in the normal mode, a follow-up processing is performed according to rules of the system or a corresponding application, such as according to the rules of sharing function that comes with WeChat.

Of course, it is also possible to choose to execute the method even when the selection mode is in the normal mode.

The information to be shared can be some preset information of a terminal, be information downloaded by a user from the Internet (such as images, application software, etc.), be information input by the user on the terminal, or be information on an application of the terminal (such as news, application update information, etc.). The information to be shared can also be local information of the terminal (such as local files, etc.), or be a sharing record on social software (such as chat logs, shared information, etc.).

The above information to be shared may be one or more of audios, videos, animations, images, documents, files, texts, sharing records, writing notes, web page information, and web addresses.

In the information sharing process, the sending terminal generally sends information, and the receiving terminal receives the information. During receiving the information, there may be certain situations causing the receiving terminal to be unable to obtain the content of the received information content, or it is inconvenient for the receiving terminal to obtain the content of the received information, or the content of the received information cannot be understood by the user of the receiving terminal due to language barrier. Relevant factors that lead to these situations are used as association information.

In operation C20, the information to be shared is processed according to the association information to obtain target sharing information.

After obtaining the above-mentioned association information, according to different contents contained in the information to be shared, a data type conversion or a translation of the information to be shared can be performed. The convertible types included in data type conversions are texts, images, animations, voices, audios, videos, and files. According to needs, the texts can be converted into an image (for example, when a text is "Hi", it is easy to understand, the purpose of the user of the sending terminal sharing such text is to greet the user of the receiving terminal). Likewise, contrary to the conversion of texts to images, it can also convert an image to texts, texts and files (including only texts) to voices. At present, converting texts to voices is already very mature, such as, listening to novels daily. Likewise, it can also convert voices to texts. In addition, it can also convert videos to audios and images. It's easy to understand that the videos themselves are composed of audio data and images. Likewise, it can convert animations to audios and images. For translation, when sharing information, if the information shared by the user of the sending terminal has contents in a language beyond the language ability of the user of the receiving terminal, it will inevitably cause the user of the receiving terminal to have difficulty in understanding the information, so the language of the information can be converted into a language that can be understood by the receiving terminal.

The target sharing information is got according to the information obtained after the data type conversion or translation.

In addition to the above processing methods, it also includes acquiring space information of the receiving terminal. If the space of the receiving terminal does not match the information to be shared sent by the sending terminal, the information to be shared is compressed.

In operation C30: the target sharing information is sent.

Figure 18:
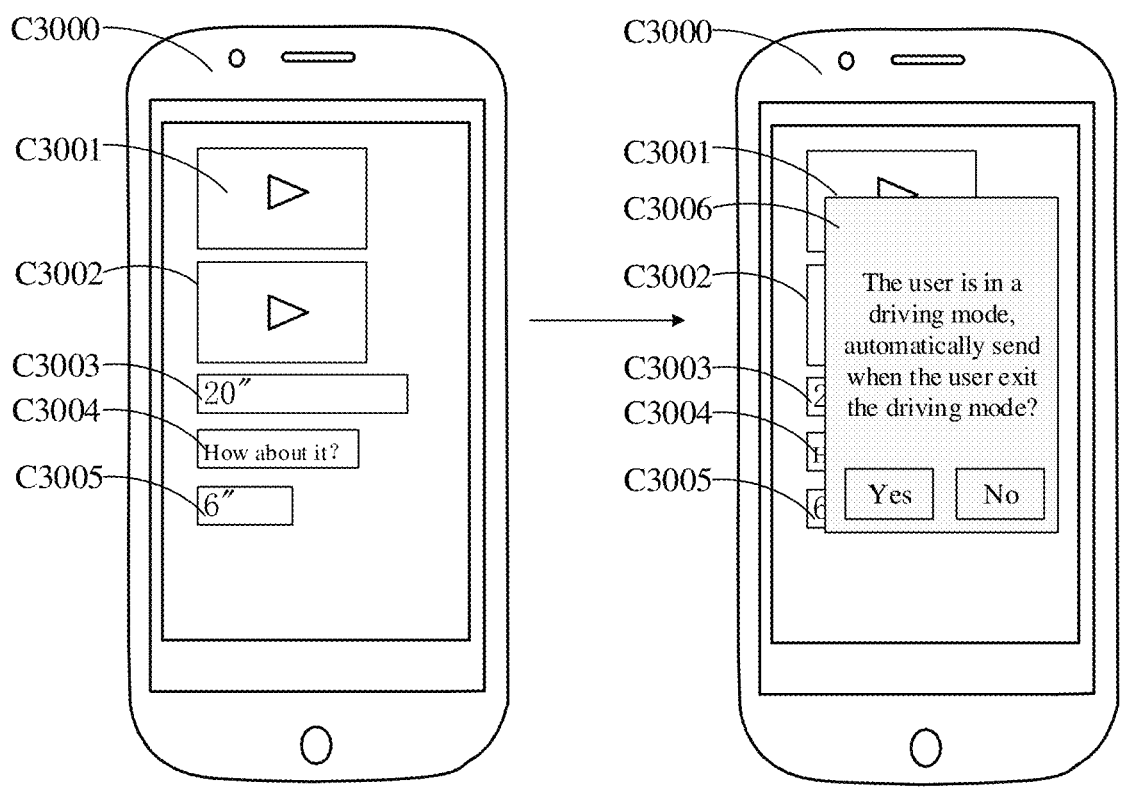
FIG. 18 is a schematic diagram of an interface scene in an eighteenth embodiment of the information sharing method of the application.

Further, referring to FIG. 18, in an eighteenth embodiment of the present application, based on the seventeenth embodiment, the association information includes at least one of a current mode of the receiving terminal and a sharing record.

Current Mode of the Receiving Terminal

For the case where the current mode of the receiving terminal meets preset conditions, that is, when the current mode of the receiving terminal is at least one of a driving mode, a conference mode, and a no disturbing mode, the information to be shared is processed according to a first preset rule, and the first preset rule is the data type conversion.

Driving Mode

In order to facilitate users to only use certain functions (such as talking on the phone) of the terminal when driving, and to ensure the user's driving safety, the terminal provides a driving mode. When the receiving terminal is in the driving mode, it is inconvenient for the user of the receiving terminal to receive certain shared information, such as articles, images, etc. For voice information, because the user of the receiving terminal does not lose his vision when acquiring content of the voice information, it is possible for the user of the receiving terminal to receive voice messages. When the receiving terminal is in the driving mode, it can convert files, texts, and other information in the shared information that can be converted from text to voice into voice information. In particular, for converting image to voice, it can use the texts on the image to perform conversion, specifically, it first recognizes the texts in the image to convert the image into texts, and then converts the texts into voices. The purpose of data type conversion is to facilitate the user of the receiving terminal to conveniently obtain the information shared by the sending terminal during driving. But the data type conversion may cause inconsistency between the converted information and the original information if without human intervention, resulting in what obtained by the user of the receiving terminal is not the information that the user of the sending terminal shares. Therefore, in order to facilitate the user of the receiving terminal to correctly understand the content of the sending terminal's shared information, the user of the receiving terminal can browse the information without conversion (i.e., the original information shared by the user of the sending terminal) at his convenience, that is, after driving. For example, referring to FIG. 18, C3000 indicates a sending terminal, and C3001, C3002, C3003, C3004, and C3005 indicate some pieces of information in a chat log. Because the receiving terminal is in the driving mode at current and it is not convenient to receive information, when the user selects C3003, a dialog box indicated by C3006 automatically pops up, to prompt the user of the sending terminal, and provide processing options including automatic sending and cancel sending.

Conference Mode

Figure 19:
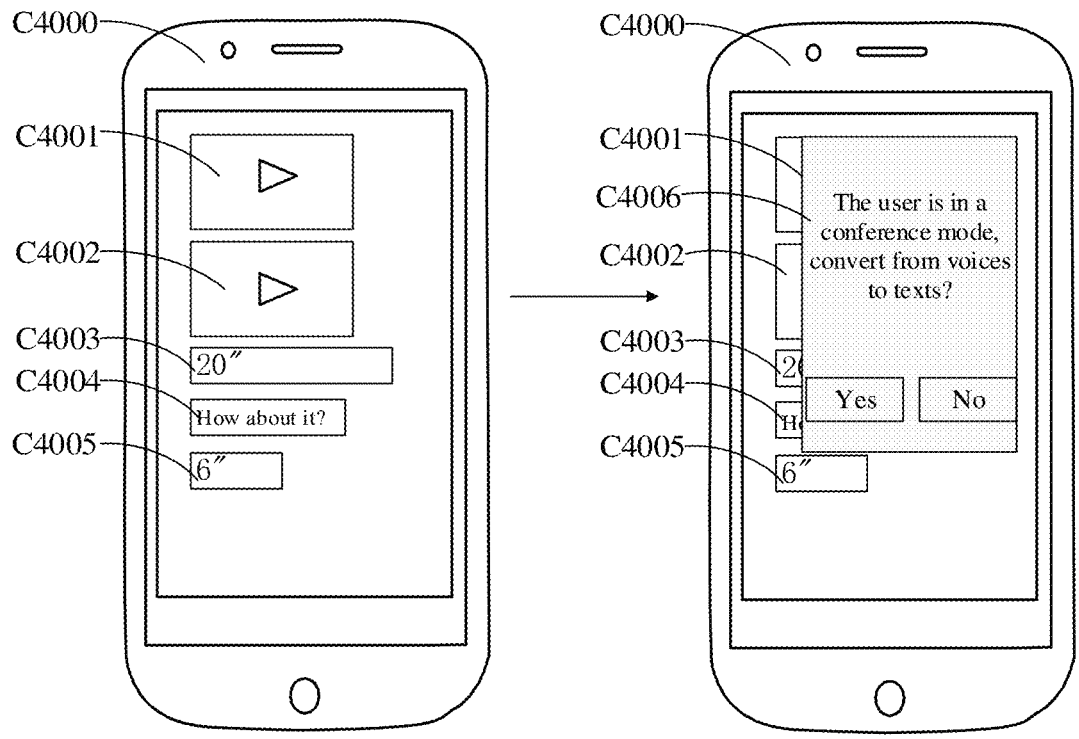
FIG. 19 is a schematic diagram of another interface scene in the eighteenth embodiment of the information sharing method of the present application.

When a user of a mobile phone participates in a meeting, the mobile phone is generally set to be a conference mode. When participating in a meeting, the user is inconvenient to receive voice messages, but can receive text messages and other information that can be browsed. Therefore, when it obtains that the current mode of the receiving terminal is the conference mode, if the information to be shared contains voice, it needs to convert the voice to another data type, such as converting the voice to texts, or an image (such as when the voice information is a greeting). For example, referring to FIG. 19, C4000 indicates a sending terminal, C4001 and C4002 indicate video information, C4003 and C4005 indicate audio information, and C4004 indicates text information. Because the receiving terminal is in the conference mode at current, it is not convenient for the user of the receiving terminal to receive voice information. When the user selects C4003, a dialog box indicated by C4006 automatically pops up to prompt the user of the sending terminal, and provides processing options including data type conversion and cancel sending. Similarly, the purpose of the data type conversion is to facilitate the user of the receiving terminal to receive the information shared by the sending terminal when participating in a meeting. However the data type conversion may cause inconsistency between the converted information and the original information due to no human intervention and result in the information received by the user of the receiving terminal is not the information that the user of the sending terminal shares. Therefore, in order to facilitate the user of the receiving terminal to correctly understand the content of the information shared by the sending terminal, the user of the receiving terminal can browse the original information at his convenience, that is, after the meeting.

No Disturbing Mode

For the no disturbing mode, on one hand, the above driving mode and conference mode are both the no disturbing mode in a broad sense, so the processing method of the no disturbing mode is consistent with the above described data type conversion. On the other hand, it can be understood that when the user of the receiving terminal needs personal space, the user of the receiving terminal can set the profile mode of his phone to be the no disturbing mode. When the user of the receiving terminal sets the mobile phone to the no disturbing mode, it is obvious that the user of the receiving terminal does not want to be disturbed by others at this time, so it is obviously inappropriate for the user of the sending terminal to share information to the user of the receiving terminal user at this time. When the receiving terminal is in the no disturbing mode, it can output a prompt message at the sending terminal to remind the user of the sending terminal that the receiving terminal is in the no disturbing mode and inconvenient to receive information, and it also provide a function of automatically sending the information to be shared to the receiving terminal at a proper time (the receiving terminal exit out of the no disturbing mode) to facilitate the information sharing operation of the sending terminal. Of course, it is not impossible for the receiving terminal to receive information in the no disturbing mode. Therefore, it can provide an option to still send the information to be shared to the user of the sending terminal.

Sharing Records

In determining that the sharing records meets the preset conditions, that is, the sharing records include text information, voice information, and other information capable of converting data type thereof, the information to be shared is processed according to a second preset rule, where the second preset rule includes data type conversion and translation.

Figure 20:
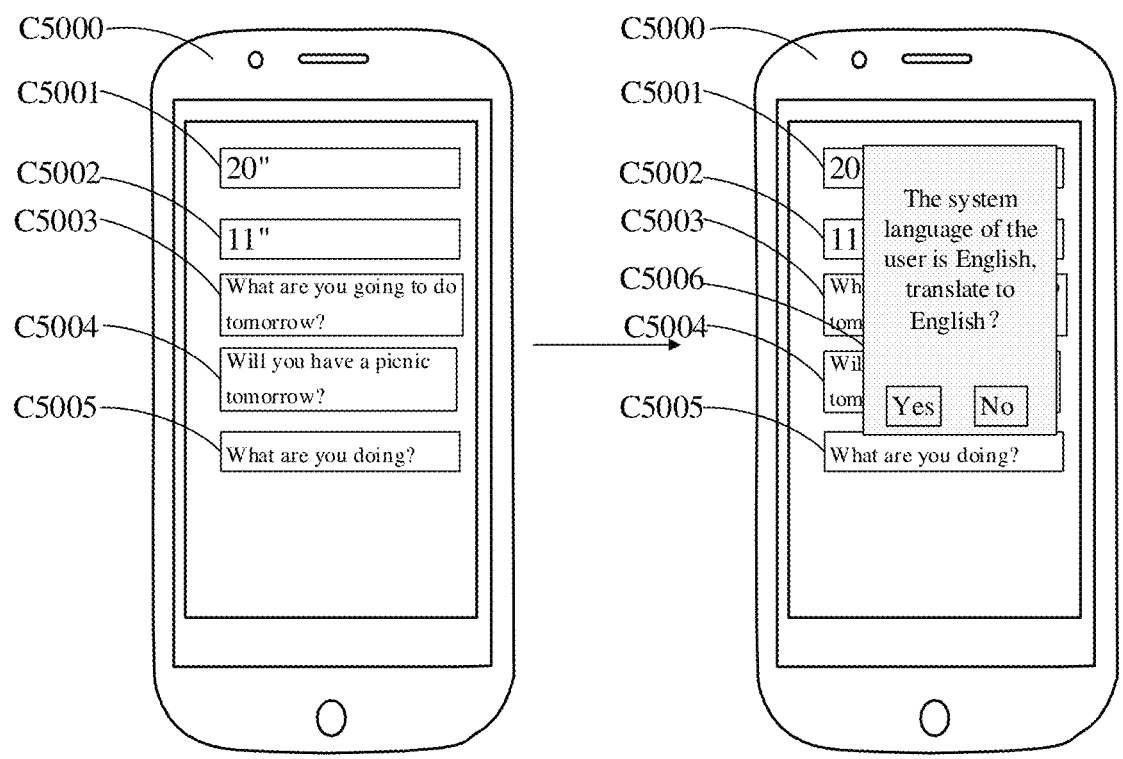
FIG. 20 is a schematic diagram of still another interface scene in the eighteenth embodiment of the information sharing method of the present application.

The sharing records can be previous shared information (including chat logs, etc.). When the user of the sending terminal shares the information, text content of the shared information may be incomprehensible to the user of the receiving terminal because the source of the information is very wide. After sharing this information to the user of the receiving terminal, the user of the receiving terminal needs to first translate the information, which is very troublesome. Therefore, when sharing information, it is necessary to obtain the language information of the receiving terminal. The language information can be the system language of the receiving terminal, the language set in an application, or the language of the chat logs. Of course, the most convenient way is to directly obtain the system language of the receiving terminal because the system language set by the user must be understood by the user. After the language information is obtained, the contents in the information to be shared that is different from the language information can be translated into the language of the language information. For example, referring to FIG. 20, C5000 indicates a sending terminal, and C5001, C5002, C5003, C5004, and C5005 indicate some pieces of information in a chat log. When the user selects C5005, the sending terminal finds the language of the current piece of information is inconsistent with the system language provided by the receiving terminal, and automatically pops up a dialog box indicated by C5006 to prompt the user of the sending terminal, and provide a translation option and a cancel sending option.

In addition, according to chat information, it can also obtain habit information of the user of the receiving terminal. For example, the user is used to chatting with texts, voices, and images. The information to be shared can be processed according to the acquired habit information. The processing methods include converting texts into an image, texts to voices, voices to texts, or voices to an image. Which data type the user of the receiving terminal is used to, the information to be shared is converted to such data type. Similarly, the purpose of data type conversion is to facilitate the user of the receiving terminal to browse the content of the received information to be shared. However the data type conversion may cause inconsistency between the converted information and the original information due to no human intervention and result in that the information received by the user of the receiving terminal is not the information that the user of the sending terminal wants to share. Therefore, in order to facilitate the user of the receiving terminal to correctly understand the content of the information shared by the sending terminal, it is necessary to provide the original information before the data type conversion to the receiving terminal, and it is up to the user of the receiving terminal to decide whether to browse the original information before the data type conversion.

In particular, some applications do not support sharing voice information, such as WeChat. When the application does not support voice information sharing, it can share the voice information through another application that support voice information sharing.

In this embodiment, the information to be shared is processed according to the association information to obtain information that is convenient for the user of the receiving terminal to browse, avoiding that the user of the receiving terminal receives information of a certain data type that is inconvenient for the user of the receiving terminal to receive or containing contents that cannot be understood by the user of the receiving terminal. The purpose of intelligently processing the information to be shared is realized.

Further, in a nineteenth embodiment of the present application, based on the above seventeenth embodiment, the information sharing method further includes:

the data type conversion is performed by the sending terminal, the server, or the receiving terminal.

When the data type conversion is assigned to be performed by the sending terminal, the target sharing information may be the original information to be shared, or the processed information to be shared, or includes both the original information to be shared and the processed information to be shared. Specifically, the target sharing information can be determined by the sending terminal or the receiving terminal. When the current mode of the sending terminal is a preset mode and the user of the receiving terminal displays the processed information to be shared through a selection operation or according to sets in advance, the target sharing information can be the processed information to be shared, or include both the original information to be shared and the processed information to be shared, which can be determined according to whether the user of the receiving terminal needs the original information to be shared (for example, the data type conversion function is perfect, the converted information meets the user's needs, and the user no longer needs to verify the processed information to be shared according to the original information to be shared). When the current mode of the sending terminal is a preset mode and the user of the receiving terminal displays the information to be shared through a selection operation or according to sets in advance, no data type conversion is needed and the target sharing information sent by the sending terminal is the original information to be shared. Of course, data type conversion can also be performed in such case and the target sharing information includes both the original information to be shared and the processed information to be shared, but the receiving terminal chooses to display only the original information to be shared after receiving the original information to be shared and the processed information to be shared. In addition, after the sending terminal performs a data type conversion on the original information to be shared, the user of the sending terminal can perform a selection operation according to the conversion result. The specific selection operation is to reverse the data type of part or all of the processed information to be shared to the original data type or delete the part or all of the processed information to be shared.

When the data type conversion is assigned to be performed by the server, the sending terminal does not need to process the information to be shared. Therefore, the target sharing information is the information to be shared. Whether to display the processed shared information is determined by the user of the receiving terminal through a selection operation or according to sets in advance. If the receiving terminal displays the processed information to be shared, the target sharing information can be the processed information to be shared, or include both the original information to be shared and the processed information to be shared, depending on whether the user of the receiving terminal needs the original information to be shared (for example, the data type conversion function is perfect, the converted information meets the user's needs, and the user no longer needs to verify the processed information to be shared according to the original information to be shared). If the receiving terminal selects to display the original information to be shared, no data type conversion is needed.

When the data type conversion is assigned to be performed by the receiving terminal, the sending terminal does not need to process the information, and the server terminal also does not need to process the information. Therefore, the information received by the receiving terminal is the original information to be shared. Similarly, whether to display the processed information to be shared is determined by the user of the receiving terminal through a selection operation or according to sets in advance.

In addition, when the data type conversion is not performed by the sending terminal, but by the server, the sending terminal can send data type conversion parameters together with the original information to be shared, the data type conversion parameters include the data type and/or file format of the original information to be shared, the data type and/or file format of the processed information to be shared, time requirements, and space requirements. The server performs a data type conversion to the original information to be shared sent by the sending terminal according to the parameters, which reduces the data processing pressure of the sending terminal. Similarly, when the data type conversion is processed by the receiving terminal, the receiving terminal can receive the original information to be shared and the data type conversion parameters sent by the sending terminal, and process the original information to be shared according to the data type conversion parameters. In addition, the data type conversion parameters can be generated by the sending terminal or by the server. Specifically, for the data type and/or file format of the original information to be shared and the data type and/or file format of the processed information to be shared, when the data type conversion is performed, the data type and/or file format of the original information to be shared is converted to the data type and/or file format of the processed information to be shared. The time requirements is considered relative to the processing process, the purpose of which is to select a data type conversion of the least time-consuming to reduce the user's waiting time. The space requirements is also considered relative to the processing process, the purpose of which is to minimize the space occupied by the processed information to be shared after the data type conversion without reducing the quality.

In addition, the generation of the data type conversion parameters can be determined by the user's selection operation or system presets. For example, if the user of the sending terminal prefers to convert voice information to text information, the data type conversion parameters at this time specifically refer to converting the voice information to text messages or specifically refer to converting certain piece or pieces of voice information of the original information to be shared to text information, rather than converting the voice information into images.

In this embodiment, the data type conversion can be performed by the sending terminal, the server, or the receiving terminal, and the data type conversion parameters can be selected and transmitted to the server or the receiving terminal when the data type conversion is performed by the server or the receiving terminal according to requirements. When the data type conversion is performed by the server, the data type conversion parameters can be generated by the sending terminal, and when the data type conversion is performed by the receiving terminal, the data type conversion parameters can be generated either by the sending terminal or the server. The purpose of providing a variety of sites for performing data type conversions is achieved.

In a twentieth embodiment of the present application, based on the foregoing seventeenth embodiment, eighteenth embodiment, or nineteenth embodiment, the operation C11 further includes:

saving the target sharing information as at least one temporary file.

Rather than directly sending the target sharing information, it can save the target sharing information as a temporary file; or save each piece of the information of the target sharing information as a temporary file, and then put all the temporary files together to be packaged as a temporary file or folder. Which one of the saving manners is used is up to the user's choice or determined according to presetting.

It can choose to compress the temporary file or folder to reduce an amount of the transmission data, or encrypt the temporary file or folder to increase the security during transmission.

In addition, after the temporary file or folder is sent to the receiving terminal, it can also choose to delete the temporary file or folder to reduce a storage space used.

Specifically, when the data type conversion process is assigned to be executed by the sending terminal, the sending terminal directly packages the information to be shared into a temporary file or folder. When the data type conversion process is assigned to be executed by the server, the sending terminal can package the information to be shared into a temporary file or folder before sending the information to be shared to the server, or directly send the information to be shared to the server. After the data type conversion is completed by the server, the target sharing information is packaged into a temporary file or folder before it is sent to the receiving terminal. When the data type conversion process is assigned to be performed by the receiving terminal, likewise, the sending terminal can package the information to be shared into a temporary file or folder, the server sends the temporary file or folder directly to the receiving terminal after receiving the temporary file or folder from the sending terminal, or the sending terminal sends the information to be shared to the server, the server receives the information to be shared, packages the information to be shared into a temporary file or folder, and then send the temporary file or folder to the receiving terminal.

In this embodiment, the target sharing information is packaged as a temporary file or folder to facilitate compression, encryption, and transmission of the target sharing information. The purposes of improving the transmission speed of the target sharing information and the security of the transmission process are achieved.

The related art performing information sharing, the user of the receiving terminal cannot know whether the received sharing information has been processed.

A twenty-first embodiment to a twenty-third embodiment of the present application provide solutions to enable the user of the receiving terminal to know whether the received information has been processed, and perform a corresponding processing according to a processing method of the received sharing information, thus to achieve the purpose of improving the convenience of the user of the receiving terminal when acquiring the sharing information.

Figure 21:
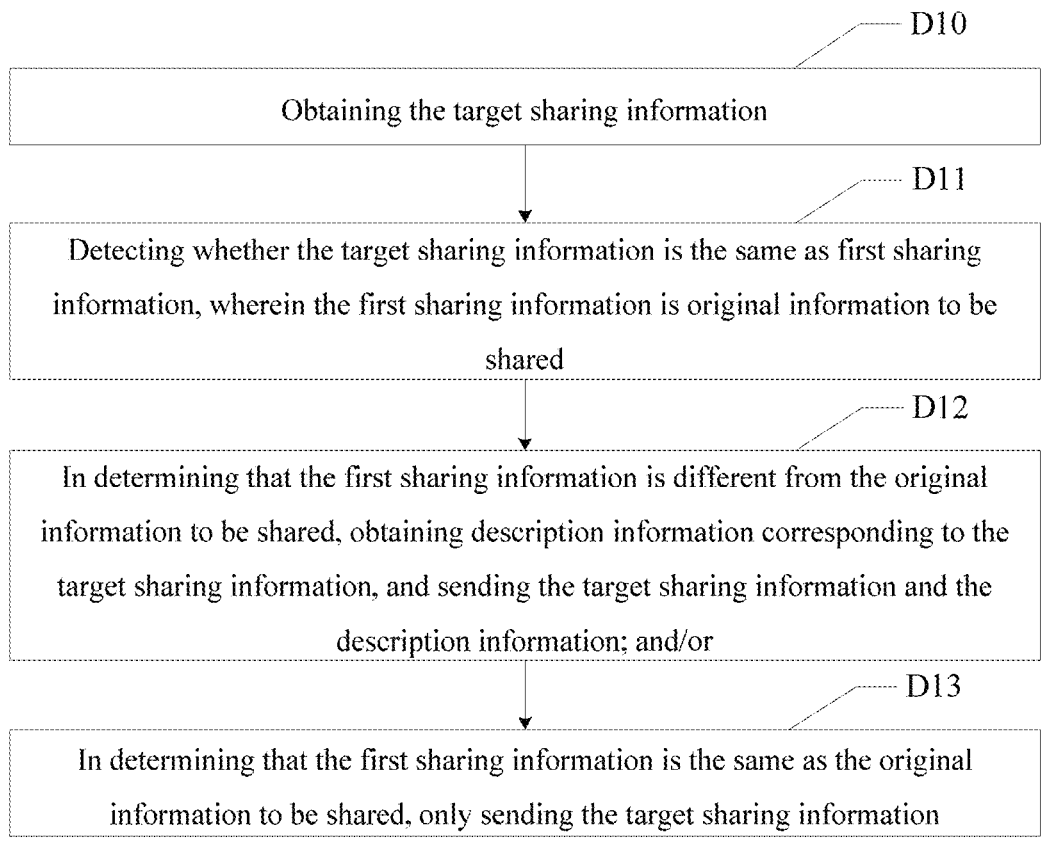
FIG. 21 is a schematic flowchart of a twenty-first embodiment of the information sharing method of the present application.

Referring to FIG. 21, in the twenty-first embodiment of the information sharing method of the present application, the information sharing method includes:

operation D10, obtaining target sharing information;

operation D11, detecting whether the target sharing information is the same as first sharing information, where the first sharing information is original information to be shared;

operation D12, in determining that the target sharing information is different from the first sharing information, obtaining description information corresponding to the target sharing information, and sending the target sharing information and the description information, so that the receiving terminal outputs a prompt according to the description information; and/or, operation D13, in determining that the target sharing information is the same as the first sharing information, only sending the target sharing information.

After the target sharing information is obtained, the target sharing information may be the original information to be shared or the processed information to be shared which is obtained by processing the original shared information. For the case where the target information is the processed information to be shared, it is also necessary to obtain the corresponding description information, so that the receiving terminal selects a corresponding information prompt manner according to the description information after receiving the target sharing information and the description information, to remind the user of the receiving terminal that the target sharing information is obtained by processing the original shared information. For the case where the target sharing information is the original information to be shared, only the original shared information needs to be sent.

According to the user's selection, it is determined whether the information selection mode of the current terminal (such as a mobile phone) is in a smart mode or in a normal mode when to share information. A switch of the smart mode can only appear when the mobile phone is in the developer mode or in the debugging mode defined in the system settings. The switch can also be built into an application (such as in the laboratory function of the application). In addition, because at the current, a mobile phone can automatically enters a profile mode according to the current usage scenario, the mobile phone can be set to be in the smart mode (for example, when the user opens a game application, the mobile phone automatically enters a game mode), and when the user of the mobile phone performs a sharing operation, the information selection mode of the mobile phone will automatically enter the smart mode. Specifically, when the mobile phone is in the smart mode, the mobile phone can automatically enter a traffic saving mode according to certain conditions (such as when the available traffic is insufficient, the mobile phone automatically enters the traffic saving mode) or the safe mode (such as when the information to be shared contains files, the mobile phone automatically enters the safe mode). When the information selection mode is in the smart mode, operation D10 is performed.

When the information selection mode is in the normal mode, a follow-up processing is performed according to rules of the system or a corresponding application, such as according to rules of sharing function that comes with WeChat. Of course, even when the information selection mode is in the normal mode, operation D10 may be selected for execution.

In addition, the above description information includes at least one of the following:

the data type of the target sharing information, the file format of the target sharing information, the size of the target sharing information, the time information for processing the first sharing information, and execution body information for processing the first sharing information.

The data type of the target sharing information includes the data type of the first sharing information or the data type of the processed information to be shared which is obtained by processing the first sharing information. The file format of the target sharing information includes the file format of the first sharing information or the file format of the processed information to be shared, the size of the target sharing information includes the size of the first sharing information or the size of the processed information to be shared, and the time information for processing the first sharing information includes a start time to start the processing, an end time to end the processing and a time interval of the processing process, and the execution body information for processing the first sharing information includes information on the sending terminal, the server, or the receiving terminal. Specifically, the purpose of sending the description information to the receiving terminal is to enable the user of the receiving terminal to know whether the received information has been processed, what type of processing has been carried out, by whom, when, and how long the received information is processed.

In this embodiment, through operations D10: obtaining target sharing information, D11: detecting whether the target sharing information is the same as first sharing information, where the first sharing information is the original information to be shared, D12: in determining that the target sharing information is different from the first sharing information, acquiring and sharing description information corresponding to the target sharing information, and sending the target sharing information and the description information, so that the receiving terminal outputs a corresponding prompt according to the description information; and/or, D13: in determining that the target sharing information is the same as the first sharing information, only sending the target sharing information, the receiving terminal is able to select different display manner according to different target sharing information. If the target sharing information is the processed information which is obtained by processing the original information to be shared, a processing method of processing the original information to be shared to obtain the processed information to be shared is sent to the receiving terminal as the description information, so that the receiving terminal reminds the user of the receiving terminal that the received information is not the original information to be shared but the processed information to be shared according to the processing method, which is convenient for the user of the receiving terminal to prepare for obtaining the received information in advance. For example, when an encrypted file is received by the user of the receiving terminal, the user of the receiving terminal can know that the file is encrypted according to the prompt generated by the receiving terminal when receiving the target sharing information, so as to obtain the password or a way of obtaining the password from the user of the sending terminal in advance, and avoid to cause unnecessary trouble to the user of the receiving terminal who know that the file is encrypted only when he is opening the file. For example, if the user of the receiving terminal does not have time to process when receiving the target sharing information, the user of the receiving terminal starts to process the received target sharing information after a long time, but at this time the user of the sending terminal is inconvenient to communicate with the user of the receiving terminal (to give a password). The purpose of improving the convenience of users in obtaining sharing information is achieved.

Figure 22:
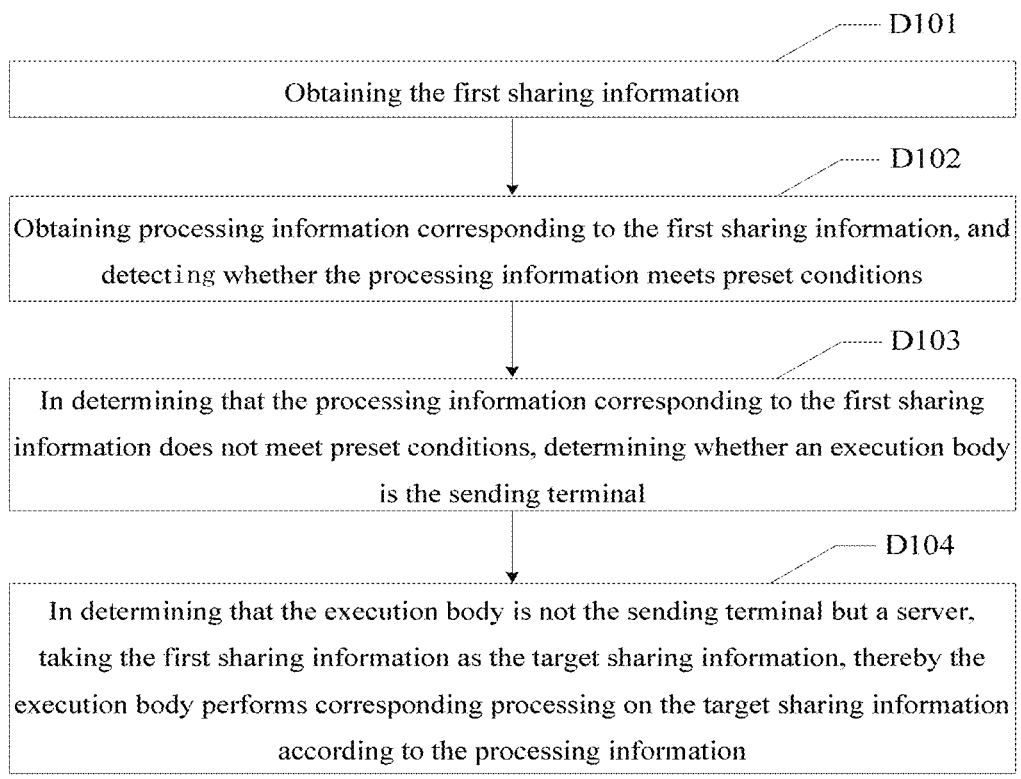
FIG. 22 is a schematic flowchart of a twenty-second embodiment of the information sharing method of the present application.

Further, referring to FIG. 22, in a twenty-second embodiment of the information sharing method of the present application, based on the foregoing twenty-first embodiment, the operation D10 of obtaining target sharing information includes:

operation D101, obtaining the first sharing information;

operation D102, obtaining the processing information corresponding to the first sharing information, and detecting whether the processing information meets the preset conditions.

operation D103, in determining that the processing information does not meet the preset conditions, determining whether an execution body is the sending terminal, where the processing body is the sending terminal or the server;

operation D104, in determining that the execution body is not the sending terminal but the server, taking the first sharing information as the target sharing information, so that the execution body performs corresponding processing on the target sharing information according to the processing information.

In this embodiment, after the user of the sending terminal selects the first sharing information, it needs to obtain the processing information corresponding to the first sharing information and determines whether the processing information meets the preset conditions, in determining that the processing information does not meet the preset conditions, the first sharing information is processed based on the processing information. It determines whether the execution body is the sending terminal or the server. The selection between the execution bodies may be preset by the system or selected by the user before sharing. When the execution body is the sending terminal, the first sharing information is directly processed at the sending terminal, and the processed first sharing information is taken as the target sharing information; when the execution body is the server, the first sharing information is taken as the target sharing information and sent to the server. The server processes the first sharing information according to the processing information.

Specifically, the processing information is obtained from the sending terminal and/or provided by the receiving terminal, and the processing information includes at least one of the following: data type, file type, storage information, traffic information, network speed information, mode information, time information, location information, language information, status information of the receiving terminal, status information of the user of receiving terminal.

For the case that the data type and/or file type of the receiving terminal does not meet the preset receiving conditions, that is, the receiving terminal does not support the data type and/or file type of the information to be shared Specifically, the first sharing information that the user wants to share may has various data types, such as audios, videos, animations, images, documents, files, texts, and etc. The first sharing information under most situations, the receiving terminal supports reading the first sharing information, but for some non-smart phones, it may not support reading video files. Therefore, it is unnecessary for the user of the sending terminal to still send the contents that the receiving terminal does not support to the receiving terminal. Therefore, when sharing information, it is necessary to firstly obtain the data type supported by the receiving terminal. In addition, the user may have such a requirement to share a video file, but because the video file is particularly large, resulting that the sharing process takes a long time and requires a large storage space to store the video file. Further the user may just want a certain segment in the video file, or audio in the video file, or images in the video file. For the case that the user wants to share a certain segment in the video file, it can provide a video cropping function, and the user can select the segment at any time point and lasting for any length of time as needed. For the case the user wants to share is the audio in the video file, it can provide the user with a function of data type conversion. The data in the first sharing information can be converted into audio through data type conversion. An audio cropping function can also be provided. The user can select an audio segment at any time point and lasting for any length of time as needed. For the case the user want to share is the images in the video files, similarly, it can only keep the images and remove the audio from the video file. Similarly, the user can select an image at any time point in the video file.

Regarding the file types of the first sharing information, one situation is that the first sharing information contains content in a non-frequently used file format, such as video data including MPEG (Motion Picture Experts Group) format, and many mobile phones only support frequently used file formats. For the file formats that are not frequently used, it generally requires a specific software for format conversion, such as the format factory. But in daily life, users generally do not use such kind of professional software tool. So, before sharing information, it needs to determine whether the receiving terminal supports a file format of the first sharing information, if the receiving terminal does not support the file format of the first sharing information, there is no need to share the contents in such file format. Therefore, during sharing, it can format the contents in the file format that the receiving terminal does not support at the sending terminal and convert the contents to any format supported by the receiving terminal. Another situation is that for some privacy or confidential files, encryption is usually required during the information sharing process. Similarly, for sharing information is relatively convenient and fast, many times some company internal files (usually documents) are also shared through common softwares, such as through the social software WeChat. To ensure the security of the files in the sharing process, it needs to encrypt the first sharing information with the data type being document.

Figure 23:
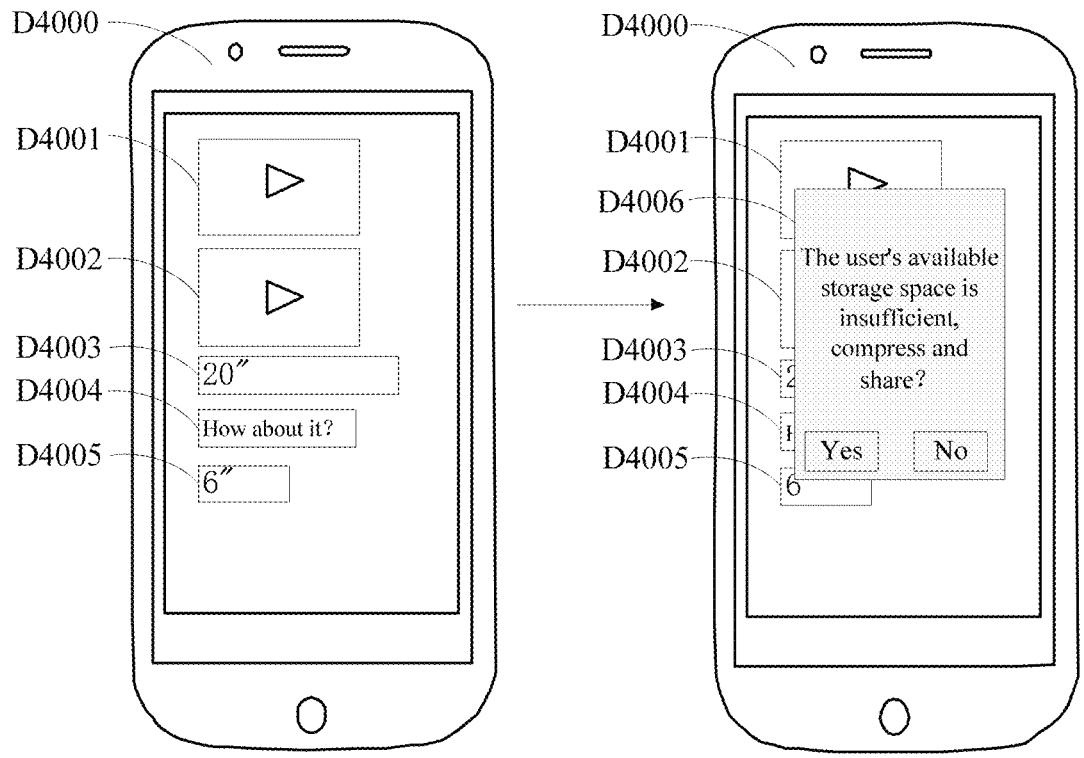
FIG. 23 is a schematic diagram of an interface scene in the twenty-second embodiment of the information sharing method of the present application.
Figure 24:
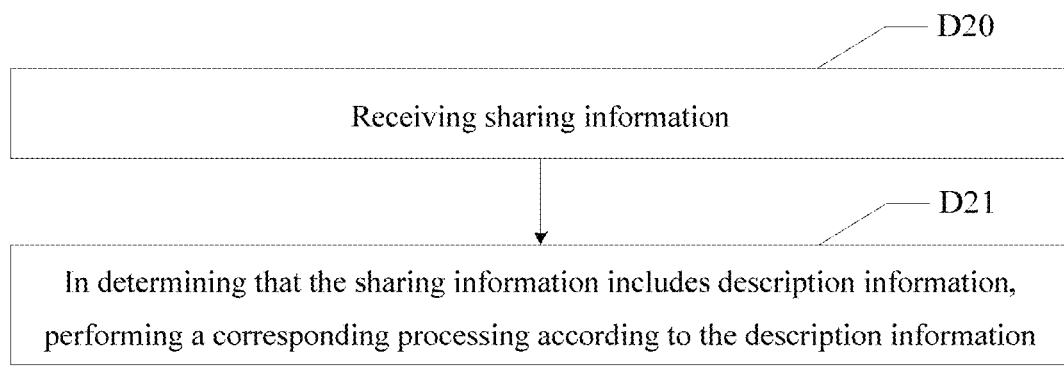
FIG. 24 is a schematic flowchart of a twenty-third embodiment of the information sharing method of the present application.

For the case that the storage information of the receiving terminal does not meet the preset receiving conditions, that is, the available local storage space of the receiving terminal is smaller than a size of the first sharing information that the user wants to share Specifically, for storage information of the receiving terminal, it is necessary to take into account whether the size of the first sharing information exceeds the available local storage space of the receiving terminal, so, it is necessary to obtain the size of the first sharing information before sending the first sharing information, and at the same time, to obtain the available local storage space of the receiving terminal. If the available local storage space of the receiving terminal is smaller than the size of the first sharing information, for example, if the size of the first sharing information is 300 MB, and the available local storage space is only 200 MB, it then compresses the larger size contents of the first sharing information, that is, performs a format conversion, to obtain smaller size first sharing information. Of course, the whole first sharing information can be compressed. For example, referring to FIG. 23, D4000 indicates a sending terminal, D4001, D4002, D4003, D4004, and D4005 indicate some pieces of information in a chat log, and D4006 indicates a prompt box that pops up after the user selects D4001 or D4002, indicating that the user of the receiving terminal has insufficient storage space, and asks the user of the sending terminal whether to compress the first sharing information, and provide a confirmation button and a cancel button. In addition, considering that compression will affect the quality of the first sharing information, for example, when the first sharing information contains a video, for files of the data type such as videos, compression will damage the original files, such as reduce a definition, distort sounds of the video, and etc. Therefore, there is a limit to compress the first sharing information. For this, it can compress the first sharing information to obtain target sharing information, and provide the user with a function to preview the target sharing information. It is up to the user to decide whether to send the target sharing information, if the user deems that the content has been excessively distorted by compression, the user can reselect the first sharing information, such as deleting the selected content.

For the case that the traffic information and/or network speed information of the receiving terminal does not meet the preset receiving conditions, that is, the available traffic of the receiving terminal is insufficient to receive the first sharing information and/or the size of the first sharing information that the user wants to share is much larger than a data size that can be sent by the receiving terminal per unit time at current Specifically, the current traffic usage of common mobile phone users is monthly traffic usage, such as subscribing 10 GB of data traffic per month. If the user's traffic usage exceeds the subscribed amount in a month, it will cause a lot of charges. Thus, before sending the first sharing information, it needs to obtain the traffic information of the receiving terminal, that is, the available traffic of the receiving terminal. If the available traffic of the receiving terminal is not enough to receive the first sharing information, similarly, the larger size contents of the first sharing information can be compressed, that is, the larger size pieces can undergo a format conversion in order to reduce a size of the first sharing information to a smaller size. Of course, the whole of the first sharing information can be compressed. In addition, considering that the compression will affect the quality of the first sharing information, for example, when the first sharing information contains a video, for files of the data type such as videos, compression will damage the original files, resulting in a reduction in a definition of the video and sound distortion, and etc. Therefore, there is a limit to compress the first sharing information. For this, it can compress the first sharing information to obtain target sharing information, and provide the user with a function to preview the target sharing information. It is up to the user to decide whether to send the target sharing information, if the user deems that the content has been excessively distorted by compression, the user can reselect the first sharing information, such as deleting the selected content. For example, it prompts that the available traffic of the receiving terminal is less than the size of first sharing information that the user of the sending terminal wants to share for 300 MB and recommends to cancel a video with a size of 310 MB from sharing and to continue to share the remaining information.

Specifically, when the size of the first sharing information that the user wants to share is much larger than a data size that can be received currently by the receiving unit per unit time, for example, the size of the first sharing information that the user wants to share is 1000 MB, and the current network speed of the receiving terminal can only reach 10 KB/s, it is conceivable that the sharing will be meaningless. Therefore, in the information sharing process, it is necessary to obtain the size of the first sharing information when the user selects the first sharing information, and at the same time to obtain the network speed of the receiving terminal. When the network speed of the receiving terminal is much lower than a network speed required to share the first sharing information, it can use compression to ensure that the size of the first sharing information meets the network speed. It can also prompt the user that the current network condition is poor and it may take some time to send the information, and recommend the user to allow the sending terminal to automatically send the information when the network condition does not affect the sending. In addition, considering that compression will affect the quality of the first sharing information, for example, when the first sharing information contains a video, for files of data type such as videos, compression will damage the original files, such as reduce definitions, distort sounds of the videos, and etc. Therefore, there is a limit to compress the first sharing information. For this, it can compress the first sharing information to obtain target sharing information, and provide the user with a function to preview the target sharing information. It is up to the user to decide whether to send the target sharing information, if the user deems that the content has been excessively distorted by compression, the user can reselect the first sharing information, such as deleting the selected content.

For the case that the traffic information and/or network speed information of the sending terminal does not meet the preset sending conditions Specifically, for the mode information, the user of the sending terminal can set a mode of the sending terminal as needed. For example, when the sending terminal is in a guest mode, the current user of the sending terminal is generally not the owner, that is, the owner considers privacy protection or other situations, and sets the terminal (such as a mobile phone) to be in the guest mode when the terminal is lent to others, thereby to prevent the others from revealing the owner's privacy during use. In addition, when the sending terminal is in a safe mode, if the information chosen to be shared by the user of the sending terminal is a file (such as a video, a document, an image, or the like), there may be leakage of confidential files and personal privacy. In addition, when the sending terminal is in a child mode, generally at this moment, the user of the sending terminal is not the owner but the owner's child or another junior, the user of the sending terminal may be unfamiliar with the mobile phone, and in such case, a series of misoperation may occur and may trigger a sharing process. It is understandable under such a situation, the user of the sending terminal does not need to share information. In addition, the sending terminal may also be in an elderly mode. Similarly, the user of the sending terminal at this moment is generally the owner's elder, and they are unfamiliar with the current mobile phone. When the elder using the mobile phone, it will also produce a series of misoperation that lead to a sharing process.

Similarly, the user of the receiving terminal can set a mode of the receiving terminal as needed. For example, when the receiving terminal is in a guest mode, the user of the receiving terminal is generally not the owner, that is, the owner considers privacy protection or other situations, and sets the terminal (such as a mobile phone) to be in the guest mode when the terminal is lent to others, thereby to prevent the others from revealing the owner's privacy during use. Therefore, in the guest mode, if the information chosen to be shared by the user of the sending terminal is a locally stored file (such as a video, a document, an image, or the like), the user can be prompted that the receiving terminal is currently in the guest mode, continuing to send may reveal privacy, it asks the user of the sending terminal whether to still share the information or not, or prompts the user to encrypt the first sharing information. In addition, when the receiving terminal is in a safe mode, if the information chosen to be shared by the user of the sending terminal is a file (such as a video, a document, an image, or the like), it can prompt the user that the receiving terminal is in the safe mode and prohibit such information sharing, or prompt the user to encrypt the first sharing information. In addition, when the receiving terminal is in a child mode, the user of the receiving terminal is generally not the owner at this moment but the child of the owner or another junior. It is understandable it is not largely another but the owner that the user of the sending terminal wants to share the target sharing information to be shared with. It can remind the user of the sending terminal that the current receiving terminal is in the child mode, or it prompts the user to encrypt the target sharing information. In addition, the receiving terminal may also be in an elderly mode. Similarly, the user of the receiving terminal at this time is generally the owner's elder. It is understandable it is not largely another but the owner that the user of the sending terminal wants to share the target sharing information with. It can prompt the user of the sending terminal that the receiving terminal is currently in the elderly mode, or prompt the user to encrypt the target sharing information.

In addition to the above modes, due to different needs, the receiving terminal may also be in a navigation mode. When the receiving terminal is in the navigation mode, it is obviously inconvenient to receive information. At this time, the sharing of the sending terminal will pose a threat to the driving safety of the user of the receiving terminal. In addition, when the receiving terminal is in a conference mode, the user of the receiving terminal is also inconvenient to receive information. Therefore, in the information sharing process, it is necessary to obtain a current mode of the receiving terminal before the user of the sending terminal sends the information to be shared, thus to avoid disturb the user of the receiving terminal when the user of the receiving terminal is inconvenient to receive information. Therefore, when it is acquired that the receiving terminal is in the navigation mode or the conference mode, the user of the sending terminal may be prompted that the receiving terminal is currently in the navigation mode or the conference mode.

In addition, at present most mobile phones' profile modes are still manually set by the user. However, in some scenarios, a mobile phone can automatically enter a profile mode according to a current usage scenario. For example, when entering a game application, the mobile phone will automatically enter a game mode. Therefore, regardless of whether the above-mentioned guest mode, safety mode, child mode, and elderly mode are manually set or automatically entered by the mobile phone, those modes all belong to the category of profile modes.

In addition, it can be known from the above that the mobile phone can automatically enter a corresponding profile mode according to the current usage scenario, and the mobile phone can also be set to be in a corresponding smart mode to enter the corresponding profile mode in a faster and smarter way. Considering the problem of a degree of intelligence in the smart mode, it may affect the normal use of the mobile phone by the user at the beginning, so a switch for entering the smart mode can be set in a developer mode or a debugging mode.

In addition, in addition to that the mobile phone can be set to a preset profile mode, it can also put a certain application of the mobile phone alone in a preset profile mode, and the mobile phone being in a preset mode may not affect the application being in a preset mode, for example, the mobile phone is in a smart mode, and the application is in a normal mode. Certain preset modes of the mobile phone may affect a preset mode of the application, for example, if the mobile phone is in a traffic saving mode, the application cannot be in the normal mode. Specifically, whether a profile mode of the mobile phone has a higher priority than the profile mode of the application can be preset in the system of the mobile phone. When the receiving terminal is in a preset mode, that is, which profile mode of the mobile phone being in and/or which profile mode of an application being in determines whether to execute operation D101 to process the first sharing information.

In addition, for the sending terminal, if the mode information of the sending terminal does not meet the preset sending conditions, the information to be shared is processed according to a ninth preset rule.

Specifically, the user of the sending terminal can set a mode of the sending terminal as needed. For example, when the sending terminal is in a guest mode, the current user of the sending terminal is generally not the owner, that is, the owner considers privacy protection or other situations, and sets the terminal (such as a mobile phone) to be in the guest mode when the terminal is lent to others, thereby to prevent the others from revealing the owner's privacy during use. Therefore, in the guest mode, if the information the user of the sending terminal chooses to share is a locally stored files (such as a video, a document, an image, etc.), the user can be prompted to be in the guest mode, and that such information sharing is prohibited. In addition, when the sending terminal is in a safe mode, if the information the user of the sending terminal chooses to share is a file (such as a video, a document, an image, etc.), the user can be prompted to be in the safe mode and that such information sharing is prohibited. In addition, when the sending terminal is in a child mode at the current time, the user of the sending terminal is generally not the owner but the owner's child or another junior. The current user of the sending terminal may be unfamiliar with the mobile phone, and in such case, a series of misoperation may occur and may trigger a sharing process. It is understandable under such a situation, the user of the sending terminal at this moment does not have the need to share information. It can prompt the user it is in the child mode and information sharing is prohibited. In addition, the sending terminal may also be in an elderly mode. Similarly, the current user of the sending terminal is generally an elder of the owner, and is not familiar with the current mobile phone. When the elder using the mobile phone, it will also produce a series of misoperation that lead to a sharing process, but the user of the sending terminal at this moment does not have the need to share information. It can prompt the user it is in the elderly mode and information sharing is prohibited.

In addition, at present most mobile phones' profile modes are still manually set by the user. However, in some scenarios, a mobile phone can automatically enter a profile mode according to a current usage scenario. For example, when entering a game application, the mobile phone will automatically enter a game mode. Therefore, regardless of whether the above-mentioned guest mode, safety mode, child mode, and elderly mode are manually set or automatically entered by the mobile phone, those modes all belong to the category of profile modes.

In addition, it can be known from the above that the mobile phone can automatically enter a corresponding profile mode according to the current usage scenario, and the mobile phone can also be set to be in a corresponding smart mode to enter the corresponding profile mode in a faster and smarter way. Considering the problem of a degree of intelligence in the smart mode, it may affect the normal use of the mobile phone by the user at the beginning, so a switch for entering the smart mode can be set in a developer mode or a debugging mode.

In addition, in addition to that the mobile phone can be set to a preset profile mode, it can also put a certain application of the mobile phone alone in a preset profile mode, and the mobile phone being in a preset profile mode may not affect the application being in a preset profile mode, for example, the mobile phone is in a smart mode, and the application is in a normal mode. Certain preset modes of the mobile phone may affect a preset mode of the application, for example, if the mobile phone is in a traffic saving mode, the application cannot be in the normal mode. Specifically, whether a profile mode of the mobile phone has a higher priority than a profile mode of the application can be preset in the system of the mobile phone. When the sending terminal is in a preset mode, that is, which profile mode of the mobile phone being in and/or which profile mode of an application being in determines whether to execute operation D101 to process the first sharing information according to the third processing rule.

For the case that the time information and/or location information of the receiving terminal does not meet the preset receiving conditions, that is, a time zone of the receiving terminal is different from a time zone of the sending terminal and/or a region of the receiving terminal is different from a region of the sending terminal Specifically, for time information and location information, the user of the receiving terminal may be in the same time zone as the user of the sending terminal, or may be in a time zone different from that of the user of the sending terminal. In the case where the two are in the same zone, the user of the sending terminal generally considers based on the current time whether it is suitable for sharing the target sharing information; and in the case where the two are in different time zones, for example, the user of the sending terminal is in the east eight time zone, and the receiving terminal end user is in the west eight time zone, at this time, it is obviously unsuitable for the user of the sending terminal neglects to consider the current time information of the user of the receiving terminal. For example, if the current time of the user of the sending terminal is two o'clock in the afternoon, but the current time of the user of the receiving terminal is two o'clock in the morning, obviously, it is not suitable for sharing information at this time. Therefore, if the user of the receiving terminal and the user of the sending terminal are not in the same time zone, the sending terminal needs to prompt the user of the sending terminal with the current time information of the user of the receiving terminal, and prompts the user of the sending terminal whether the user of the receiving terminal is suitable for receiving the target sharing information at current time.

In addition, the user of the sending terminal may be in the same region as the user of the receiving terminal, or may be in a region different from a region of the user of the receiving terminal. In the case where the two are in different regions, the user of the sending terminal needs to consider whether the location information of the user of the receiving terminal is suitable for receiving the information at current time. For example, the user of the receiving terminal may be on vacation, and it is obviously inappropriate to share work-related information to the user of the receiving terminal. Therefore, when sharing information, the sending terminal prompts the user of the sending terminal with a geographic location of the user of the receiving terminal, and prompts the user of the sending terminal whether it is suitable for the user of the receiving terminal to receive the information to be shared at current time.

For the case where the language information of the receiving terminal does not meet the preset receiving conditions, that is, the system language and/or current application language of the receiving terminal is different from a language of the sharing information Specifically, if the user of the receiving terminal cannot understand the content of the information shared by the user of the sending terminal to the user of the receiving terminal due to language barrier, sharing information under such a situation is meaningless. Therefore, during information sharing, the system language and/or current application language of the receiving terminal can be obtained (generally, obtaining the current application language is for instant messaging software, because such software each usually has a dedicated terminal client, the acquisition of system language is aimed at the situation where the receiving terminal does not need to use a dedicated client to receive information during the information sharing process). After the system language and/or the current application language of the receiving terminal is obtained, if the system language and/or the current application language of the receiving terminal is different from a language of the information to be shared by the sending terminal, the user of the sending terminal is prompted and a function to convert the language of the sharing information into the system language of the receiving terminal and/or the current application language is provided.

For the case that the status information of the receiving terminal and/or the status information of the user of the receiving terminal does not meet the preset receiving conditions, that is, the status information of the receiving terminal and/or the status information of the user of the receiving terminal is insufficient to support the completion of information sharing Specifically, for the status information of the receiving terminal, the receiving terminal's power is too low due to the user forgetting to charge or being unable to charge currently, and the power is not enough to complete the information sharing process. At this time, it is obvious not appropriate if the sending terminal still sends the target sharing information. Similarly, for the sending terminal, the power also affects the process of sharing information.

For the status information of the user of the receiving terminal, when the user of the receiving terminal is in motion, such as the user of the receiving terminal is currently using a software recording an exercise process (running speed, running time, etc.), it is inconvenient for the user of the receiving terminal to receive information at current time.

In addition to the above prompts and encryption processing, the sending terminal can also automatically send the information when the sending terminal exits a mode that does not support information sharing or when the user of the receiving terminal is convenient to receive information.

In this embodiment, the first sharing information is processed according to the processing information acquired from the sending terminal and/or provided by the receiving terminal, so that information that cannot be shared before processing can be shared after processing. The purpose of intelligent processing and sharing of information is realized.

Further, in the twenty-third embodiment of the information sharing method of the present application, the information sharing method includes operation D20: receiving sharing information.

The receiving terminal receives the sharing information sent by the sending terminal, where the sharing information includes first sharing information, second sharing information, description information, or a link address of the first sharing information and/or the second sharing information and the description information on the server, the second sharing information is obtained by processing the first sharing information. Specific contents of the received sharing information is determined by the selection operation of the user of the receiving terminal or sets in advance.

Operation D21, in determining that the sharing information includes description information, performing a corresponding processing according to the description information.

The description information may include: the data type of the target sharing information, the file format of the target sharing information, the size of the target sharing information, the time information for processing the first sharing information, and the execution body information for processing the first sharing information. The target sharing information includes the first sharing information and/or the second sharing information, and the second sharing information is obtained by processing the first sharing information.

Specifically, the data type of the target sharing information includes a data type of the first sharing information or a data type of the second sharing information, and the file format of the target sharing information includes a file format of the first sharing information or a file format of the second sharing information, the size of the target sharing information includes a size of the first sharing information or a size of the second sharing information. The time information for processing the first sharing information includes a start time when the processing starts, an end time when the processing ends, and a time interval for the processing process. The execution body information includes information on the sending terminal, information on the server, or information on the receiving terminal. Specifically, the purpose of sending description information to the receiving terminal is to enable the user of the receiving terminal to know whether the sharing information has been processed, what type of processing has been carried out, by whom, when, and how long the sharing information has been processed when the sharing information is received.

Corresponding processing can be performed according to the above description information, such as outputting prompt information, intercepting the sharing information, etc.

Figure 25:
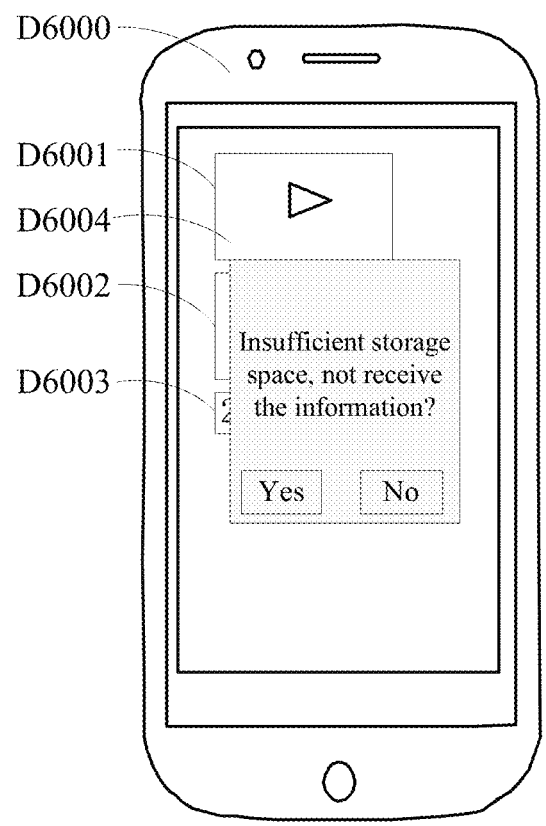
FIG. 25 is a schematic diagram of an interface scene in the twenty-third embodiment of the information sharing method of the present application.

Specifically, when the sharing information is the target sharing information, the prompt information is the first sharing information, the second sharing information, the description information, and a processing identifier. When the sharing information is a link address, the prompt information is the first sharing information corresponding to the link address, content preview of the first sharing information, the second sharing information corresponds to the link address, content preview of the second sharing information, and the description information. In addition, for the case where the sharing information is a link address, the user of the receiving terminal can also preview the content of the sharing information in a display window, which supports the user to selectively receive the sharing information in the display window as needed. In addition, we know that the description information is not updated in real time, that is to say, after the sending terminal obtains the description information, a corresponding status of the receiving terminal may change because there is a time difference from the sending terminal preparing the sharing information to sending the first sharing information, for example, the available storage space of the receiving terminal obtained by the sending terminal during information sharing is 300 MB, and the first sharing information is only 200 MB. Therefore, the sending terminal sends the first sharing information, but when the first sharing information actually reaches the receiving terminal, the receiving terminal's available storage space is only 150 MB, so the receiving terminal can refuse to receive the first sharing information according to the size of the target sharing information displayed in the description information, which is 200 MB. Referring to FIG. 25, D6000 indicates the receiving terminal, D6001, D6002, and D6003 indicate chat records in a current chat window, and D6004 indicates a window which pops up when the receiving terminal detects the first sharing information reaches but the available storage space is insufficient, and provides an option whether to cancel to receive the first sharing information. The user clicks "Yes" to cancel to receive the first sharing information.

In addition, the processing identifier is an identifier of a manner of processing the first sharing information to obtain the second sharing information, which is convenient for the user of the receiving terminal to know how the second sharing information is obtained. The advantage of sharing information in the form of a link address is that for certain content (such as documents), users can preview the content online without having to download it completely to know the specific content. In addition, the data size of the link address is very small and easy to share relative to the target sharing information. The link address may be a URL (Uniform Resource Location).

In addition, excepting the way of sharing the target sharing information in the form of a link address, the target sharing information can also be shared in a form of a logo, which is essentially an image containing a hyperlink. The advantage of sharing information in the form of a logo is that: it avoids a shortcoming of link addresses that cannot indicate data types of the target sharing information. When sharing information in the form of a logo, a specific logo can be provided for each data type in the target sharing information, and the user of the receiving terminal can know which specific data types the shared content includes. In addition, the logos can be conventional data type logos, such as a common music logo, video logo, document logo, etc. The logos can also be specially designed, because in the target sharing information, there exists many data types at the same time, it is very complicated to display the logo of each data type through an image. At this moment, it can put the logo of each data type in a same circle, and represents the logo of each data type with a fan-shaped area, and a size of each fan-shaped area can represent a ratio of a data size of a corresponding data type to a size of the target sharing information. Similarly, a size of each fan-shaped area can also be used to represent a ratio of the number of pieces of a corresponding data type (such as in a chat log, the number of voice messages and the number of image messages) to the total number of pieces of target sharing information.

In this embodiment, a corresponding prompt is given to the user of the receiving terminal according to the description information in the sharing information, so that the user of the receiving terminal can know whether the sharing information has been processed, and a preview function is also provided to facilitate the user of the receiving terminal to browse the sharing information content without downloading it, and can also selectively download required information as needed. The purpose of intelligent information sharing is realized.

In the embodiments, the information sharing method provided by the embodiments of the present application can detect whether information to be shared meets preset rules, and send the information to be shared according to a preset strategy in determining that the information to be shared meets the preset rules. The preset strategy may be sending information to be shared through another application different from a current application, through another communication mode different from a current communication mode, or through another communication card different from a current communication card. Among them, term "current" of the current application, the current communication mode, and the current communication card refers to those which are currently in use, running in the foreground, in an active state, or configured or selected by default, objects defined with the term "current" are different from objects those that are not used, running in the background, inactive, or not configured or selected by default. Or, the preset strategy may further include processing the information to be shared using processing information to obtain target sharing information, and then sending the target sharing information. The processing may be using filtering information to filter the information to be shared to obtain the target sharing information. By filtering, those pieces of information that are not suitable for sharing are filtered out, only those pieces of information suitable for sharing can be shared. Or, those pieces of information that is not suitable for sharing can be further processed. For example, it can compress and/or encrypt those pieces of information that are not suitable for sharing to make them suitable for sharing. The processing may be using association information or relevant information to process the information to be shared to obtain the target sharing information, and the association information may be a current mode of the receiving terminal, a current mode of the sending terminal, sharing records of the sending terminal, and/or sharing records of the receiving terminal, which avoids that the user of the receiving terminal receives the information to be shared whose data types is inconvenient for the user of the receiving terminal to receive or the content of which cannot be understood by the user of the receiving terminal. After processing, the target sharing information may be the same as the original information to be shared. For example, after filtering, it is found that there is no information that is not suitable for sharing. The target sharing information is thus the same as the original information to be shared. The target sharing information may be different from the original information to be shared. Therefore, the information sharing method provided in the embodiments of the present application can further include determining whether the target sharing information is the same as the original information to be shared. In the case that the target sharing information is the same as the original information to be shared, only the target sharing information is sent, and in the case that the target sharing information is different from the original information to be shared, the target sharing information and description information related is sent, so that the receiving terminal outputs a corresponding prompt according to the description information.

In some embodiments, the preset strategy may include filtering the information to be shared using the filtering information, and then using the processing information to process the information after being filtered to make it suitable for sharing.

In summary, the information sharing method provided by the embodiments of the present application solves some problems in the related art when sharing information by intelligently processing the information to be shared and sending the information to be shared, making information sharing more intelligent, safer, more convenient, more effective and in some cases, saving users' costs.

The information sharing method provided in this embodiment of the present application may run on some terminal devices, including but not limited to PCs (Personal Computers), smart phones, tablet computers, e-book readers, and MP3 (Moving Picture Experts Group Audio Layer III) players, MP4 (Moving Picture Experts Group Audio Layer IV) players, portable computers and other mobile terminal devices with display functions.

Figure 26:
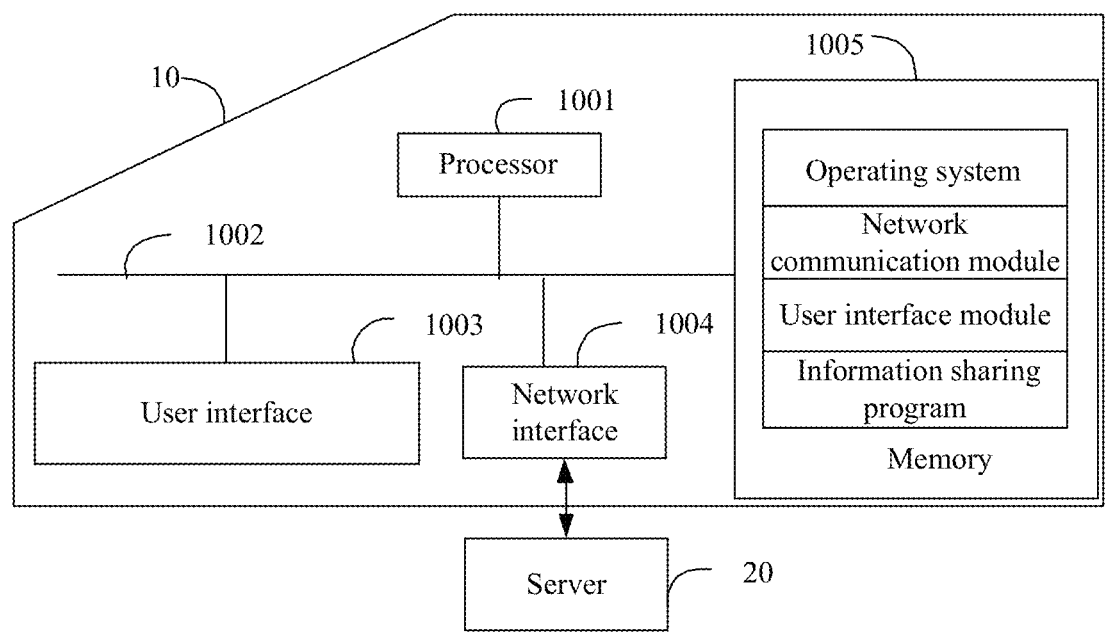
FIG. 26 is a schematic diagram of a hardware operating environment of a device that implements the schemes of the embodiments of the present application.

Please refer to FIG. 26, which is a schematic diagram of a hardware operating environment of a device running the solutions of the embodiments of the present application.

As shown in FIG. 26, the device 10 may include a processor 1001, such as a CPU, a network interface 1004, a user interface 1003, a memory 1005, and a communication bus 1002. Among them, the communication bus 1002 is used to implement connection and communication between these components. The user interface 1003 may include a display, an input unit such as a keyboard, and the user interface 1003 may optionally include a standard wired interface and a wireless interface. The network interface 1004 may optionally include a standard wired interface and a wireless interface (such as a WI-FI interface). The memory 1005 may be a high-speed RAM memory or a stable memory (non-volatile memory), such as a disk memory. The memory 1005 may optionally be a storage device independent of the foregoing processor 1001.

In some embodiments, the device 10 may further include a camera, an RF (Radio Frequency) circuit, a sensor, an audio circuit, a WiFi module, and so on. Among them, the sensor may be such as a light sensor, a motion sensor or another type sensor. Specifically, the light sensor may include an ambient light sensor and a proximity sensor, the ambient light sensor may adjust a brightness of a display screen according to the brightness of the ambient light, and the proximity sensor may turn off the display screen and/or a backlight when the mobile terminal moves to the ear. As a type of motion sensor, the gravity acceleration sensor can detect the magnitude of acceleration in various directions (generally three axes), and can detect the magnitude and direction of gravity when at rest. It can be used for applications that recognize the posture of mobile terminals (such as horizontal and vertical screen switching, related games, magnetometer posture calibration), vibration recognition related functions (such as pedometer, tap), etc. Of course, the mobile terminal can also be configured with other sensors such as gyroscopes, barometers, hygrometers, thermometers, infrared sensors, etc., which are no longer described.

Those skilled in the art may understand that the structure shown in FIG. 26 does not constitute a limitation on the device 10, and the device 10 may include more or less components than shown, or a combination of certain components, or be arranged in a different component layout.

As shown in FIG. 26, the memory 1005, which is a non-volatile computer storage medium, may store an operating system, a network communication module, a user interface module, and an information sharing program.

In the device 10 shown in FIG. 26, the network interface 1004 is mainly used to connect to a back-end server 20 to perform data communication with the server 20. The user interface 1003 is mainly used to connect to a client (user side) and perform data communication with the client. The processor 1001 can be used to call the information sharing program stored in the memory 1005 and execute at least one of the information sharing methods as described above. The device 10 can act as a sending terminal or a receiving terminal when at least one of the information sharing methods as described above is carried out.

A specific implementation manner of the processor 1001 of the device 10 of the present application running the information sharing program stored in the memory 1005 and executing at least one of the information sharing method can make reference to the foregoing first to twenty-third embodiments, and details of which are not described herein again.

Based on the above disclosure, the present application also provides a device including a memory, a processor, and an information sharing program stored on the memory and executable on the processor. The information sharing program is executable by the processor to realize the above information sharing method.

Based on the above disclosure, the present application also provides a non-volatile computer-readable storage medium storing an information sharing program, and the information sharing program is executable by the processor to implement the above information sharing method.

The embodiments of the device for sharing information and the computer-readable storage medium of the present application include all the technical features of the above embodiments of the information sharing method. The deployed contents and description are basically the same as those of the above embodiments of the information sharing method and are not described here again.

An embodiment of the present application further provides a computer program product, where the computer program product includes computer program code, and when the computer program code runs on a computer, the computer is caused to perform the method described in various possible implementation manners above.

An embodiment of the present application further provides a chip, including a memory and a processor, where the memory is configured to store a computer program, and the processor is configured to call and run the computer program from the memory, so that a device equipped with the chip performs the method described in the various possible embodiments above.

It should be understood that, in the present disclosure, the purpose of using labels such as S10, S20 before each of the operations is to more briefly and clearly describe the corresponding contents, the labels does not constitute a substantial restrictions on an order of the operations. In fact, those skilled in the art may perform the operations according to a sequence as needed, such as performing the operation S20 before the operation S10. The various orders of performing the operations should be within the scope of protection of this application.

It should be understood that although the terms first, second, third, etc., may be used herein to describe various types of information, the information should not be limited to these terms. These terms are only used to distinguish the same type of information from each other. For example, without departing from the scope of this article, a first information may also be referred to as a second information, and similarly, a second information may also be referred to as a first information. Depending on the context, the word "if" as used herein may be interpreted as "when" or "at the moment" or "responsive to determination". Furthermore, as used herein, the singular forms "a", "an", and "the" are intended to include the plural forms as well, unless the context indicates otherwise. The terms "or" and "and/or" as used herein are to be interpreted as inclusive or mean any one or any combination. Therefore, "A, B or C" or "A, B and/or C" means "any of the following: A, B, C, A and B, A and C, B and C, A and B and C". The exception to this definition only occurs when a combination of elements, functions, operations, or operations are inherently mutually exclusive in certain ways.

It should be understood that although the operations in the flowchart in the above embodiment are displayed sequentially according to the arrows, the operations are not necessarily executed in the order indicated by the arrows. Unless there is a clear description in this article, the execution of these operations is not strictly limited in order, and they can be executed in other orders. Moreover, at least some of the operations in the figures may include multiple sub-operations or multiple stages. Those sub-operations or stages are not necessarily executed at the same time, but may be executed at different times, and the order of executing those sub-operations or stages is not necessarily sequential. Instead, those sub-operations or stages can be executed in turn or alternately with at least a part of other operations or sub-operations or stages of other operations.

It should be noted that in this article, the terms "include", "comprise" or any other variant thereof are intended to cover non-exclusive inclusion, so that a process, method, article or system that includes a series of elements includes not only those elements, but also includes other elements that are not explicitly listed, or include elements inherent to this process, method, article, or system. Without more restrictions, the element defined by the sentence "include a . . . " does not exclude that there are other identical elements in the process, method, article or system that includes the element. In addition, the components, features, and elements having a same name in different embodiments may have a same meaning, or may have different meanings, and the specific meaning thereof need to be determined by the explanation in the specific embodiment or further in conjunction with the contexts in the specific embodiment.

The sequence numbers of the above embodiments of the present application are for description only, and do not represent the advantages and disadvantages of the embodiments.

Through the description of the above embodiments, those skilled in the art can clearly understand that the methods in the above embodiments can be implemented by means of software plus a necessary general hardware platform, and of course, can also be implemented by hardware, but in many cases the former is better. Based on this understanding, the technical solution of the present application can be embodied in the form of a software product in essence or part that contributes to the existing technology, and the computer software product is stored in a storage medium (such as a ROM/RAM as described above, a magnetic disk, an optical disk), including several instructions to make a terminal device (which can be a mobile phone, a computer, a server, an air conditioner, or a network equipment, etc.) to perform the method described in each embodiment of the present application.

The above are only the preferred embodiments of the present application, and do not limit the scope of the patent of the present application. Any equivalent structure or equivalent process transformation made by the description and drawings of this application, or directly or indirectly used in other related technical fields, is included in the scope of patent protection in this application.

What is claimed is:

1. An information sharing method, comprising:
   S10: obtaining information to be shared that a sending terminal wants to share to a receiving terminal;
   S20: detecting whether the information to be shared meets a preset rule, the preset rule comprising: the information meeting a first preset condition, wherein the information to be shared meeting the first preset condition comprises the information to be shared comprising at least one preset data type; and
   S30: in determining that the information to be shared meets the preset rule, sending the information according to a preset strategy, comprising:
   performing data type conversion on the information to be shared according to a habit of a user of the receiving terminal, wherein the habit of the user of the receiving terminal is obtained through chat records in a chat application of the receiving terminal.

2. An information sharing method, comprising:
   A10: obtaining processing information, wherein the processing information is obtained from a sending terminal and/or provided by a receiving terminal;
   A11: processing information to be shared according to the processing information to obtain target sharing information, wherein the operation A11 comprises performing data type conversion on the information to be shared according to a habit of a user of the receiving terminal, wherein the habit of the user of the receiving terminal is obtained through chat records in a chat application of the receiving terminal;
   D11: detecting whether the target sharing information is the same as first sharing information, wherein the first sharing information is original information to be shared;
   D12: in responding to a determination that the target sharing information is different from the original information to be shared, obtaining description information corresponding to the target sharing information, and sending the target sharing information and the description information to the receiving terminal; and/or,
   D13: in responding to a determination that the first sharing information is the same as the original information to be shared, only sending the target sharing information to the receiving terminal.

3. The method according to claim 2, wherein, before the operation A10 or in the operation A11, the method further comprises: processing a piece of information to be shared that does not meet a preset rule or a sharing condition according to a preset strategy, the preset strategy comprising at least one of the following: filtering out the piece of information, hiding the piece of information, setting the piece of information to a unselectable state, displaying a mark indicating sharing of the piece of the information not supported, and outputting prompt information; and/or,
   before the operation A11, the method further comprises:
   selecting the information to be shared according to a selection operation, the selection operation comprising at least one of the following: voice controlling operation, selection operation on an interface, preset touch gesture on a screen, and preset remote control gesture.

4. The method according to claim 2, wherein the processing information comprises a file type; and,
   processing the information to be shared comprises performing a file format conversion.

5. The method according to claim 2, wherein, operation of processing information to be shared according to the processing information comprises:
   in determining that a data type and/or a file type of the receiving terminal does not meet a preset receiving condition,
   processing the information to be shared according to a preset rule.

6. The method according to claim 2, wherein, before operation A10, the method further comprises:
   determining whether a current mode of the receiving terminal is a preset mode;
   in determining that the current mode of the receiving terminal is a preset mode, performing operation A10.

7. The method according to claim 2, wherein,
   the method is executed by a server, and the target sharing information comprises at least one of the following: original information to be shared, processed information to be shared, a link address, and a logo.

8. The method according to claim 2, wherein before operation A10 or in the operation A11, the method further comprises:
   B10: obtaining filtering information;
   B11: processing the information to be shared according to the filtering information.

9. The method according to claim 8, wherein, the filtering information comprises first type filtering information, the first type filtering information is obtained from the sending terminal; and/or, the filtering information comprises second type filtering information, the second type filtering information is provided by the receiving terminal.

10. The method according to claim 9, wherein, the first type filtering information comprises at least one of the following:
    authentication information of a current user of the sending terminal,
    permission information of the information to be shared,
    available traffic of the sending terminal,
    current network speed of the sending terminal, and
    a current mode of the sending terminal; and/or
    the method further comprises at least one of the following:
    in determining that the authentication information of the current user of the sending terminal meets a preset requirement, performing operation B11;
    in determining that the permission information of the information to be shared meets another preset requirement, performing operation B11; and
    in determining that available traffic and/or a current network speed of the sending terminal does not meet a preset sending condition, and/or, in determining that the sending terminal is in a preset mode, processing the information to be shared according to a preset rule, wherein the preset mode comprises at least one of the following: a profile mode, an intelligent mode, a security mode, a guest mode, a child mode, and an elderly mode.

11. The method according to claim 9, wherein the second type filtering information comprises at least one of the following:
   a data type and/or a file type supported by the receiving terminal,
   available space and/or available traffic of the receiving terminal,
   current network speed condition of the receiving terminal,
   time information and/or location information of the receiving terminal,
   a current mode of the receiving terminal,
   system language and/or current application language of the receiving terminal,
   status information of the receiving terminal and/or status information of a user of the receiving terminal;
   and/or, operation B11 comprises:
   in determining that the data type supported by the receiving terminal does not meet a preset receiving condition, and/or,
   in determining that the file type supported by the receiving terminal does not meet a preset receiving condition, and/or,
   in determining that the available space of the receiving terminal does not meet a preset receiving condition, and/or,
   in determining that the available traffic of the receiving terminal does not meet a preset receiving condition, and/or,
   in determining that the current network speed of the receiving terminal does not meet a preset receiving condition, and/or,
   in determining that the receiving terminal is in a preset profile mode, and/or,
   in determining that the time information of the receiving terminal does not meet a preset receiving condition, and/or,
   the location information of the receiving terminal does not meet a preset receiving condition, and/or,
   in determining that the receiving terminal is in a preset mode, and/or,
   in determining that the system language of the receiving terminal is different from a system language of the sending terminal, and/or,
   in determining that a sharing application language of the receiving terminal is different from a sharing application language of the sending terminal, and/or,
   in determining that the status information of the receiving terminal and/or the status information of the user of the receiving terminal does not meet a preset receiving condition, processing the information to be shared according to a preset rule.

12. The method according to claim 8, further comprising:
   obtaining at least one piece of relevant information for selecting information to be shared, the relevant information defining requirements comprising at least one of data type requirement, file type requirement, presentation form requirement, content requirement, and display location information requirement;
   automatically selecting information to be shared that meets the requirements according to the relevant information.

13. The method according to claim 2, wherein before operation A10, the method further comprises:
   determining whether a current information selection mode is a smart mode;
   in determining that the current information selection mode is the smart mode, performing operation A10.

14. The method according to claim 2, wherein the processing information is association information of the information to be shared, and the association information comprises at least one of the following: a current mode of the receiving terminal or a current mode of the sending terminal, sharing records of the sending terminal and/or sharing records of the receiving terminal.

15. The method according to claim 2, wherein before the operation A10, the method further comprises:
   determining whether a current mode of the sending terminal is a preset mode;
   in determining that the current mode of the sending terminal is a preset mode, performing operation A10.

16. The method according to claim 2, wherein, operation of processing information to be shared comprises: performing a data type conversion, and performing the data type conversion comprises converting from a first data type to a second data type different from the first data type.

17. The method according to claim 16, wherein, the data type conversion is performed by, a server according to data type conversion parameters provided by the sending terminal.

18. The method according to claim 17, wherein, the data type conversion parameters comprise at least one of the following: a data type and/or a file format of the information to be shared, a data type and/or a file format of processed information to be shared, time requirements, space requirements; and/or,
   the data type conversion parameters are determined according to selection operations of a user or system settings,
   wherein the time requirements are configured for selecting a data type conversion of a least time-consuming, and the space requirements are configured for minimizing a space occupied by the target sharing information.

19. The method according to claim 2, wherein, operation A12 further comprises: in determining that there is a piece of information in the target sharing information that cannot be shared by a current first application, utilizing a second application different from the current first application to share the piece of information.

20. The method according to claim 2, wherein before operation of sending the target sharing information and description information, the method further comprises:
   determining whether a current mode of the receiving terminal is a preset mode;
   in determining that the current mode of the receiving terminal is a preset mode, sending the target sharing information and description information.

21. The method according to claim 2, wherein the description information comprises at least one of the following:
   a data type of the target sharing information, a file format of the target sharing information, a size of the target sharing information, time information for processing the first sharing information, and execution body information for processing the first sharing information.

22. The method according to claim 21, wherein the execution body information comprises at least one of the following: sending terminal information, server information, and receiving terminal information.

23. The method according to claim 2, wherein operation D10 comprises:
   D101: obtaining the first sharing information;
   D102: obtaining processing information corresponding to the first sharing information, and detecting whether the processing information meets preset conditions;
   D103: in determining that the processing information corresponding to the first sharing information does not meet preset conditions, determining whether an execution body is the sending terminal;
   D104: in determining that the execution body is not the sending terminal but a server, taking the first sharing information as the target sharing information, thereby the execution body performs corresponding processing on the target sharing information according to the processing information.

24. A device, comprising a memory, a processor, and an information sharing program stored on the memory and executable on the processor, when the information sharing program is executed by the processor, the information sharing method according to claim 2 is carried out.

25. A non-volatile computer-readable storage medium, wherein a computer program is stored on the non-volatile computer-readable storage medium, and when the computer program is executed by a processor, the information sharing method according to claim 2 is carried out.

26. The method according to claim 2, wherein the description information is configured for a user of the receiving terminal to know whether the sharing information has been processed.

27. The method according to claim 26, wherein the description information is configured for the user of the receiving terminal to know whether the sharing information has been processed, what type of processing has been carried out, or by whom, when, or how long the sharing information has been processed.

28. The method according to claim 2, wherein corresponding processing can be performed according to the above description information and the corresponding processing is outputting prompt information or intercepting the sharing information.

29. An information sharing method, comprising the following operations:
   D20: receiving, by a receiving terminal, sharing information, the sharing information comprising at least one of the following: first sharing information, second sharing information, description information, a link address of the first sharing information and/or the second shared information and the description information on a server, wherein the second sharing information is obtained by processing the first sharing information; and
   D21: determining, by the receiving terminal that the sharing information comprises the description information, and performing a corresponding processing according to the description information,
   wherein the description information is configured for a user of the receiving terminal to know whether the sharing information has been processed;
   wherein the sharing information is shared in a form of logos, a logo of each data type of the sharing information is put in a same circle and represented with a fan-shaped area of the circle.

30. The method according to claim 29, wherein the description information comprises at least one of the following:
   a data type of target sharing information, a file format of the target sharing information, a size of the target sharing information, time information for processing the first sharing information, and execution body information for processing the first sharing information, wherein the target sharing information comprises the first sharing information and/or the second sharing information.

31. The method according to claim 30, wherein operation D21 further comprises:
   in determining that the sharing information is the target sharing information, the corresponding processing comprises at least one of the following: outputting the first sharing information, outputting the second sharing information, outputting the explanation description information, outputting a processing identifier, and outputting interception information; or
   in determining that the sharing information is the link address, the corresponding processing comprises outputting prompt information, and the prompt information comprises at least one of the following:
   the first sharing information corresponding to the link address, content preview of the first sharing information, and the second shared information corresponding to the link address, content preview of the second sharing information, and the description information.

32. The method according to claim 31, wherein the content preview is displayed in a display window, and operation D21 further comprises:
   receiving the sharing information according to a user's selection operation on the display window.

33. The method according to claim 29, wherein the description information is configured for the user of the receiving terminal to know whether the sharing information has been processed, what type of processing has been carried out, or by whom, when, or how long the sharing information has been processed.

34. The method according to claim 29, wherein corresponding processing can be performed according to the above description information and the corresponding processing is outputting prompt information or intercepting the sharing information.

* * * * *